US008614673B2

(12) United States Patent
Binder

(10) Patent No.: US 8,614,673 B2
(45) Date of Patent: Dec. 24, 2013

(54) SYSTEM AND METHOD FOR CONTROL BASED ON FACE OR HAND GESTURE DETECTION

(75) Inventor: Yehuda Binder, Hod Hasharon (IL)

(73) Assignee: May Patents Ltd., Hod-Hasharon (IL)

( * ) Notice: Subject to any disclaimer, the term of this patent is extended or adjusted under 35 U.S.C. 154(b) by 0 days.

(21) Appl. No.: 13/483,434

(22) Filed: May 30, 2012

(65) Prior Publication Data
US 2012/0235901 A1  Sep. 20, 2012

Related U.S. Application Data

(62) Division of application No. 12/724,896, filed on Mar. 16, 2010.

(60) Provisional application No. 61/180,237, filed on May 21, 2009.

(51) Int. Cl.
*G06F 3/033* (2013.01)
*G09G 5/08* (2006.01)

(52) U.S. Cl.
USPC ........................................................ 345/158

(58) Field of Classification Search
USPC ..................... 345/156–158, 175; 382/103; 348/208.14
See application file for complete search history.

(56) References Cited

U.S. PATENT DOCUMENTS

| | | |
|---|---|---|
| 3,783,508 A | 1/1974 | Brown et al. |
| 4,019,252 A | 4/1977 | Port et al. |
| 4,047,187 A | 9/1977 | Mashimo et al. |
| 4,169,663 A | 10/1979 | Murr |
| 4,317,991 A | 3/1982 | Stauffer |
| 4,367,027 A | 1/1983 | Stauffer |
| RE31,370 E | 9/1983 | Mashimo et al. |
| 4,567,610 A | 1/1986 | McConnell |
| 4,595,990 A | 6/1986 | Garwin et al. |
| 4,638,364 A | 1/1987 | Hiramatsu |
| 4,703,247 A | 10/1987 | Morioka |

(Continued)

FOREIGN PATENT DOCUMENTS

| | | |
|---|---|---|
| DE | 19737449 | 2/1999 |
| DE | 10335766 | 11/2004 |

(Continued)

OTHER PUBLICATIONS

International Search Report dated Oct. 15, 2010.

(Continued)

*Primary Examiner* — Kenneth Bukowski
(74) *Attorney, Agent, or Firm* — Browdy and Neimark, PLLC

(57) ABSTRACT

System and method for control using face detection or hand gesture detection algorithms in a captured image. Based on the existence of a detected human face or a hand gesture in an image captured by a digital camera, a control signal is generated and provided to a device. The control may provide power or disconnect power supply to the device (or part of the device circuits). The location of the detected face in the image may be used to rotate a display screen to achieve a better line of sight with a viewing person. The difference between the location of the detected face and an optimum is the error to be corrected by rotating the display to the required angular position. A hand gesture detection can be used as a replacement to a remote control for to the controlled unit, such as a television set.

13 Claims, 59 Drawing Sheets

(56) References Cited

U.S. PATENT DOCUMENTS

| | | |
|---|---|---|
| 4,719,698 A | 1/1988 | Ninomiya et al. |
| 4,796,019 A | 1/1989 | Auerbach |
| 4,831,368 A | 5/1989 | Masimo et al. |
| 4,836,670 A | 6/1989 | Hutchinson |
| 4,973,149 A | 11/1990 | Hutchinson |
| 5,027,506 A | 7/1991 | Bosch |
| 5,032,918 A | 7/1991 | Ota et al. |
| 5,034,804 A | 7/1991 | Sasaki et al. |
| RE33,682 E | 9/1991 | Hiramatsu |
| 5,062,010 A | 10/1991 | Saito |
| 5,138,459 A | 8/1992 | Roberts et al. |
| 5,189,404 A | 2/1993 | Masimo et al. |
| 5,203,704 A | 4/1993 | McCloud |
| 5,206,721 A | 4/1993 | Ashida et al. |
| 5,214,615 A | 5/1993 | Bauer |
| 5,243,418 A | 9/1993 | Kuno et al. |
| 5,250,888 A | 10/1993 | Yu |
| 5,274,735 A | 12/1993 | Okada |
| 5,291,234 A | 3/1994 | Shindo et al. |
| 5,343,243 A | 8/1994 | Maeda |
| 5,347,295 A | 9/1994 | Agulnick et al. |
| 5,386,103 A | 1/1995 | DeBan et al. |
| 5,396,443 A | 3/1995 | Mese et al. |
| 5,402,170 A | 3/1995 | Parulski et al. |
| 5,454,043 A | 9/1995 | Freeman |
| 5,475,441 A | 12/1995 | Parulski et al. |
| 5,483,745 A | 1/1996 | Izumi |
| 5,488,429 A | 1/1996 | Kojima et al. |
| 5,520,888 A | 5/1996 | Berndt |
| 5,541,585 A | 7/1996 | Duhame et al. |
| 5,548,764 A | 8/1996 | Duley et al. |
| 5,550,366 A | 8/1996 | Roustaei |
| 5,581,276 A | 12/1996 | Cipolla et al. |
| 5,594,469 A | 1/1997 | Freeman et al. |
| 5,617,312 A | 4/1997 | Iura et al. |
| 5,638,136 A | 6/1997 | Kojima et al. |
| 5,642,431 A | 6/1997 | Poggio et al. |
| 5,666,159 A | 9/1997 | Parulski et al. |
| 5,675,364 A | 10/1997 | Stedman et al. |
| 5,678,312 A | 10/1997 | Watanabe |
| 5,710,601 A | 1/1998 | Marshall et al. |
| 5,710,833 A | 1/1998 | Moghaddam et al. |
| 5,724,456 A | 3/1998 | Boyack et al. |
| 5,731,832 A | 3/1998 | Ng |
| 5,781,650 A | 7/1998 | Lobo et al. |
| 5,808,887 A | 9/1998 | Dorst |
| 5,812,193 A | 9/1998 | Tomitaka et al. |
| 5,815,147 A | 9/1998 | Bogen et al. |
| 5,818,975 A | 10/1998 | Goodwin et al. |
| 5,835,616 A | 11/1998 | Lobo et al. |
| 5,841,360 A | 11/1998 | Binder |
| 5,870,138 A | 2/1999 | Smith et al. |
| 5,880,719 A | 3/1999 | Kikinis |
| 5,892,856 A | 4/1999 | Cooper et al. |
| 5,898,423 A | 4/1999 | Tognazzini et al. |
| 5,912,721 A | 6/1999 | Yamaguchi et al. |
| 5,914,671 A | 6/1999 | Tuttle |
| 5,917,476 A | 6/1999 | Czerniecki |
| 5,920,988 A | 7/1999 | Momose |
| 5,926,168 A | 7/1999 | Fan |
| 5,936,608 A | 8/1999 | Springer |
| 5,978,519 A | 11/1999 | Bollman et al. |
| 5,983,501 A | 11/1999 | Izumi |
| 5,987,154 A | 11/1999 | Gibbon et al. |
| 5,991,456 A | 11/1999 | Rahman et al. |
| 6,002,427 A | 12/1999 | Kipust |
| 6,002,808 A | 12/1999 | Freeman |
| 6,009,210 A | 12/1999 | Kang |
| 6,010,111 A | 1/2000 | Cho |
| 6,023,224 A | 2/2000 | Meyvis |
| 6,031,934 A | 2/2000 | Ahmad et al. |
| 6,072,494 A | 6/2000 | Nguyen |
| 6,075,895 A | 6/2000 | Qiao et al. |
| 6,091,378 A | 7/2000 | Richardson et al. |
| 6,097,470 A | 8/2000 | Buhr et al. |
| 6,101,271 A | 8/2000 | Yamashita et al. |
| 6,108,437 A | 8/2000 | Lin |
| 6,111,517 A | 8/2000 | Atick et al. |
| 6,111,580 A | 8/2000 | Kazama et al. |
| 6,128,003 A | 10/2000 | Smith et al. |
| 6,128,397 A | 10/2000 | Baluja et al. |
| 6,148,092 A | 11/2000 | Qian |
| 6,151,073 A | 11/2000 | Steinberg et al. |
| 6,152,563 A | 11/2000 | Hutchinson et al. |
| 6,160,899 A | 12/2000 | Lee et al. |
| 6,167,469 A | 12/2000 | Safai et al. |
| 6,176,782 B1 | 1/2001 | Lyons et al. |
| 6,179,264 B1 | 1/2001 | Moy et al. |
| 6,188,777 B1 | 2/2001 | Darrell et al. |
| 6,192,149 B1 | 2/2001 | Eschbach et al. |
| 6,204,828 B1 | 3/2001 | Amir et al. |
| 6,215,471 B1 | 4/2001 | DeLuca |
| 6,222,465 B1 | 4/2001 | Kumar et al. |
| 6,243,076 B1 | 6/2001 | Hatfield |
| 6,249,315 B1 | 6/2001 | Holm |
| 6,249,606 B1 | 6/2001 | Kiraly et al. |
| 6,252,598 B1 | 6/2001 | Segen |
| 6,256,033 B1 | 7/2001 | Nguyen |
| 6,263,113 B1 | 7/2001 | Abdel-Mottaleb et al. |
| 6,263,447 B1 | 7/2001 | French et al. |
| 6,268,939 B1 | 7/2001 | Klassen et al. |
| 6,269,449 B1 | 7/2001 | Kocis |
| 6,282,317 B1 | 8/2001 | Luo et al. |
| 6,282,553 B1 | 8/2001 | Flickner et al. |
| 6,300,976 B1 | 10/2001 | Fukuoka |
| 6,301,370 B1 | 10/2001 | Steffens et al. |
| 6,307,384 B2 | 10/2001 | Havey et al. |
| 6,311,141 B1 | 10/2001 | Hazra |
| 6,330,676 B1 | 12/2001 | Kelsey |
| 6,332,033 B1 | 12/2001 | Qian |
| 6,346,929 B1 | 2/2002 | Fukushima et al. |
| 6,346,937 B1 | 2/2002 | Sasaki et al. |
| 6,348,928 B1 | 2/2002 | Jeong |
| 6,351,222 B1 | 2/2002 | Swan et al. |
| 6,359,612 B1 | 3/2002 | Peter et al. |
| 6,366,288 B1 | 4/2002 | Naruki et al. |
| 6,367,020 B1 | 4/2002 | Klein |
| 6,374,145 B1 | 4/2002 | Lignoul |
| 6,393,136 B1 | 5/2002 | Amir et al. |
| 6,393,148 B1 | 5/2002 | Bhaskar |
| 6,396,391 B1 | 5/2002 | Binder |
| 6,397,137 B1 | 5/2002 | Alpert et al. |
| 6,404,900 B1 | 6/2002 | Qian et al. |
| 6,407,777 B1 | 6/2002 | DeLuca |
| 6,418,536 B1 | 7/2002 | Park |
| 6,421,064 B1 | 7/2002 | Lemelson et al. |
| 6,421,468 B1 | 7/2002 | Ratnakar et al. |
| 6,434,255 B1 | 8/2002 | Harakawa |
| 6,437,758 B1 | 8/2002 | Nielsen et al. |
| 6,437,794 B1 | 8/2002 | Ohshima et al. |
| 6,438,264 B1 | 8/2002 | Gallagher et al. |
| 6,456,262 B1 | 9/2002 | Bell |
| 6,456,732 B1 | 9/2002 | Kimbell et al. |
| 6,459,436 B1 | 10/2002 | Kumada et al. |
| 6,466,232 B1 | 10/2002 | Newell et al. |
| 6,473,199 B1 | 10/2002 | Gilman et al. |
| 6,473,609 B1 | 10/2002 | Schwartz et al. |
| 6,480,510 B1 | 11/2002 | Binder |
| 6,498,628 B2 | 12/2002 | Iwamura |
| 6,501,515 B1 | 12/2002 | Iwamura |
| 6,501,857 B1 | 12/2002 | Gotsman et al. |
| 6,504,707 B2 | 1/2003 | Agata et al. |
| 6,504,942 B1 | 1/2003 | Hong et al. |
| 6,504,951 B1 | 1/2003 | Luo et al. |
| 6,516,154 B1 | 2/2003 | Parulski et al. |
| 6,522,292 B1 | 2/2003 | Ellenby et al. |
| 6,526,159 B1 | 2/2003 | Nickerson |
| 6,526,161 B1 | 2/2003 | Yan |
| 6,535,198 B1 | 3/2003 | Fan |
| 6,535,243 B1 | 3/2003 | Tullis |
| 6,549,616 B1 | 4/2003 | Binder |
| 6,552,743 B1 | 4/2003 | Rissman |
| 6,553,281 B1 | 4/2003 | Liu |
| 6,560,319 B1 | 5/2003 | Binder |

(56) References Cited

U.S. PATENT DOCUMENTS

| | | | |
|---|---|---|---|
| 6,564,144 | B1 | 5/2003 | Cherveny |
| 6,567,101 | B1 | 5/2003 | Thomas |
| 6,573,883 | B1 | 6/2003 | Bartlett |
| 6,603,491 | B2 | 8/2003 | Lemelson et al. |
| 6,633,286 | B1 | 10/2003 | Do et al. |
| 6,634,104 | B2 | 10/2003 | Jacobsen |
| 6,665,805 | B1 | 12/2003 | Tsirkel et al. |
| 6,677,969 | B1 | 1/2004 | Hongo |
| 6,690,677 | B1 | 2/2004 | Binder |
| 6,734,845 | B1 | 5/2004 | Nielsen et al. |
| 6,738,041 | B2 | 5/2004 | Silber |
| 6,738,066 | B1 | 5/2004 | Nguyen |
| 6,765,608 | B1 | 7/2004 | Himeda et al. |
| 6,766,036 | B1 | 7/2004 | Pryor |
| 6,771,277 | B2 | 8/2004 | Ohba |
| 6,788,332 | B1 | 9/2004 | Cook |
| 6,801,188 | B2 | 10/2004 | Longobardi |
| 6,801,811 | B2 | 10/2004 | Ranganathan et al. |
| 6,804,396 | B2 | 10/2004 | Higaki et al. |
| 6,819,782 | B1 | 11/2004 | Imagawa et al. |
| 6,842,459 | B1 | 1/2005 | Binder |
| 6,851,066 | B2 | 2/2005 | Obitsu |
| 6,871,402 | B2 | 3/2005 | Bader et al. |
| 6,889,192 | B2 | 5/2005 | Friedrich et al. |
| 6,927,340 | B1 | 8/2005 | Binder |
| 6,931,596 | B2 * | 8/2005 | Gutta et al. .............. 715/728 |
| 6,933,956 | B2 | 8/2005 | Sato et al. |
| 6,933,979 | B2 | 8/2005 | Gonzales et al. |
| 6,937,056 | B2 | 8/2005 | Binder |
| 6,937,742 | B2 | 8/2005 | Roberts et al. |
| 6,940,545 | B1 | 9/2005 | Ray et al. |
| 6,950,534 | B2 | 9/2005 | Cohen et al. |
| 6,956,826 | B1 | 10/2005 | Binder |
| 6,961,303 | B1 | 11/2005 | Binder |
| 6,968,084 | B2 | 11/2005 | Satoh |
| 6,987,454 | B2 | 1/2006 | Narayanaswami et al. |
| 6,988,008 | B2 * | 1/2006 | Hudson et al. .............. 700/1 |
| 7,010,710 | B2 | 3/2006 | Piazza |
| 7,023,499 | B2 | 4/2006 | Williams et al. |
| 7,030,856 | B2 | 4/2006 | Dawson et al. |
| 7,036,025 | B2 | 4/2006 | Hunter |
| 7,038,651 | B2 | 5/2006 | Nitta et al. |
| 7,042,440 | B2 | 5/2006 | Pryor et al. |
| 7,050,606 | B2 | 5/2006 | Paul et al. |
| 7,058,204 | B2 | 6/2006 | Hildreth et al. |
| 7,059,733 | B2 | 6/2006 | Hoshino et al. |
| 7,068,813 | B2 | 6/2006 | Lin |
| 7,088,220 | B2 | 8/2006 | Kotzin |
| 7,092,555 | B2 | 8/2006 | Lee et al. |
| 7,095,401 | B2 | 8/2006 | Liu et al. |
| 7,106,721 | B1 | 9/2006 | Binder |
| 7,110,575 | B2 | 9/2006 | Chen et al. |
| 7,113,074 | B2 | 9/2006 | Gutta et al. |
| 7,117,380 | B2 | 10/2006 | Kangas |
| 7,129,927 | B2 | 10/2006 | Mattsson |
| 7,129,963 | B2 | 10/2006 | Bohnisch et al. |
| 7,134,080 | B2 | 11/2006 | Kjeldsen et al. |
| 7,134,130 | B1 | 11/2006 | Thomas |
| 7,152,172 | B2 | 12/2006 | Tsirkel et al. |
| 7,196,720 | B2 | 3/2007 | Lourie et al. |
| 7,210,240 | B2 | 5/2007 | Townsend et al. |
| 7,227,976 | B1 | 6/2007 | Jung et al. |
| 7,259,747 | B2 | 8/2007 | Bell |
| 7,289,645 | B2 * | 10/2007 | Yamamoto et al. ............ 382/104 |
| 7,308,112 | B2 | 12/2007 | Fujimura et al. |
| 7,315,630 | B2 | 1/2008 | Steinberg et al. |
| 7,317,793 | B2 | 1/2008 | Binder |
| 7,317,815 | B2 | 1/2008 | Steinberg et al. |
| 7,327,385 | B2 | 2/2008 | Yamaguchi |
| 7,340,077 | B2 | 3/2008 | Gokturk et al. |
| 7,391,888 | B2 | 6/2008 | Hu et al. |
| 7,405,725 | B2 | 7/2008 | Mohri et al. |
| 7,418,112 | B2 | 8/2008 | Ogasawara |
| 7,426,785 | B2 | 9/2008 | Ho |
| 7,432,952 | B2 | 10/2008 | Fukuoka |
| 7,435,177 | B1 | 10/2008 | Ford |
| 7,436,140 | B2 | 10/2008 | Takaji et al. |
| 7,436,842 | B2 | 10/2008 | Binder |
| 7,454,039 | B2 | 11/2008 | Tu et al. |
| 7,466,844 | B2 | 12/2008 | Ramaswamy et al. |
| 7,466,866 | B2 | 12/2008 | Steinberg |
| 7,487,375 | B2 | 2/2009 | Lourie et al. |
| 7,508,961 | B2 | 3/2009 | Chen et al. |
| 7,521,943 | B2 | 4/2009 | Binder |
| 7,522,615 | B2 | 4/2009 | Binder |
| 7,530,019 | B2 | 5/2009 | Kjeldsen et al. |
| 7,542,554 | B2 | 6/2009 | Binder |
| 7,598,942 | B2 | 10/2009 | Underkoffler et al. |
| 7,599,520 | B2 | 10/2009 | Dempski et al. |
| 7,602,414 | B2 | 10/2009 | Walker et al. |
| 7,639,233 | B2 | 12/2009 | Marks |
| 7,680,287 | B2 | 3/2010 | Amada et al. |
| 7,680,298 | B2 | 3/2010 | Roberts et al. |
| 7,702,130 | B2 | 4/2010 | Im et al. |
| 7,721,231 | B2 | 5/2010 | Wilson |
| 7,823,089 | B2 | 10/2010 | Wilson |
| 7,835,999 | B2 | 11/2010 | Block |
| 7,952,561 | B2 | 5/2011 | Liu et al. |
| 7,975,243 | B2 | 7/2011 | Zheng et al. |
| 8,005,263 | B2 | 8/2011 | Fujimura et al. |
| 8,013,838 | B2 | 9/2011 | Hsu et al. |
| 8,013,926 | B2 | 9/2011 | Shih et al. |
| 8,031,272 | B2 | 10/2011 | Blatchley et al. |
| 8,035,612 | B2 | 10/2011 | Bell et al. |
| 8,064,704 | B2 | 11/2011 | Kim et al. |
| 8,090,151 | B2 | 1/2012 | Yuasa |
| RE43,184 | E | 2/2012 | Lee et al. |
| 8,115,877 | B2 | 2/2012 | Blatchley et al. |
| 8,170,281 | B2 | 5/2012 | Shamaie |
| 8,179,367 | B2 | 5/2012 | Kitaura |
| 8,213,680 | B2 | 7/2012 | Fitzgibbon et al. |
| 8,230,367 | B2 | 7/2012 | Bell et al. |
| 8,232,990 | B2 | 7/2012 | King et al. |
| 8,270,672 | B2 | 9/2012 | Liao |
| 2002/0036617 | A1 | 3/2002 | Pryor |
| 2002/0041260 | A1 | 4/2002 | Grassmann |
| 2002/0057383 | A1 | 5/2002 | Iwamura |
| 2002/0126876 | A1 | 9/2002 | Paul et al. |
| 2002/0149613 | A1 | 10/2002 | Gutta et al. |
| 2002/0186200 | A1 | 12/2002 | Green |
| 2003/0052903 | A1 | 3/2003 | Weast |
| 2003/0081834 | A1 | 5/2003 | Philomin et al. |
| 2003/0097659 | A1 | 5/2003 | Goldman |
| 2003/0214524 | A1 | 11/2003 | Oka |
| 2004/0001082 | A1 | 1/2004 | Said |
| 2004/0189720 | A1 | 9/2004 | Wilson et al. |
| 2004/0193413 | A1 | 9/2004 | Wilson et al. |
| 2004/0201583 | A1 | 10/2004 | Burroughes et al. |
| 2005/0010954 | A1 | 1/2005 | Binder |
| 2005/0063564 | A1 | 3/2005 | Yamamoto et al. |
| 2005/0068423 | A1 | 3/2005 | Bear et al. |
| 2005/0129069 | A1 | 6/2005 | Binder |
| 2005/0132585 | A1 | 6/2005 | Weber et al. |
| 2005/0180561 | A1 | 8/2005 | Binder |
| 2005/0194509 | A1 | 9/2005 | Tsai et al. |
| 2005/0221791 | A1 | 10/2005 | Angelhag |
| 2005/0228673 | A1 | 10/2005 | Nefian et al. |
| 2005/0229222 | A1 | 10/2005 | Relan et al. |
| 2005/0249245 | A1 | 11/2005 | Binder |
| 2005/0281531 | A1 | 12/2005 | Unmehopa |
| 2005/0283812 | A1 | 12/2005 | Soo et al. |
| 2006/0012677 | A1 | 1/2006 | Neven et al. |
| 2006/0067367 | A1 | 3/2006 | Cho et al. |
| 2006/0071135 | A1 * | 4/2006 | Trovato .............. 248/289.11 |
| 2006/0181688 | A1 | 8/2006 | Hoshino et al. |
| 2006/0187331 | A1 | 8/2006 | Watanabe et al. |
| 2006/0192775 | A1 | 8/2006 | Nicholson et al. |
| 2006/0248363 | A1 | 11/2006 | Chen et al. |
| 2006/0288364 | A1 | 12/2006 | Sahasrabudhe et al. |
| 2007/0009139 | A1 | 1/2007 | Landschaft et al. |
| 2007/0060336 | A1 | 3/2007 | Marks et al. |
| 2007/0066882 | A1 | 3/2007 | Maschke |
| 2007/0098250 | A1 | 5/2007 | Molgaard et al. |
| 2007/0124418 | A1 | 5/2007 | Binder |

(56) References Cited

U.S. PATENT DOCUMENTS

| | | | |
|---|---|---|---|
| 2007/0126873 | A1 | 6/2007 | Xu et al. |
| 2007/0126884 | A1 | 6/2007 | Xu et al. |
| 2007/0132725 | A1* | 6/2007 | Kitaura ............... 345/156 |
| 2007/0173202 | A1 | 7/2007 | Binder |
| 2008/0028616 | A1 | 2/2008 | Kwak |
| 2008/0060033 | A1 | 3/2008 | Xiao |
| 2008/0118152 | A1 | 5/2008 | Thorn et al. |
| 2008/0195637 | A1 | 8/2008 | Anegawa et al. |
| 2008/0236014 | A1 | 10/2008 | Chao et al. |
| 2009/0147081 | A1 | 6/2009 | Hanson |
| 2009/0175509 | A1 | 7/2009 | Gonion et al. |
| 2009/0189972 | A1 | 7/2009 | Harris |
| 2010/0122277 | A1 | 5/2010 | Fonseca |
| 2010/0125816 | A1 | 5/2010 | Bezos |
| 2010/0211918 | A1 | 8/2010 | Liang et al. |
| 2010/0281438 | A1 | 11/2010 | Latta et al. |
| 2010/0328498 | A1 | 12/2010 | Yang et al. |
| 2011/0142411 | A1 | 6/2011 | Camp |
| 2011/0199538 | A1 | 8/2011 | Gershfeld |
| 2011/0267258 | A1 | 11/2011 | Wang et al. |
| 2012/0286957 | A1 | 11/2012 | Frechette et al. |

FOREIGN PATENT DOCUMENTS

| | | |
|---|---|---|
| EP | 1813100 | 8/2007 |
| EP | 1863276 | 12/2007 |
| EP | 2008546 | 12/2008 |
| EP | 2265006 | 12/2010 |
| EP | 2362636 | 8/2011 |
| GB | 2475977 | 6/2011 |
| IE | 20060420 A1 | 2/2008 |
| JP | 2006324952 | 11/2006 |
| WO | WO99/56274 | 11/1999 |
| WO | WO02071315 | 9/2002 |
| WO | 2004052225 | 6/2004 |
| WO | 2005048091 | 5/2005 |
| WO | WO2006059843 | 6/2006 |
| WO | 2007029710 | 3/2007 |
| WO | WO2009002758 | 12/2008 |
| WO | WO2010112062 | 10/2010 |
| WO | WO2011003437 | 1/2011 |
| WO | WO2011050475 | 5/2011 |

OTHER PUBLICATIONS

International Search Report of PCT/IL2009/000798 dated Mar. 25, 2010.

Texas Instruments Incorporated, "TMS320DM357 digital Media System-on-Chip", SPRS553—Nov. 2008 (195 pages).

Texas Instruments Incorporated, "VSP2560 VSP2562 VSP2566 CCD Analog Frone-End for Digital Cameras", SBES008—Aug. 2008 (29 pages).

Eastman Kodak Company, KAF-50100 Image Sensor, Device Performance Specification, Revision 2.0 MTD/PS-1071, Oct. 31, 2008 (40 pages).

The CEBus Standard User's guide; by Grayson Evans, 1st Ed., May 1996 (317 pages).

Eastman Kodak Company, KAI-2093 Image Sensor, Device Performance Specification, Revision 3.0 MTD/PS-0307, Mar. 19, 2007 (36 pages).

Jim Zyren, Eddie Enders, Ted Edmondson "IEEE 802.11g Offers Higher Rates and Longer Range", Intersil Ltd (15 pages).

Intel Corporation "54 Mbps IEEE 802.11 Wireless LAN at 2.4 GHz", Nov. 2002 (8 pages).

Laerence Rigge, Tony Grewe, "802.11 Wireless Chip Set Technology White Paper" Agere Systems, Inc., Apr. 2003 (12 pages).

Standard Microsystems Corporation (SMSC) "LAN91C111 10/100 Non-PCI Ethernet Single Chip MAC + Phy" Data-Sheet, Rev. 15 (Feb. 20, 2004) (127 pages).

Agere Systems, Inc. "WaveLAN WL60400 Multimode Wireless LAN Media Access Controller (MAC)", Product Brief Aug. 2003 (10 pages).

Agere Systems, Inc. "WaveLAN 802.11a/b/g Chip Set", Product Brief Feb. 2003 (6 pages).

Agere Systems, Inc. "WaveLAN WL64040 Multimode Wireless LAN Baseband", Product Brief Sep. 2003 (4 pages).

Agere Systems, Inc. "WaveLAN WL54040 Dual-Band Wireless LAN Transceiver", Product Brief Sep. 2003 (4 pages).

Intellon Corporation, "INT6000 HomePlug AV High-Speed Powerline Solution", Product Brief 2008 (2 pages).

Intellon Corporation, "HomePlug AV Technology Overview", Document # 26002829 Revision 2, 2008 (2 pages).

HomePlug Powerline Alliance, Inc., "HomePlug AV White Paper", Document # HPAVWP-05-818, 2005 (11 pages).

Analog Devices Inc., "ADV212 JPEG 2000 Video Codec" Data Sheet, 2006 (44 pages).

"Universal Powerline Bus: The UPB System Description", Version 1.1 dated Sep. 19, 2003.

"LAN83C180 10/100 Fast Ethernet PHY Transceiver" available from SMSC—Standard Microsystems Corporation of Hauppauge, NY U.S.A, Aug. 24, 2001.

* cited by examiner

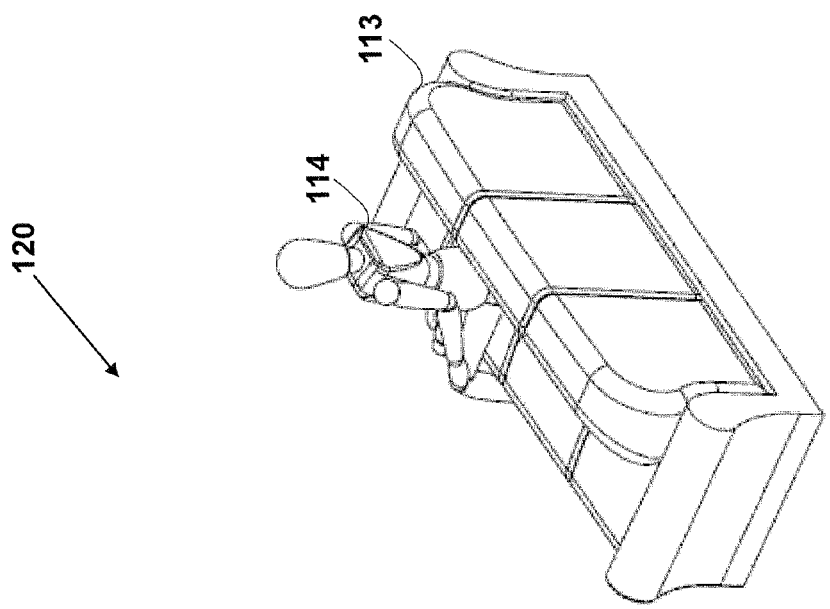
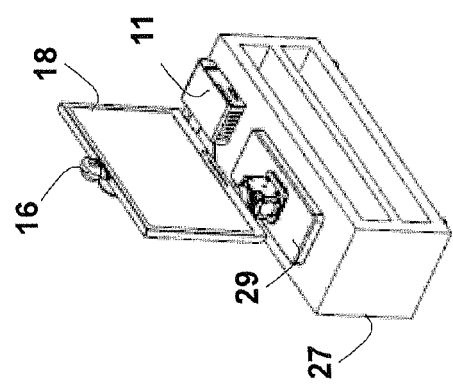
Figure 12

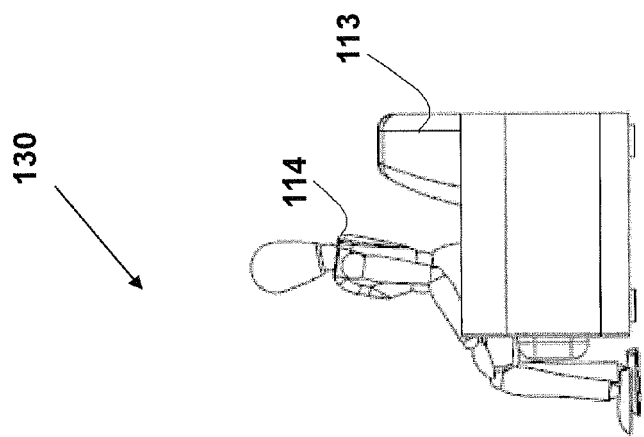
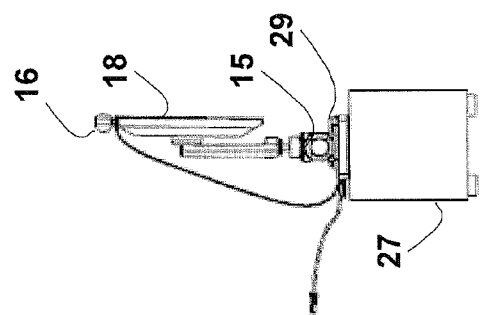
Figure 13

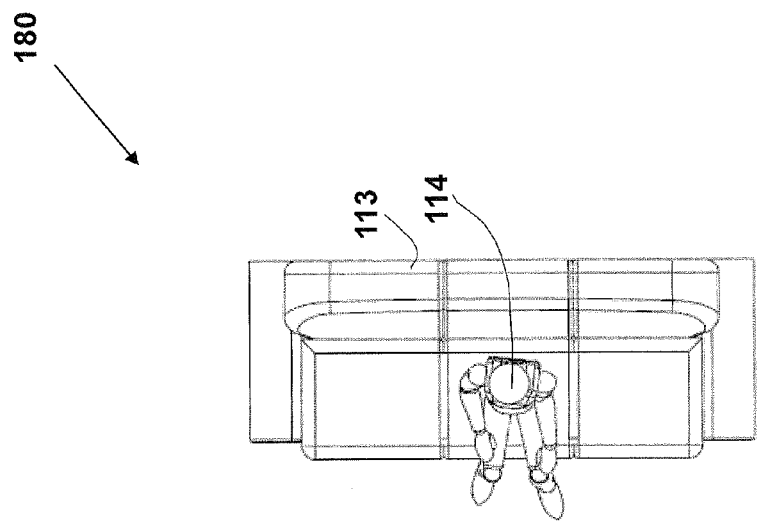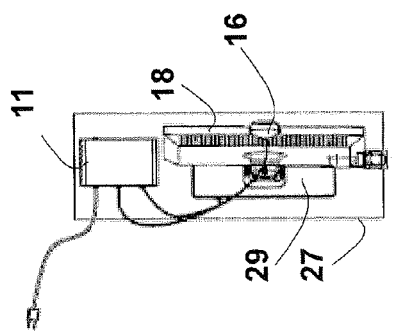
Figure 18

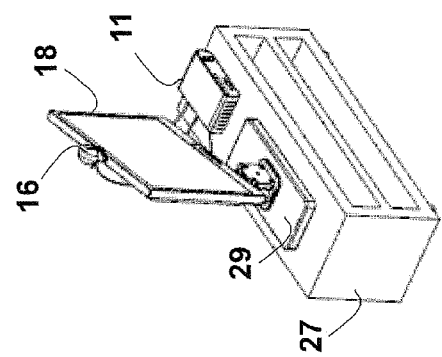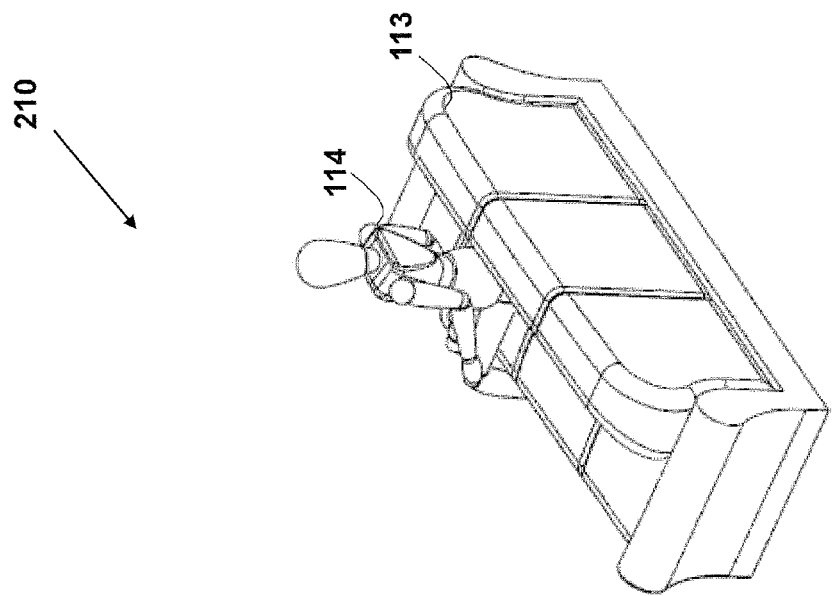
Figure 21

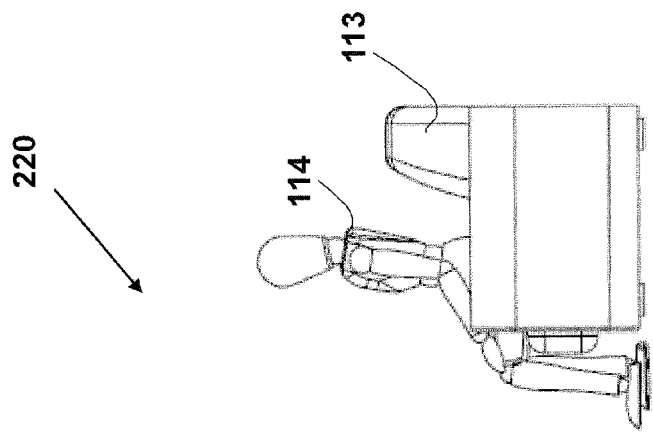
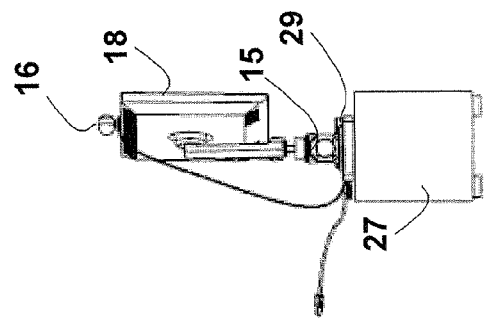
Figure 22

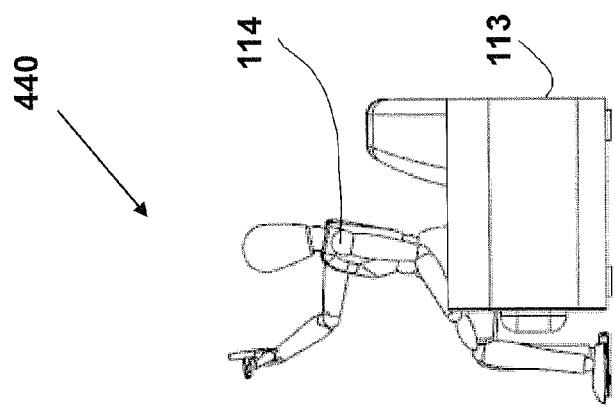
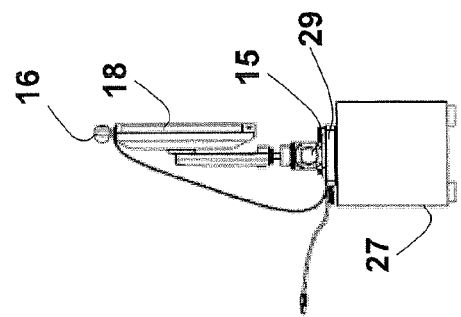
Figure 44

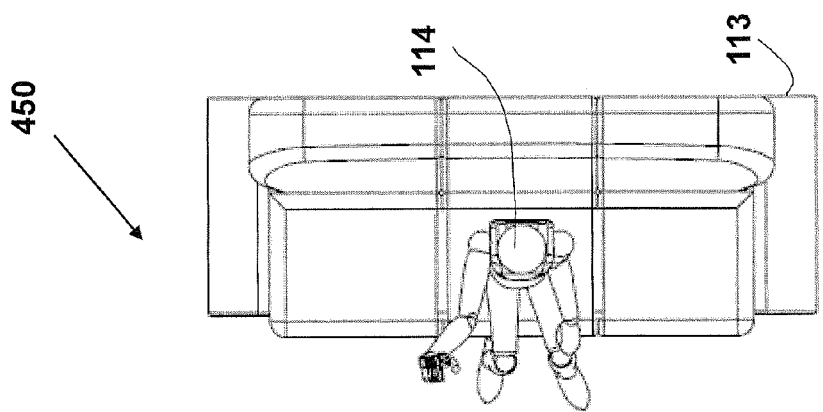
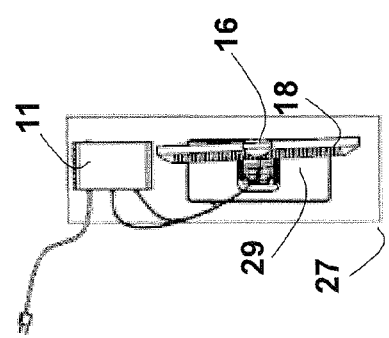
Figure 45

SYSTEM AND METHOD FOR CONTROL BASED ON FACE OR HAND GESTURE DETECTION

FIELD

The present invention relates generally to devices (such as displays) controlled by face detection.

BACKGROUND

In most display devices, the best visual quality is obtained when the observer is exactly in front of the surface wherein the image is displayed, thus having the widest angular field of view and maximum perceived area. Further, in many types of displays (such as LCD and plasma based panels), the luminance and the contrast are decreased when the viewing direction is deviated from the direction which is vertical to the display surface, both in the inclination and azimuth directions. In some cases, a viewing cone is defined, limiting the available directions from which the image can be viewed. ISO 13406-21 titled "Ergonomic requirements for work with visual displays based on flat panels—Part 2: Ergonomic requirements for flat panel displays" provides a classification of Viewing Direction Range Classes and Reflection Classes.

An autorotative digital photo frame adapted to allow the frame to be adjusted to the same direction as the photo is disclosed in U.S. Patent Application Publication 2008/0236014 to Chao et al. entitled: "Autorotative Digital Photo Frame", which is incorporated in its entirety for all purposes as if fully set forth herein.

In consideration of the foregoing, it would be an advancement in the art to provide a method and system that is simple, cost-effective, faithful, reliable, has a minimum part count, minimum hardware, or uses existing and available components allowing convenient or better control or visualization of a device, and in particular a display, such as a television set. Furthermore, it would be highly advantageous to have a method and system providing a simpler, better and easier control of a device without using a remote control.

SUMMARY

In one aspect of the invention a method and apparatus for using face detection functionality for obtaining a good visibility with a screen of a display. A digital camera is attached to a display having a central image captured substantially congruent with the display plane line-of-sight. A face detection algorithm is performed by an image processor, using the image captured by the digital camera to obtain the existence and localization of faces in the captured image. The horizontal deviation of a detected face from the image center line is calculated. The camera and the image processor serve as a sensor providing the horizontal deviation value and direction. A control loop (open or closed) uses the horizontal deviation as an error signal, and a controller command a horizontal motor mechanically affixed to the display to rotate the display in the required direction (and the angular shift required) to correct for the deviation (set point zero). A closed loop may be employed for minimizing the deviation continuously.

In one aspect of the invention, the vertical deviation of a detected face from the image center line is calculated. The camera and the image processor serve as a sensor providing the vertical deviation value and direction. A control loop (open or closed) uses the vertical deviation as an error signal, and a controller command a vertical motor mechanically affixed to the display to rotate the display in the required direction (and the angular shift required) for inclinator to correct for the deviation (set point zero). A closed loop may be employed for minimizing the deviation continuously.

In one aspect of the invention, both the vertical and horizontal deviations of a detected face from the image center line are calculated. The camera and the image processor serve as a sensor providing the vertical and horizontal deviations values and directions. Independent vertical and horizontal control loops (each may be open or closed) are used, each uses the respective deviation as an error signal, and a controller command a respective vertical or horizontal motor mechanically affixed to the display to rotate the display in the direction required (and the angular shift required) to correct for the deviation (set point zero). A closed loop may be employed for minimizing the deviation continuously.

In one aspect of the invention, a negative feedback control loop is used. Further, a linear control loop may be used. Further, the loop may use a proportional-only control loop, or PID (Proportional, Integral, Derivative) control loop.

According to one aspect of the invention, a method for improving the angular field of view of a person watching a display having a screen is described, the method comprising the steps of capturing an image across the display screen, converting the image into a digital data form, detecting a human face in the captured image using image processing algorithm, calculating the deviation between the detected face location in the captured image and the image center, and rotating the display in the direction required to reduce the calculated deviation. The steps may be executed once or executed, repeatedly until the calculated deviation is smaller than a pre defined value, thus implementing a linear feedback control loop, wherein the error is the calculated deviation, the set point is zero and the angular rotation of the display is the actuator controlled by the loop. The loop may be a linear proportional control loop only, wherein the amount of angular rotation is proportional to the calculated deviation, or a PID (Proportional, Integral and Derivative) control loop wherein the amount of angular rotation is calculated based on proportional, integral and derivative computations of the calculated deviation.

The method may be handling only the horizontal positioning, wherein the horizontal deviation is calculated in the captured image, and wherein the rotation of the display is in the horizontal plane, or handling only the vertical positioning, wherein the vertical deviation is calculated in the captured image, and wherein the rotation of the display is in the vertical plane, or handling both vertical and horizontal functions.

If no human face is detected, no rotation is executed. If two or more human faces are detected in the captured image, then the average point of the detected faces is calculated, and the deviation is calculated between the average point and the image center.

According to one aspect of the invention, an apparatus for improving the angular field of view of a person watching a display having a screen is described. The apparatus comprising a digital camera for capturing an image in a digital data form, the camera is mechanically attached to the display and oriented to capture the view substantially across the display screen, an image processor coupled to receive the image in a digital data form from the digital camera, for applying face detection algorithm to detect and locate a human face location in the captured image, and a motor mechanically attached to the display for angularly rotating the display, wherein the apparatus is operative to rotate the motor in response to the location of the detected face in the captured image. The apparatus may further comprise a firmware or software and a controller executing the firmware or software coupled between the digital camera and the motor for commanding the motor (which may be a stepper motor) rotation in response to the location of the detected face in the captured image.

The deviation may be calculated between the detected face location and the image center, and wherein the motor angular rotation is based on the calculated deviation. Further, no motor rotation may be required in the case wherein the calculated deviation is smaller than a pre defined value. The apparatus may continuously rotate the motor in response to the location of the detected face in the captured image, defining a defining a linear feedback control loop, wherein the error is the calculated deviation, the set point is zero and the angular rotation of the display is the actuator controlled by the loop. The control loop may be a linear proportional control loop, wherein the amount of angular rotation is proportional to the calculated deviation, or a PID (Proportional, Integral and Derivative) control loop wherein the amount of angular rotation is calculated based on proportional, integral and derivative computations of the calculated deviation.

The apparatus may handle only the horizontal plane wherein the horizontal deviation is calculated in the captured image and wherein the motor is attached to effect display rotation in the horizontal plane. Alternatively, the apparatus may handle only the vertical plane wherein the vertical deviation is calculated in the captured image and wherein the motor is attached to effect display rotation in the vertical plane. Alternatively both planes are handled simultaneously.

In the case wherein two or more human faces are detected in the captured image, then the average point of the detected faces is calculated by the image processor, the deviation is calculated between the average point and the image center.

According to one aspect of the invention, a method for controlling a device based on face detection is described, comprising the steps of capturing an image, converting the image into a digital data form, using image processing algorithm for detecting a human face in the captured image, and providing a control signal in response to the detection of a human face in the captured image. These steps can be executed once or executed repeatedly, and may further include waiting a pre-set period before repeating the steps.

The method may control supplying power to the device is response to the detection of a human face in the captured image, or control disconnecting power to the device is response to not detecting a human face in the captured image.

The device may be a display or a television set, and the image may be captured substantially across the display screen. Further, the display may be blanked in response to not detecting a human face in the captured image.

Further, the control signal may be generated in response to detecting a human face in the captured image for a pre-defined period or lacking of such detection. Further, a first control signal may generated in response to not detecting a human face in the captured image for a first pre-defined period, and a second control signal may be generated in response to detecting a human face in the captured image for a second pre-defined period.

The control signal may involve supplying power to the device, wherein the control signal involves disconnecting power to the device or part of the device circuits.

According to one aspect of the invention, an apparatus for face detection based control of a device is described, comprising a digital camera for capturing an image in a digital data form, an image processor coupled to receive the image in a digital data form from the digital camera, for applying a face detection algorithm to detect a human face occurrence in the captured image, and a controller coupled to the image processor for generating a control signal is response to the detection of a human face in the captured image. The apparatus may further comprise a firmware or software and the controller is executing the firmware or software, and the camera may be mechanically attached to the controlled device. Further, the image processor and the controller may be housed within a single enclosure.

The apparatus may further comprise a switch actuated by said control signal and the switch may be connected between a power source and the device, for powering the device is response to the control signal. Thus, the apparatus may actuate the switch for supplying power to the device in response to the detection (or lack of detection or both) of a human face in the captured image. The switch may be housed within the device enclosure. Further, the apparatus may use one or two timers for signaling a pre-set first period coupled or within the controller, such that the control signal is generated in response to detecting (or lack of detecting or both) a human face in the captured image for a pre-defined period. Further, the control signal may involve supplying power or disconnecting power to or from the device. The device may be a display, and the camera may be positioned such that the image captured is substantially across the display screen, and the display may be blanked in response to not detecting a human face in the captured image.

According to one aspect of the invention, a method for controlling a device based on hand gesture detection is described, the method comprising the steps of capturing an image, converting the image into a digital data form, using image processing algorithm for detecting a hand gesture in said captured image, and providing a control signal in response to the detection of the hand gesture in said captured image. These steps can be executed one time or executed repeatedly, with or without waiting a pre-set period before repeating the steps. The method may further comprise the step of supplying or disconnecting power to the device is response to the detection of a hand gesture in said captured image. The device may be a display or a television set, and the image captured may be substantially across the display screen. Further, the display may be blanked in response to not detecting a hand gesture in the captured image.

One or more control signals may be generated, in response to detecting or not detecting a hand gesture in said captured image for a pre-defined period. The control signal may involve supplying power or disconnecting power (or both) to the device.

The hand gesture may involve extending a single finger, multiple or all fingers. One or multiple pre-defined hand gesture can be detected and a dedicated control may be associated with each detected hand gesture.

The method may be combined with the step of using image processing algorithm for detecting a human face in said captured image, and a control signal may be provided only in response to the detection of both the hand gesture and detecting a human face in said captured image. Further, only a specific area in the image may be analyzed for hand gesture detection, based on the location of the detected face.

According to one aspect of the invention, an apparatus for hand gesture detection based control of a device is described, comprising a digital camera for capturing an image in a digital data form, an image processor coupled to receive the image in a digital data form from the digital camera, for applying hand gesture detection algorithm to detect a hand gesture occurrence in the captured image, and a controller coupled to the image processor for generating a control signal is response to the detection of a hand gesture in the captured image. The apparatus may further comprise a firmware or software and the controller is executing the firmware or software, and the camera may be mechanically attached to the controlled device. Further, the image processor and the controller may be housed within a single enclosure.

The apparatus may further comprise a switch actuated by said control signal and the switch may be connected between a power source and the device, for powering the device is response to the control signal. Thus, the apparatus may actuate the switch for supplying power to the device in response to the detection (or lack of detection or both) of a hand gesture in the captured image. The switch may be housed within the device enclosure. Further, the apparatus may use one or two timers for signaling a pre-set first period coupled or within the controller, such that the control signal is generated in response to detecting (or lack of detecting or both) a hand gesture in the captured image for a pre-defined period. Further, the control signal may involve supplying power or disconnecting power to or from the device. The device may be a display, and the camera may be positioned such that the image captured is substantially across the display screen, and the display may be blanked in response to not detecting a hand gesture in the captured image.

One or more control signals may be generated, in response to detecting or not detecting a hand gesture in said captured image for a pre-defined period. The control signal may involve supplying power or disconnecting power (or both) to the device.

The hand gesture may involve extending a single finger, multiple or all fingers. One or multiple pre-defined hand gesture can be detected and a dedicated control may be associated with each detected hand gesture.

The apparatus may be combined with image processing algorithm for detecting a human face in said captured image, and a control signal may be provided only in response to the detection of both the hand gesture and detecting a human face in said captured image. Further, only a specific area in the image may be analyzed for hand gesture detection, based on the location of the detected face.

The camera may be mechanically attached to the display or be a separate device housed within a separate enclosure. The digital data representing the captured image is transmitted from the camera over a communication medium to an image processor in a control box. The control box receives the digital data from the communication medium and processes it. In this scenario, the camera includes a transmitter (or a transceiver) for transmitting the image digital data to the communication medium, and the control box includes a receiver (or a transceiver) for receiving the digital data from the communication medium. In one aspect according to the invention, the video signal is carried in an analog form over the communication medium, respectively using an analog transmitter and an analog receiver.

The communication between the camera assembly and the image processor, as well as the communication between the control box and the controlled unit, can be non-conductive over-the-air wireless, using radio, audio or light based communication, and use various WLAN, WPAN and other technologies. The wireless communication may use a spread-spectrum signal such as multi-carrier (e.g. OFDM, DMT and CDMA), or a single carrier (narrow-band) signal.

Each of the wireless signals or the wireless communication links above may be WPAN, WLAN, WMAN, WAN, BWA, LMDS, MMDS, WiMAX, HIPERMAN, IEEE802.16, Bluetooth, IEEE802.15, IEEE802.11 (such as a, b and g), UWB, ZigBee and cellular such as GSM, GPRS, 2.5G, 3G, UMTS, DCS, PCS and CDMA. Similarly, each of the frequency bands above may be part of the ISM frequency bands.

Alternatively, the power and communication signals may be carried over the same wires using Frequency Division Multiplexing (FDM), wherein the power signal is carried over a power frequency, and wherein the communication signal is carried over a communication frequency band distinct and above the power frequency. In this case, the device may further include a low pass filter coupled between the connector and the transmitter for substantially passing only the power frequency, for powering the transmitter from the power signal. Such device may also further include a high pass filter coupled between the connector and the transmitter for substantially passing only the communication frequency band, for passing the communication signal between the connector and the transmitter. In the case where power is AC power, the connector may be an AC power plug for connecting to AC power wiring, and the transmitter may be part of a powerlines modem, such as HomePlug or UPB.

Further, such communication can use a conductive medium such as cables or wires, or any other metallic medium. Standard PAN or LAN cabling and protocols may be used, such as Ethernet 10/100/1000BaseT. In one embodiment, powerline communication is used wherein the AC power wiring is used as the communication medium.

In another aspect of the present invention, a lossy or non-lossy compression of the image information is used for reducing the memory size and reducing the data rate required for the transmission over the communication medium.

According to one aspect of the invention, the face detection or the hand gesture detection (or both) are used to control devices other than a display.

In one aspect of the invention, the communication medium between the camera assembly and the image processor, or the communication between the control box and the controlled unit or both communication links, is a wired medium, and a transmitter is used as a wired transmitter adapted to transmit digital data to the wired medium. The communication over the wired medium may be according to a wired PAN (Personal Area Network) or a LAN (Local area Network) standard, and may further be based on serial or parallel transmission. For example, the wired medium may be a LAN cable substantially according to EIT/TIA-568 or EIA/TIA-570 containing a UTP (unshielded Twisted Pair) or STP (Shielded Twisted Pair). In such case the connector is an RJ-45 type, and the communication over the cable may substantially conform to IEEE802.3 Ethernet 10BaseT or 100BaseTX or 1000BaseT, and the transmitter may be a LAN transceiver. In an alternative aspect, the wired transmitter and the connector substantially conform to one out of IEEE1394, USB (Universal Serial Bus), EIA/TIA-232 and IEEE1284.

In one aspect of the invention, the communication between the camera assembly and the image processor, or the communication between the control box and the controlled unit or both communication links, uses a wired medium such as a cable. Further, the cable concurrently carries a power signal, and the device is at least in part powered from the power signal. The power signal may be a DC (Direct Current) power signal, or an AC (Alternating Current) power signal. The cable may contain multiple insulated wires, and the power signal may be carried over dedicated wires distinct from the wires carrying the communication signal. In the case wherein the cable contains multiple insulated wires, and the wires are used to simultaneously carry both power and communication signals, the power and communication signals are carried over the same wires. In such a case the power may be a DC power carrying over a phantom channel over the wires. For example, the cable may be a LAN cable substantially according to EIT/TIA-568 or EIA/TIA-570 and containing UTP or STP twisted-pairs, the connector may be RJ-45 type, the communication over the cable may substantially conform to IEEE802.3 Ethernet 10BaseT, 100BaseTX, or 1000BaseT, the transmitter may be a LAN transceiver, and the power may be carried over the cable substantially according to IEEE802.3af or IEEE802.3 at standards.

In another aspect of the present invention, a single cable is used to connect between the camera assembly and the image processor, or between the control box and the controlled unit or both. The cable simultaneously carries both the communication signal for displaying the captured image on the display, and a power signal. The power signal can be fed from the control box to power the camera, or alternately fed from the camera to power the control box. Carrying both the power and data signals over the same cable can make use of distinct separated wire sets, each set dedicated to one type of a signal. Alternatively, the same wires can carry both signals each over a different frequency band (FDM) or using phantom technique.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

It is understood that other embodiments of the present invention will become readily apparent to those skilled in the art from the following detailed description, wherein are shown and described only embodiments of the invention by way of illustration. As will be realized, the invention is capable of other and different embodiments and its several details are capable of modification in various other respects, all without departing from the scope of the present invention as defined by the claims. Accordingly, the drawings and detailed description are to be regarded as illustrative in nature and not as restrictive.

The above and other features and advantages of the present invention will become more fully apparent from the following description, drawings and appended claims, or may be learned by the practice of the invention as set forth hereinafter. It is intended that all such additional apparatus and advantages be included within this description, be within the scope of the present invention, and be protected by the accompanying claims.

BRIEF DESCRIPTION OF THE DRAWINGS

In order that the manner in which the above recited and other advantages and features of the invention are obtained, a more particular description of the invention briefly described above will be rendered by reference to specific embodiments thereof, which are illustrated in the appended figures and drawings. The invention is herein described, by way of non-limiting example only, with reference to the accompanying figures and drawings, wherein like designations denote like elements. Understanding that these drawings only provide information concerning typical embodiments of the invention and are not therefore to be considered limiting in scope:

FIG. 12 illustrates schematically a perspective view of a room with a system according to the invention;

FIG. 13 illustrates schematically a side view of a room with a system according to the invention;

FIG. 18 illustrates schematically a top view of a room with a system according to the invention;

FIG. 21 illustrates schematically a perspective view of a room with a system according to the invention;

FIG. 22 illustrates schematically a side view of a room with a system according to the invention;

FIG. 44 illustrates schematically a side view of a room according to the invention;

FIG. 45 illustrates schematically a top view of a room according to the invention;

DETAILED DESCRIPTION OF EMBODIMENTS

Figure 1:
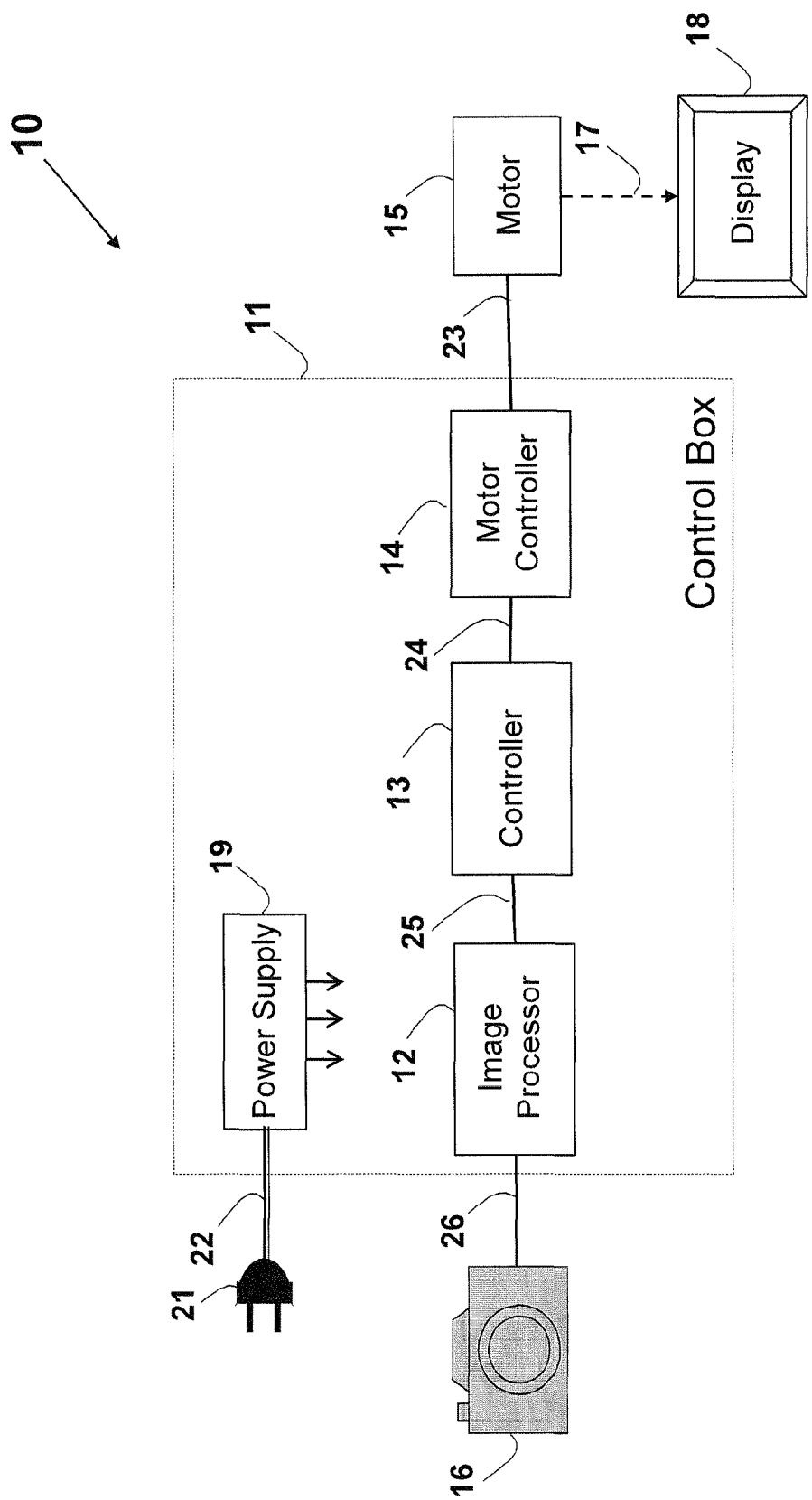
FIG. 1 illustrates schematically a simplified general functional block diagram of a system according to the invention.

The principles and operation of a network according to the present invention may be understood with reference to the figures and the accompanying description wherein similar components appearing in different figures are denoted by identical reference numerals. The drawings and descriptions are conceptual only. In actual practice, a single component can implement one or more functions; alternatively, each function can be implemented by a plurality of components and circuits. In the figures and descriptions, identical reference numerals indicate those components that are common to different embodiments or configurations. Identical numerical references (even in the case of using different suffix, such as 5, 5a, 5b and 5c) refer to functions or actual devices that are either identical, substantially similar or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention.

Figure 2:
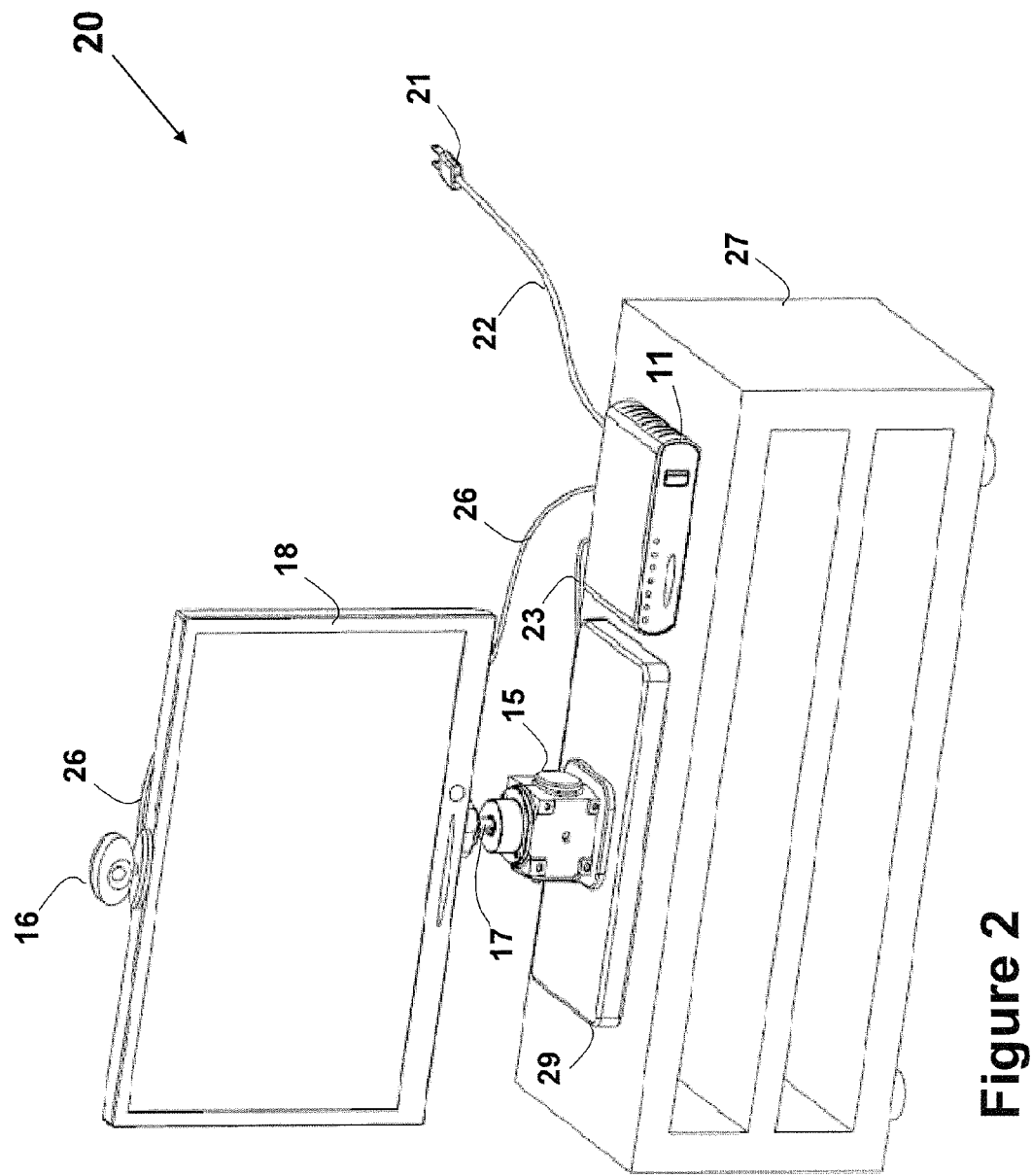
FIG. 2 illustrates schematically a perspective front view of a system according to the invention.
Figure 3:
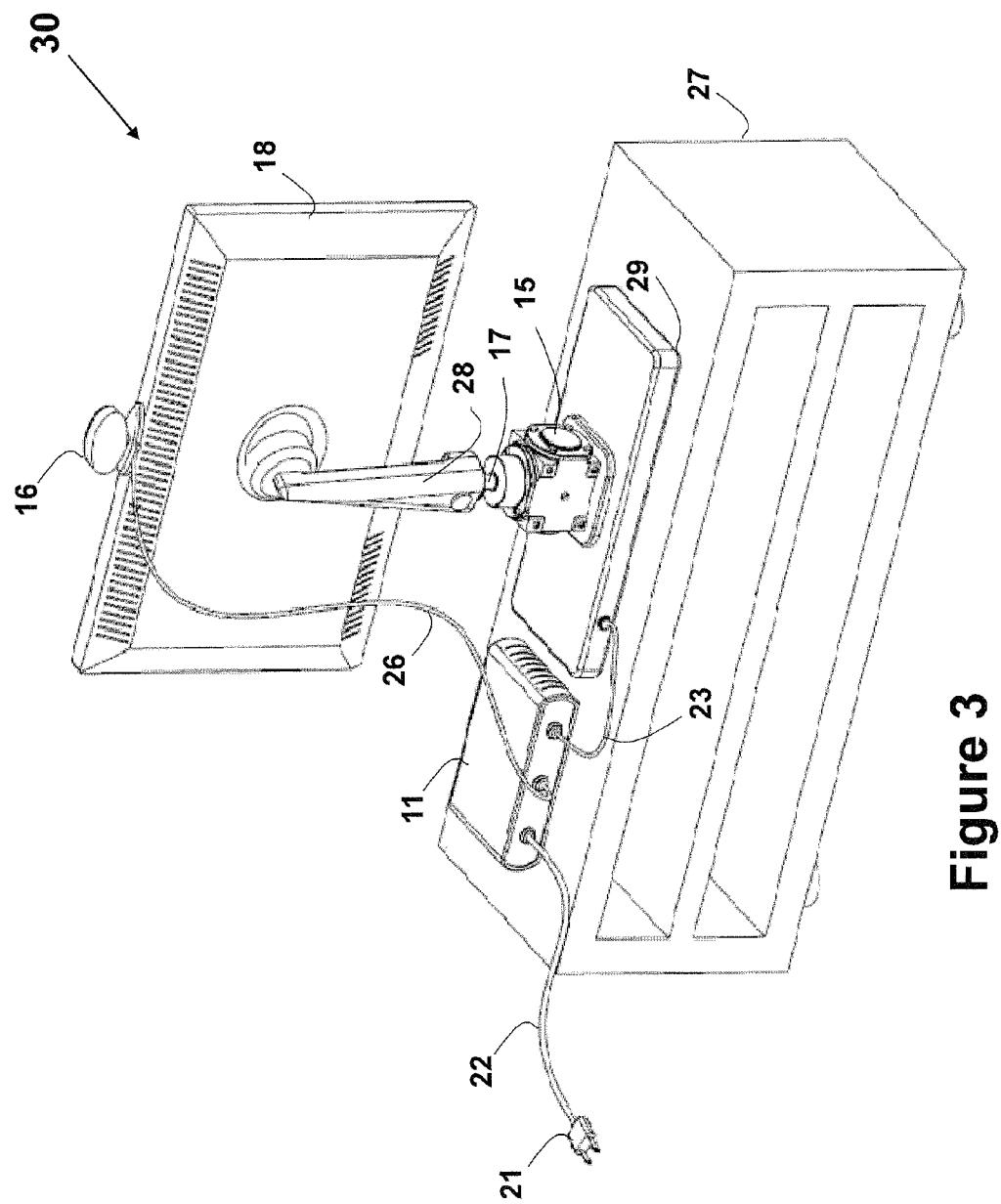
FIG. 3 illustrates schematically a perspective rear view of a system according to the invention.
Figure 4:
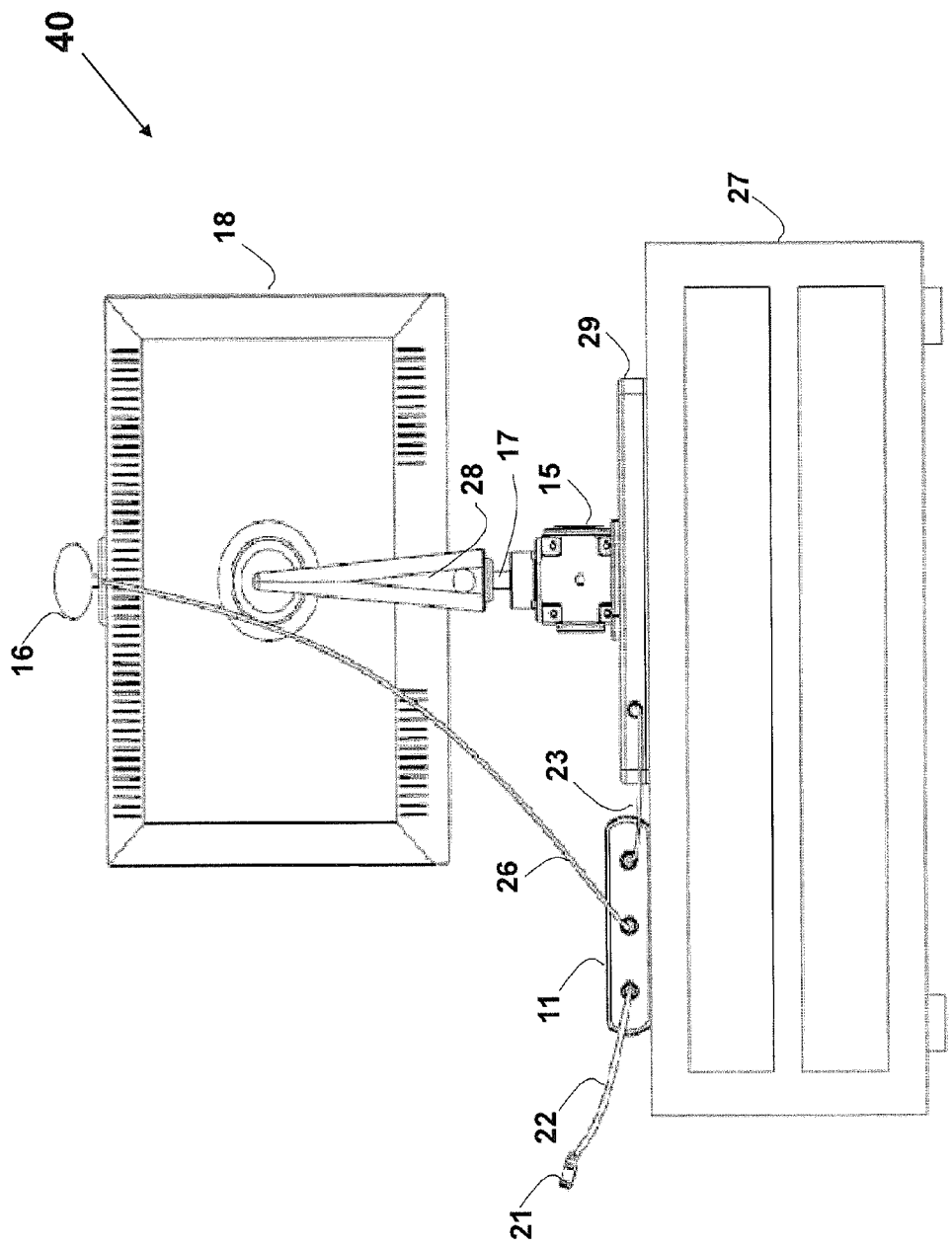
FIG. 4 illustrates schematically a rear view of a system according to the invention.
Figure 5:
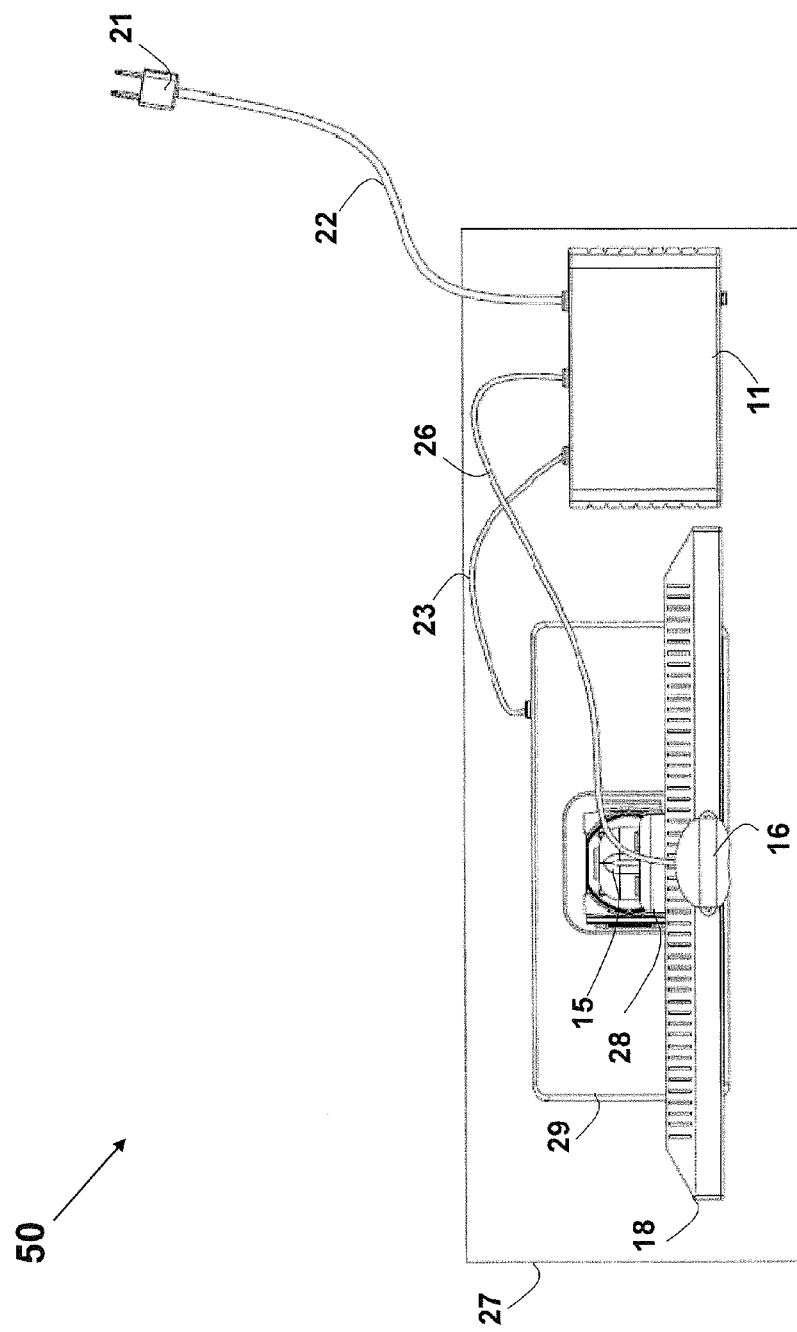
FIG. 5 illustrates schematically a top view of a system according to the invention.
Figure 6:
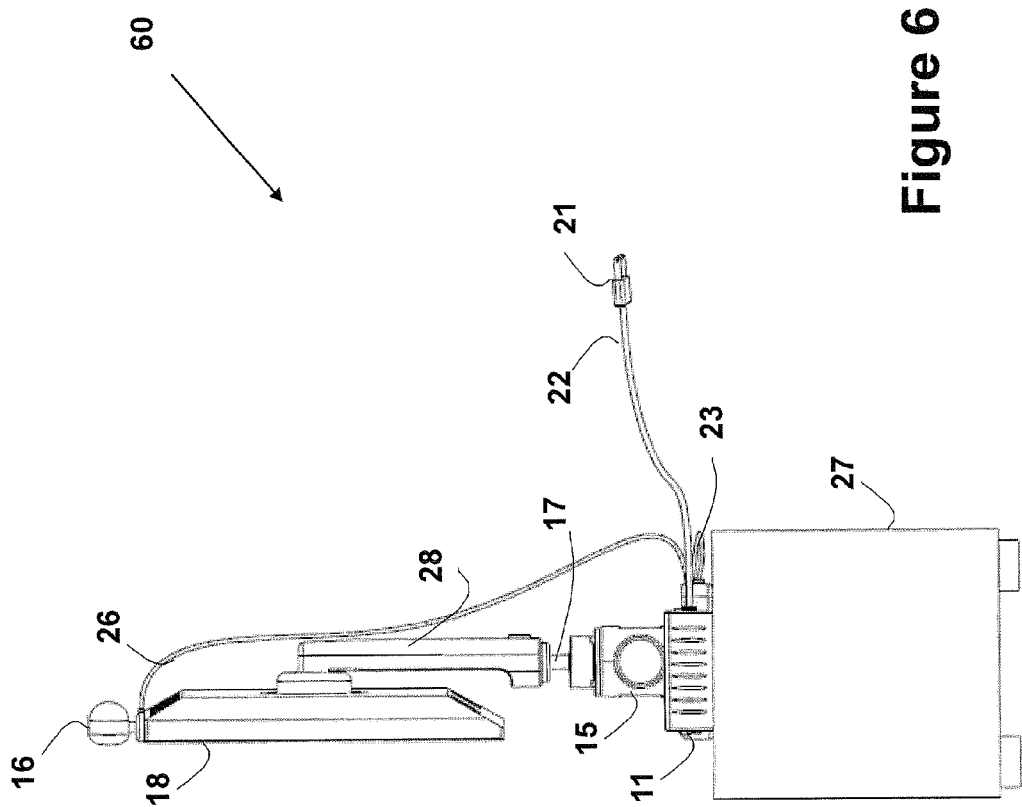
FIG. 6 illustrates schematically a side view of a system according to the invention.

FIG. 1 is a schematic block diagram of a system 10 according to one embodiment of the invention. A pictorial front perspective view 20 of the system is shown in FIG. 2, a rear perspective view 30 is shown in FIG. 3, a rear view 40 is shown in FIG. 4, an up view 50 is shown in FIG. 5 and side view 60 is shown in FIG. 6.

The invention is exampled with regard to a flat panel display 18, for example a LCD television set. However, any other electronic display or any other output device used for presentation of visual information may be equally used. Common applications for electronic visual displays used to be television sets or computer monitors. The display 18 may be a digital or analog video display, and may use technologies such as LCD (Liquid Crystal Display), TFT (Thin-Film Transistor), FED (Field Emission Display), CRT (Cathode Ray Tube) or any other electronic screen technology that visually shows information such as graphics or text. In many cases, an adaptor (not shown) is required in order to connect an analog display to the digital data. For example, the adaptor may convert to composite video (PAL, NTSC) or S-Video or HDTV signal. Various user controls can be available to allow the user to control and effect the display unit 18 operations, such as an on/off switch, a reset button and others. Other exemplary controls involve display-associated settings such as contrast, brightness and zoom.

Analog displays are commonly using interfaces such as composite video such as NTSC, PAL or SECAM formats. Similarly, analog RGB, VGA (Video Graphics Array), SVGA (Super Video Graphics Array), SCART, S-video and other standard analog interfaces can be used. Further, personal computer monitors, plasma or flat panel displays, CRT, DLP display or a video projector may be equally used. Standard digital interfaces such as a IEEE1394 interface, also known as FireWire™, may be used. Other digital interfaces that can be used are USB, SDI (Serial Digital Interface), FireWire, HDMI (High-Definition Multimedia Interface), DVI (Digital Visual Interface), UDI (Unified Display Interface), DisplayPort, Digital Component Video and DVB (Digital Video Broadcast).

Display 18 is mechanically mounted using a pedestal 28 attached to the rear part of the display 18. The pedestal 28 is attached to an axis 17 of the electric motor 15. The motor 15 converts electrical energy into rotational motion of its axis. The torque applied to the motor axis 17 rotates the display 18 horizontally via the pedestal 28 around its vertical center. This allows rotating and positioning the display 18 as required by controlling the electric motor 15. The motor 15 is mounted on and fixed to base 29 which is placed on drawer's chest 27. The base 29 provides support to the mechanical assembly including the display 18, pedestal 28 and the motor 15. The electric motor 15 is controlled and powered by control box 11, and connected thereto via cable 23 (shown connected via the base 29).

Figure 8:
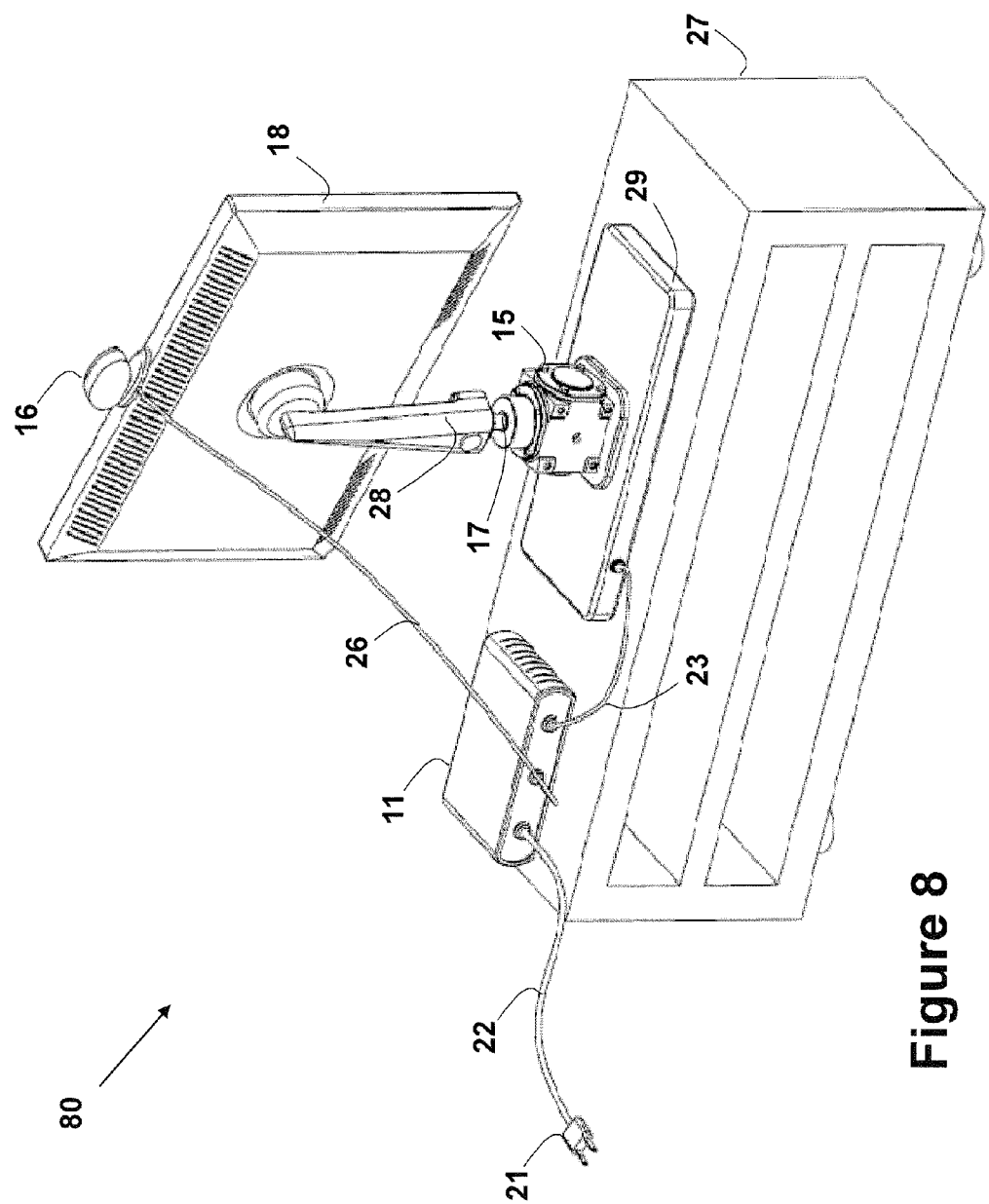
FIG. 8 illustrates schematically a rear view of a system according to the invention.
Figure 9:
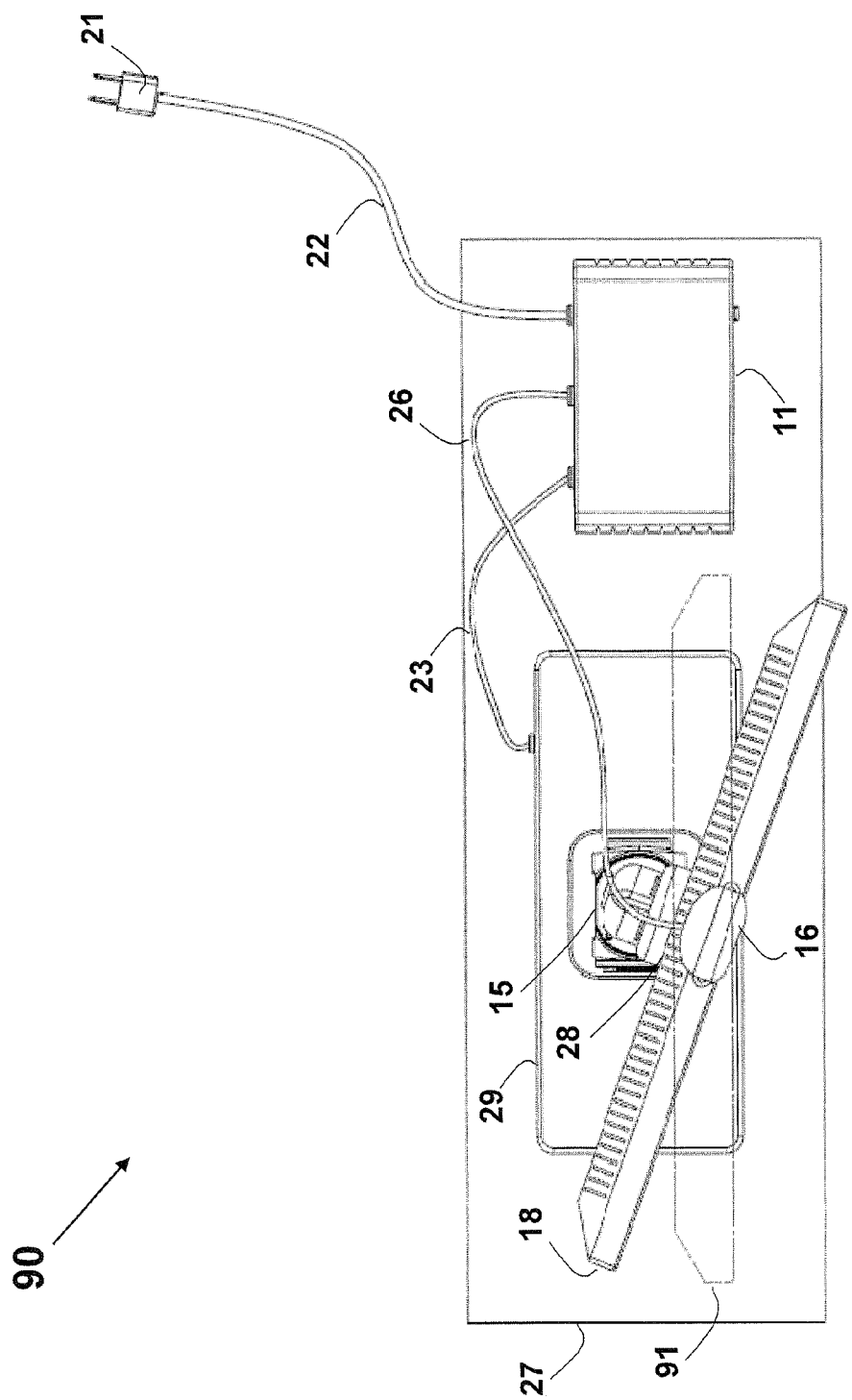
FIG. 9 illustrates schematically a top view of a system according to the invention.

FIG. 8 shows a perspective rear view 80 and FIG. 9 shows an up view 90 of the system after angular rotating of the display 18 by the motor 15 from the original position shows as dashed lines 91 in FIG. 9.

The electric motor 15 can be of Alternating Current (AC) or Direct Current (DC) powered type. In the case of AC powered motor, the motor may be either synchronous or induction type. In the case of a DC powered motor, the motor may either be a brushless or stepper type. The motor is controlled by motor controller 14 in the control box 11. The motor controller 14 might include a manual or automatic means for starting and stopping the motor, selecting forward or reverse rotation, selecting and regulating the speed, regulating or limiting the torque, and protecting against overloads and faults. An electric motor controller is commonly suited to the type of motor it is to drive such as permanent magnet, servo, series, separately excited, and alternating current.

A system according to one embodiment of the invention comprises an electronic camera 16. The camera 16 is attached to the display 18. Preferably, the camera 16 is attached to the display 18 such that the camera 16 center line-of-sight is substantially parallel to the display 18 center line of sight, so that the center of the image captured by the camera 16 is congruent with a perpendicular line erecting from the center panel of the display 18. Camera 16 may be a still camera which converts captured image into an electric signal upon a specific control, or can be a video camera, wherein the conversion between captured images to an electronic signal is continuous (e.g. 24 frames per second) and is preferably a digital camera. Camera 16 is preferably a digital camera, wherein the video or still images are converted using electronic image sensor. An electronic signal representing the captured image is transmitted from the camera 16 to the image processor 12 in the control box 11 via cable 26. The signal may be a digital or analog signal.

Figure 7:
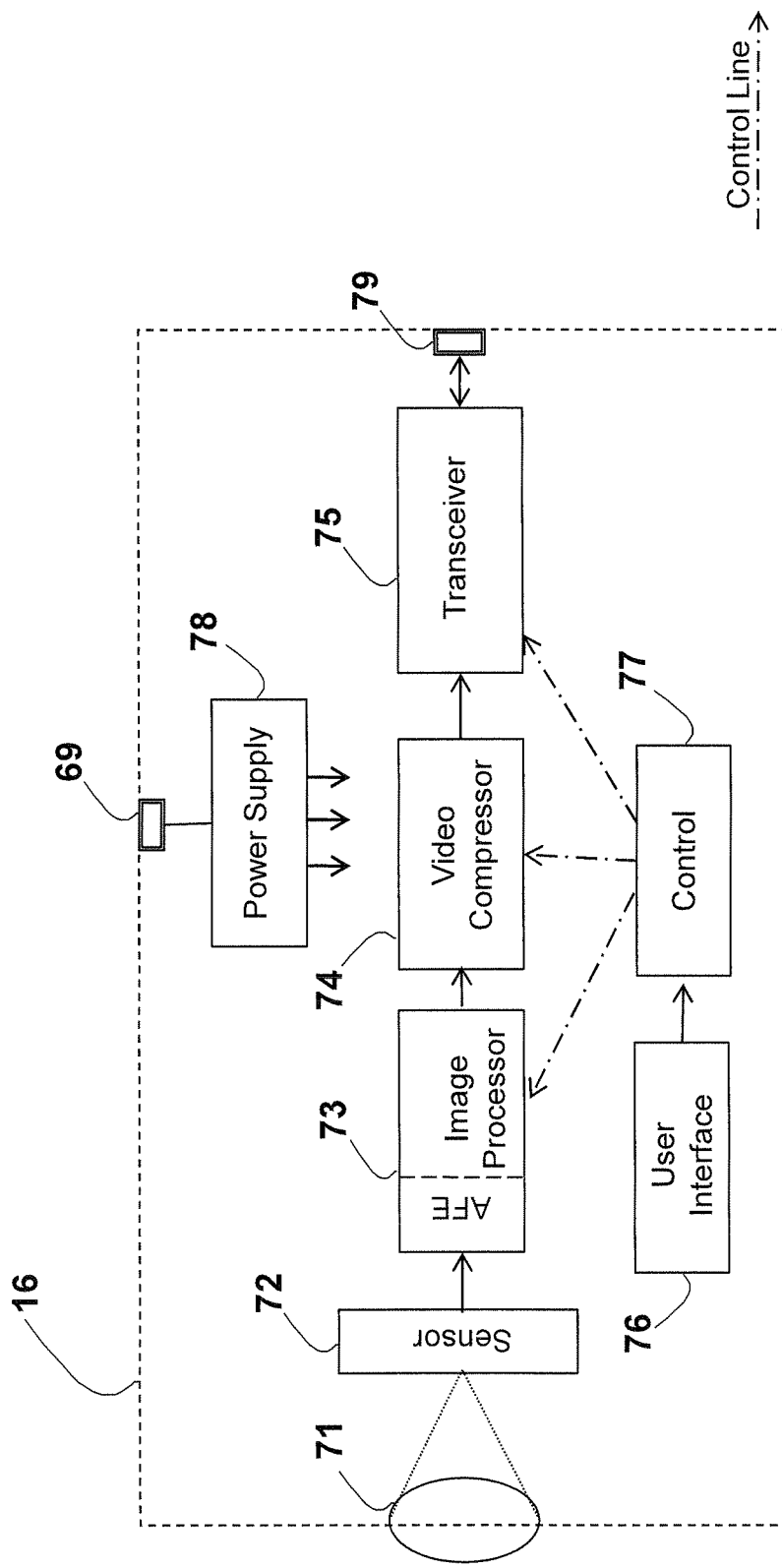
FIG. 7 illustrates schematically a simplified general functional block diagram of a prior-art electronic camera.

Block diagram of such digital camera 16 is shown in FIG. 7, showing lens 71 (or few lenses) for focusing the received light onto a small semiconductor sensor 72. The sensor 72 commonly includes a panel with a matrix of tiny light-sensitive diodes (photocells), converting the image light to electric charges and then to electric signals, thus creating a video picture or a still image by recording the light intensity. Charge-Coupled Devices (CCD) and CMOS (Complementary Metal-Oxide-Semiconductor) are commonly used as the light-sensitive diodes. Linear or area arrays of light-sensitive elements may be used, and the light sensitive sensors may support monochrome (black & white), color or both. For example, the CCD sensor KAI-2093 Image Sensor 1920 (H) X 1080 (V) Interline CCD Image Sensor or KAF-50100 Image Sensor 8176 (H) X 6132 (V) Full-Frame CCD Image Sensor can be used, available from Image Sensor Solutions, Eastman Kodak Company, Rochester, N.Y..

An image processor block 73 receives the analog signal from the image sensor. The Analog Front End (AFE) in the block 73 filters, amplifies and digitizes the signal, using an analog-to-digital (A/D) converter. The AFE further provides correlated double sampling (CDS), and provides a gain control to accommodate varying illumination conditions. In the case of CCD sensor 72, a CCD AFE (Analog Front End) component may be used between the digital image processor 73 and the sensor 72. Such an AFE may be based on VSP2560 'CCD Analog Front End for Digital Cameras' from Texas Instruments Incorporated of Dallas Tex., U.S.A. The block 73 further contains a digital image processor, which receives the digital data from the ATE, and processes this digital representation of the image to handle various industry-standards, and to execute various computations and algorithms. Preferably, additional image enhancements may be performed by the block 73 such as generating greater pixel density or adjusting color balance, contrast and luminance. Further, the block 73 may perform other data management functions and processing on the raw digital image data. Commonly, the timing relationship of the vertical/horizontal reference signals and the pixel clock are also handled in this block. Digital Media System-on-Chip device TMS320DM357 from Texas Instruments Incorporated of Dallas Tex., U.S.A. is an example of a device implementing in a single chip (and associated circuitry) part or all of the image processor 73, part or all of the video compressor 74 and part or all of transceiver 75. In addition to a lens or lens system, color filters may be placed between the imaging optics and the photosensor array to achieve desired color manipulation.

The block 73 converts the raw data received from the photosensor array 72 into a color-corrected image in a standard image file format. The camera 16 further comprises a connector 79 for connecting to the cable 26. In order to transmit the digital image to the image processor 12 in the control box 11 via cable 26 (which may contain a wired or non-wired medium), a transmitter or transceiver 75 is disposed between the connector 79 and the image processor 73. The transceiver 75 also includes isolation magnetic components (e.g. transformer-based), balancing, surge protection, and other suitable components required for providing a proper and standard interface via a connector 79. In the case of connecting to a wired medium, the connector 79 further contains protection circuitry for accommodating transients, over-voltage and lightning, and any other protection means for reducing or eliminating the damage from an unwanted signal over the wired medium. A band pass filter may also be used for passing only the required communication signals, and rejecting or stopping other signals in the described path. A transformer may be used for isolating and reducing common-mode interferences. Further a wiring driver and wiring receivers may be used in order to transmit and receive the appropriate level of signal to and from the wired medium. An equalizer may also be used in order to compensate for any frequency dependent characteristics of the wired medium. Further, the communication over the cable 26 can be bi-directional, such as half-duplex or full-duplex, or one-way, wherein the camera 16 only transmits the image to the control box 11.

A controller 77, located within the camera module 16, may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The controller 77 commonly includes a memory that may include a static RAM (random Access Memory), dynamic RAM, flash memory, ROM (Read Only Memory), or any other data storage medium. The memory may include data, programs, and/or instructions and any other software or firmware executable by the processor. The control logic can be implemented in hardware or in software, such as a firmware stored in the memory. The controller 77 controls and monitors the device operation, such as initialization, configuration, interface and commands. The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

Power to the digital camera module 16 is required for its described functions such as for capturing, storing, manipulating, and transmitting the image. A dedicated power source may be used such as a battery or a dedicated connection to an external power source via connector 69. In a preferred embodiment, power is supplied from the control box 11 via cable 26, serving for both power and image transmitting. The power supply 78 contains a DC/DC converter. In another embodiment, the power supply 78 is power fed from the AC power supply via AC plug as a connector 69 and a cord, and thus may include an AC/DC converter, for converting the AC power (commonly 115VAC/60 Hz or 220VAC/50 Hz) into the required DC voltage or voltages. Such power supplies are known in the art and typically involves converting 120 or 240 volt AC supplied by a power utility company to a well-regulated lower voltage DC for electronic devices. In one embodiment, power supply 78 is integrated into a single device or circuit, in order to share common circuits. Further, the power supply 78 may include a boost converter, such as a buck boost converter, charge pump, inverter and regulators as known in the art, as required for conversion of one form of electrical power to another desired form and voltage. While power supply 78 (either separated or integrated) can be an integral part and housed within the camera enclosure, they may be enclosed as a separate housing connected via cable to the camera assembly. For example, a small outlet plug-in step-down transformer shape can be used (also known as wall-wart, "power brick", "plug pack", "plug-in adapter", "adapter block", "domestic mains adapter", "power adapter", or AC adapter). Further, power supply 78 may be a linear or switching type.

Various formats that can be used to represent the captured image are TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. In many cases, video data is compressed before transmission, in order to allow its transmission over a reduced bandwidth transmission system. A video compressor 74 (or video encoder) is shown in FIG. 7 disposed between the image processor 73 and the transceiver 75, allowing for compression of the digital video signal before its transmission over the cable 26. In some cases compression will not be required, hence obviating the need for such compressor 74. Such compression can be lossy or lossless types. Common compression algorithms are JPEG (Joint Photographic Experts Group) and MPEG (Moving Picture Experts Group). The above and other image or video compression techniques can make use of intraframe compression commonly based on registering the differences between part of single frame or a single image. Interframe compression can further be used for video streams, based on registering differences between frames. Other examples of image processing include run length encoding and delta modulation. Further, the image can be dynamically dithered to allow the displayed image to appear to have higher resolution and quality.

Single lens or a lens array 71 is positioned to collect optical energy representative of a subject or scenery, and to focus the optical energy onto the photosensor array 72. Commonly, the photosensor array 72 is a matrix of photosensitive pixels, which generates an electric signal that is representative of the optical energy that is directed at the pixel by the imaging optics.

A prior art example of a portable electronic camera connectable to a computer is disclosed in U.S. Pat. No. 5,402,170 to Parulski et al. entitled: "Hand-Manipulated Electronic Camera Tethered to a Personal Computer". A digital electronic camera which can accept various types of input/output cards or memory cards is disclosed in U.S. Pat. No. 7,432,952 to Fukuoka entitled: "Digital Image Capturing Device having an Interface for Receiving a Control Program", and the use of a disk drive assembly for transferring images out of an electronic camera is disclosed in U.S. Pat. No. 5,138,459 to Roberts et al., entitled: "Electronic Still Video Camera with Direct Personal Computer (PC) Compatible Digital Format Output", which are all incorporated in their entirety for all purposes as if fully set forth herein. A camera with human face detection means is disclosed in U.S. Pat. No. 6,940,545 to Ray et al., entitled: "Face Detecting Camera and Method", which is incorporated in its entirety for all purposes as if fully set forth herein.

Face detection (also known as face localization) includes algorithms for identifying a group of pixels within a digitally-acquired image that relates to the existence, locations and sizes of human faces. Common face-detection algorithms focused on the detection of frontal human faces, and other algorithms attempt to solve the more general and difficult problem of multi-view face detection. That is, the detection of faces that are either rotated along the axis from the face to the observer (in-plane rotation), or rotated along the vertical or left-right axis (out-of-plane rotation), or both. Various face detection techniques and devices (e.g. cameras) having face detection features are disclosed in U.S. Pat. Nos. RE33682, RE31370, 4,047,187, 4,317,991, 4,367,027, 4,638,364, 5,291,234, 5,386,103, 5,488,429, 5,638,136, 5,642,431, 5,710,833, 5,724,456, 5,781,650, 5,812,193, 5,818,975, 5,835,616, 5,870,138, 5,978,519, 5,987,154, 5,991,456, 6,097,470, 6,101,271, 6,128,397, 6,148,092, 6,151,073, 6,188,777, 6,192,149, 6,249,315, 6,263,113, 6,268,939, 6,282,317, 6,301,370, 6,332,033, 6,393,148, 6,404,900, 6,407,777, 6,421,468, 6,438,264, 6,456,732, 6,459,436, 6,473,199, 6,501,857, 6,504,942, 6,504,951, 6,516,154, 6,526,161, 6,940,545, 7,110,575, 7,315,630, 7,317,815, 7,466,844, 7,466,866 and 7,508,961, which are all incorporated in its entirety for all purposes as if fully set forth herein.

The electrical form of the image captured by the camera 16 is received via cable 26 at the image processor 12 in control box 11. The image processor 12 performs face detection algorithms on the received image, to determine if there is a face (or plurality of faces) in the captured image, and the location of each detected face in the captured view. The image processor 12 transmits the processing results to controller 13 via link 25. The image processor 12 may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The image processor 12 commonly includes a memory that may include a static RAM (random Access Memory), dynamic RAM, flash memory, ROM (Read Only Memory), or any other data storage medium. The memory may include data, programs, and/or instructions and any other software or firmware executable by the processor. The control logic can be implemented in hardware or in software, such as a firmware stored in the memory. The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

The controller 13 controls and monitors the device operation, such as initialization, configuration, interface and commands. The controller 13, located within the control box 11, may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The controller 13 commonly includes a memory that may include a static RAM (random Access Memory), dynamic RAM, flash memory, ROM (Read Only Memory), or any other data storage medium. The memory may include data, programs, and/or instructions and any other software or firmware executable by the processor. The control logic can be implemented in hardware or in software, such as a firmware stored in the memory. The controller 13 controls and monitors the device operation, such as initialization, configuration, interface and commands.

During operation, the image captured by the camera 16 is processed for face detection by image processor 12. The results of face detection processing, such as the existence of a face in the image, the number of detected faces and the location of the detected face are provided to the controller 13 via link 25. The controller 13 in turn provides commands to the motor control 14 via link 24, for rotating the motor 15, which in turn rotates the display 18 attached thereto.

Figure 10:
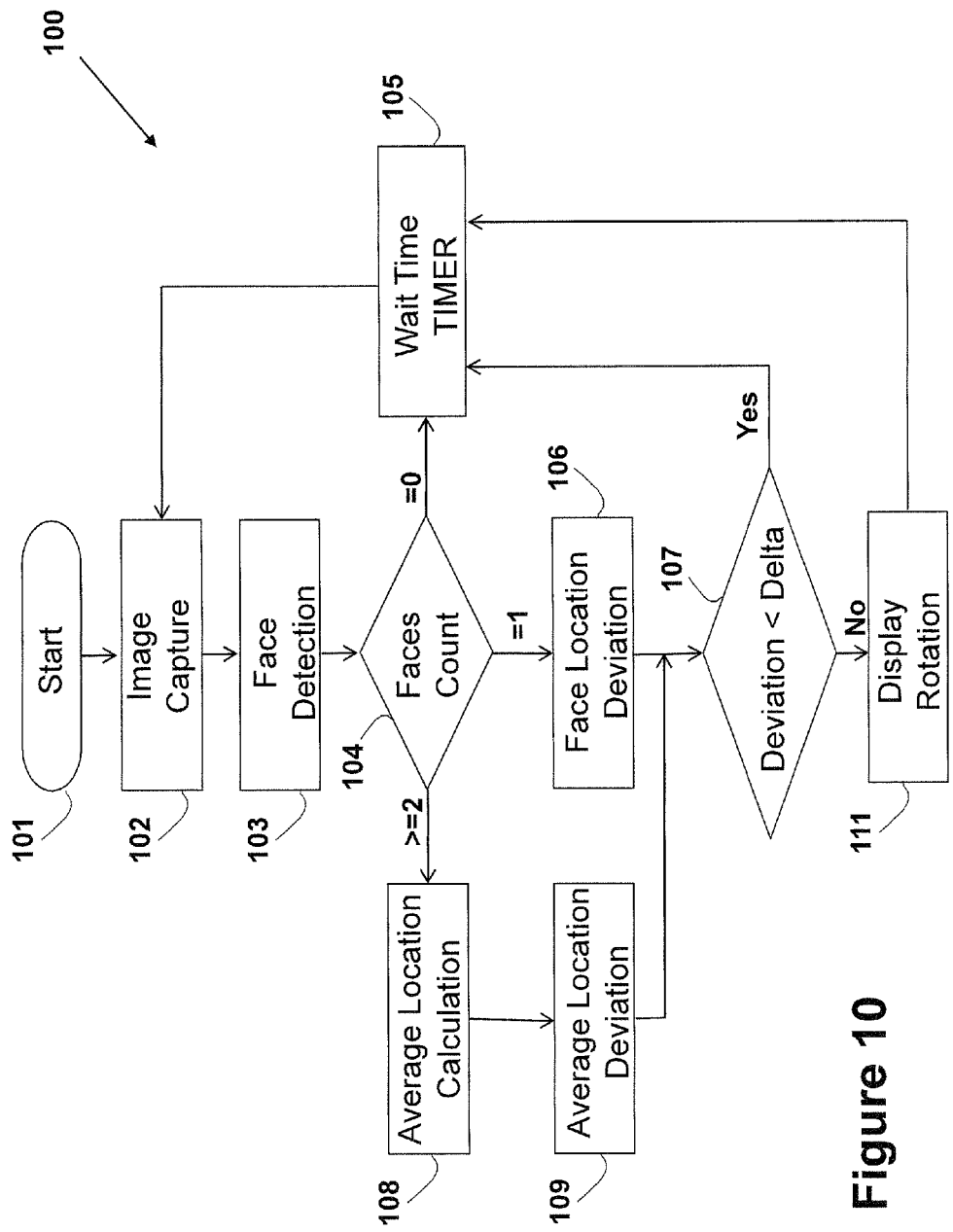
FIG. 10 illustrates schematically a flow chart of the system operation according to the invention.
Figure 11:
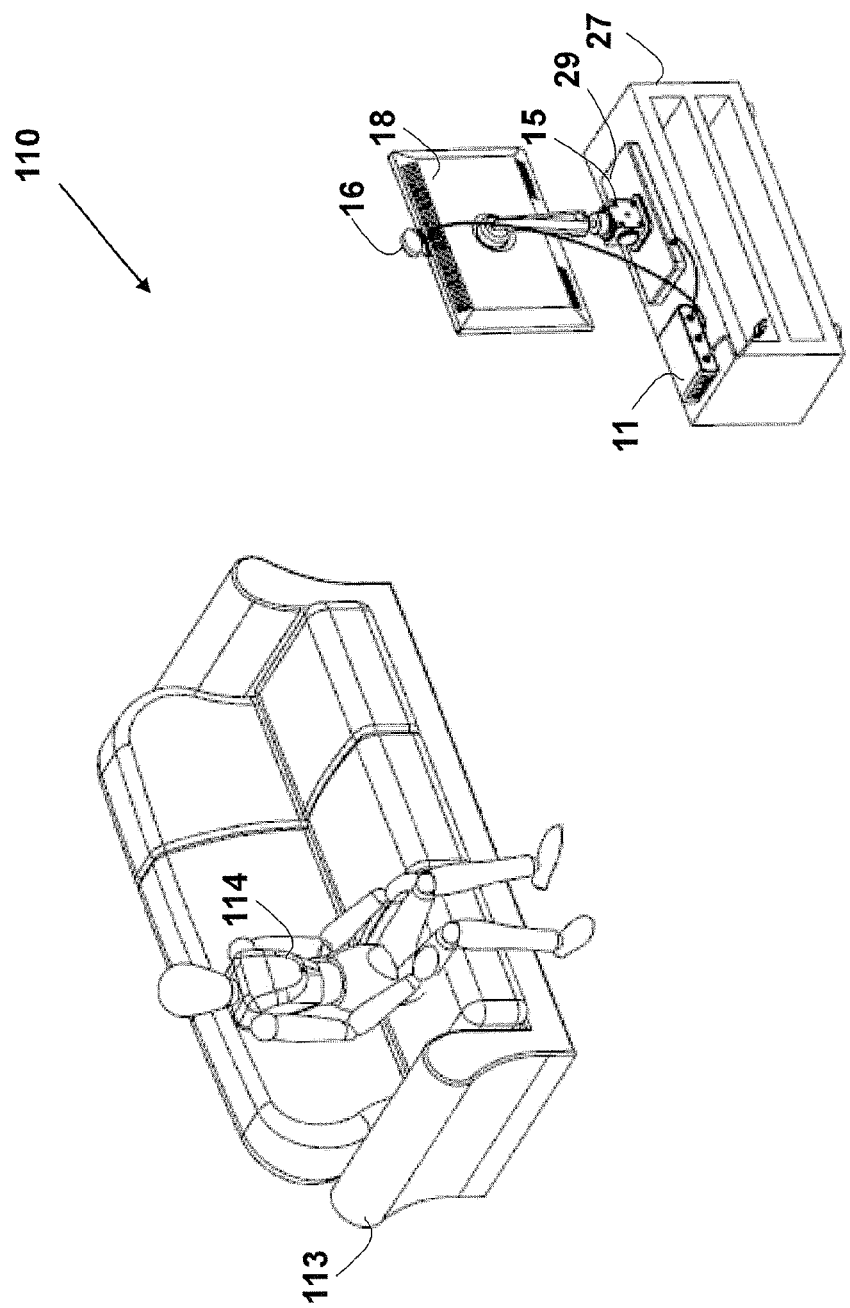
FIG. 11 illustrates schematically a perspective view of a room with a system according to the invention.
Figure 14:
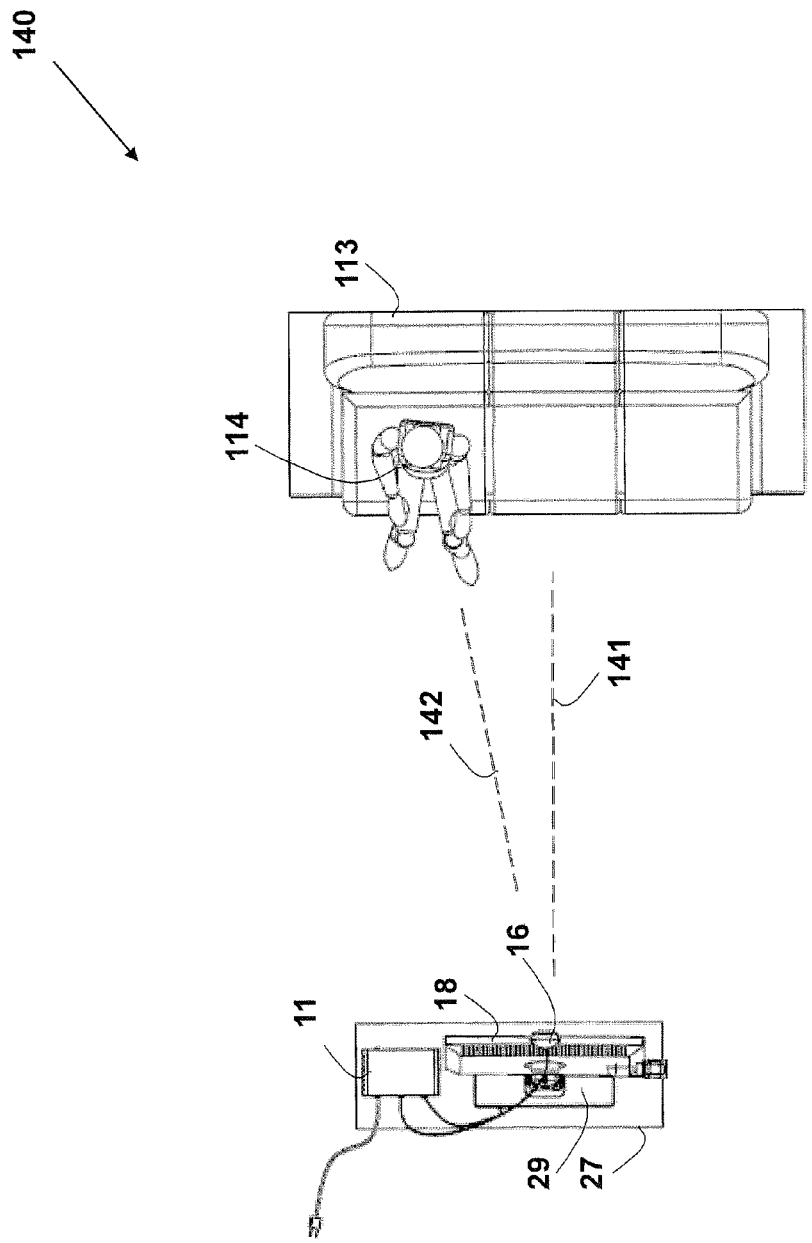
FIG. 14 illustrates schematically a top view of a room with a system according to the invention.
Figure 16:
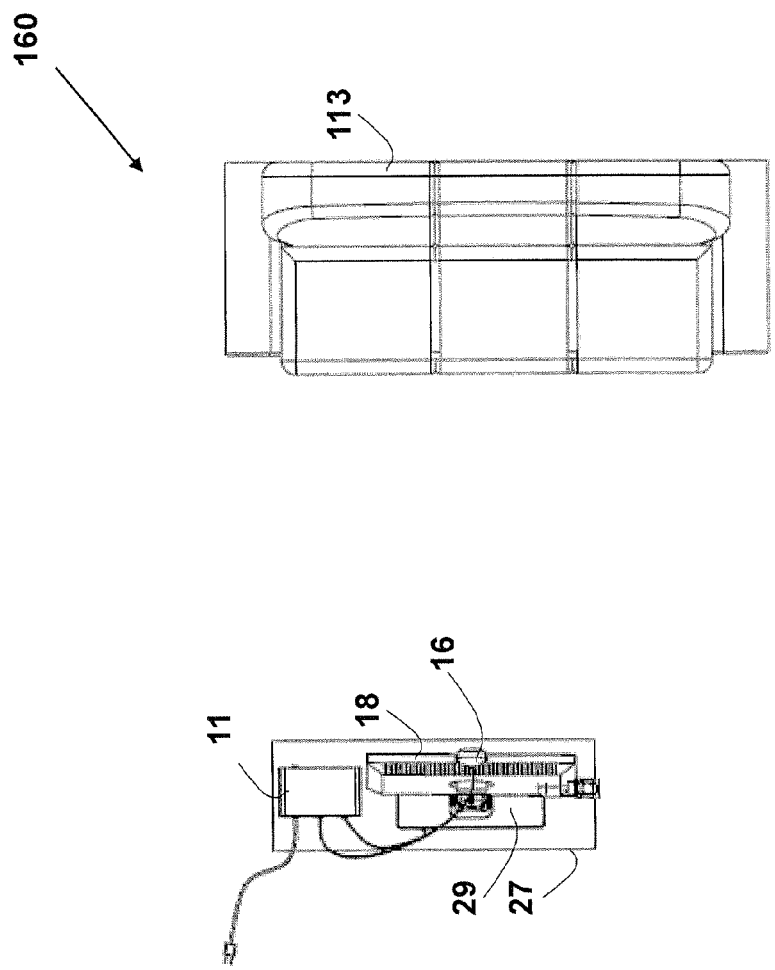
FIG. 16 illustrates schematically a top view of a room with a system according to the invention.

The system operation is described in flow chart 100 in FIG. 10, and will be exampled with regard to FIGS. 11 to 14, showing a living room wherein a person 114 is sitting on a sofa 113 and watching the display 18 (e.g. a flat screen television set) being part of a system 10 according to the invention. FIG. 11 shows a perspective rear view 110 of the display 18 (and a perspective front view of the person 114 sitting on the sofa 113). FIG. 12 shows a perspective front view 120 of the display 18 (and a perspective rear view of the person 114 sitting on the sofa 113). FIG. 13 shows a side view 130 and FIG. 14 is a top view of the system 10, person 114 and the sofa 113. Similarly, FIG. 16 shows a top view 160 of the room wherein no person is present in the room.

As shown in top view 140 in FIG. 14, the sofa 113 is centered substantially vertically directly across from the display 18, as shown in the imaginary line of sight 141 connecting the sofa 113 center to the display 18 center. Hence, the center place on the sofa 113 is the optimal seating place, providing best visibility of the image on the display 18. However, as shown in FIGS. 11 to 14, the person 114 is sitting in a side seat of the sofa 113, thus using the line of sight 142 to the display 18, which is deviated from the optimal line 141.

Figure 15:
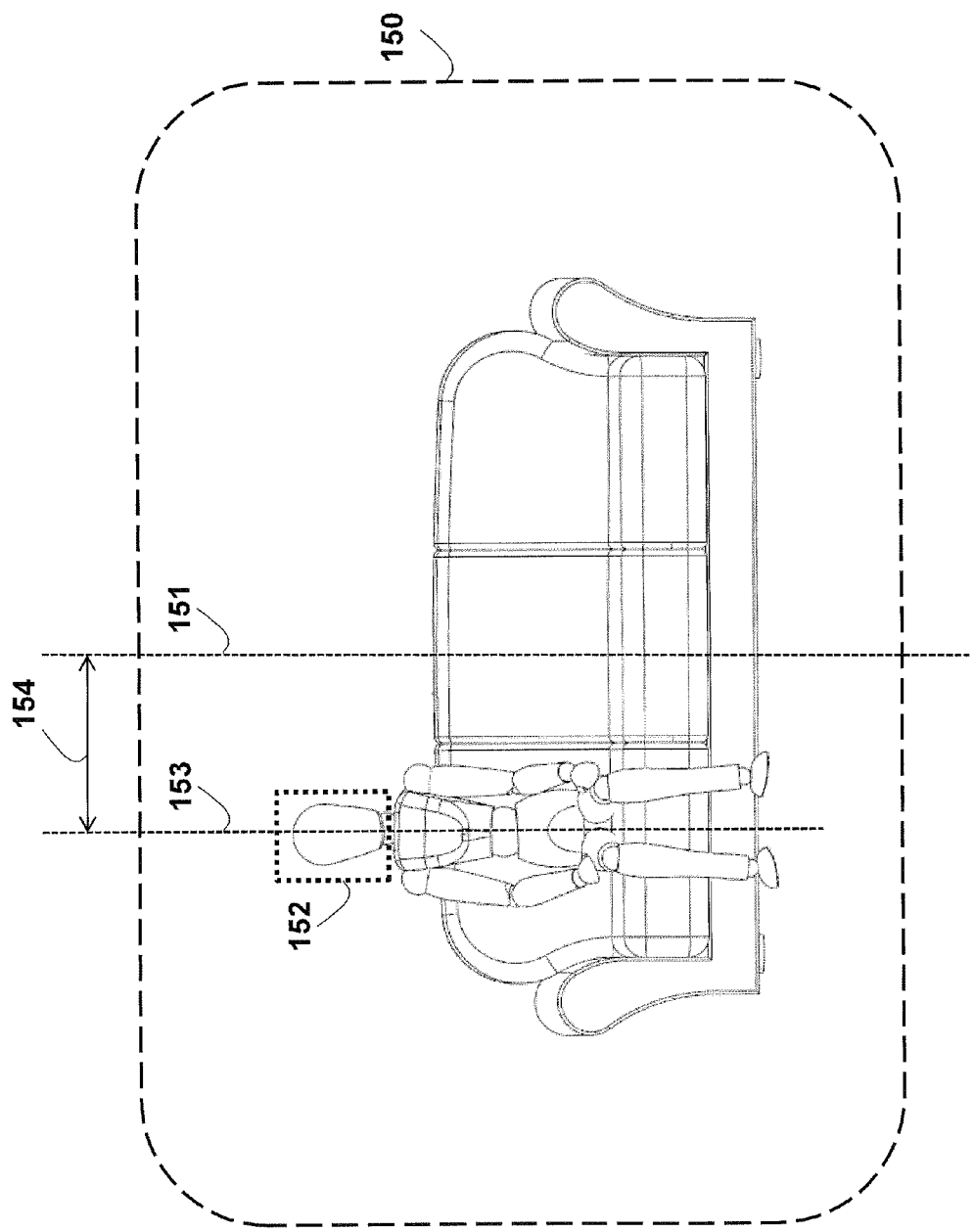
FIG. 15 illustrates schematically an image captured and analyzed in a system according to the invention.

The flow chart 100 is executed by the system and controlled and managed by the software (or firmware) in controller 13 in the control box 11. The system activation starts at step 'Start' 101. Next in step 'Image Capture' 102, the camera 16 is operated to capture a single 'still' frame or a video including streaming of frames. The image captured is transmitted from the camera 16 to the image processor 12 within the control box 11 via a communication link 26, which may be a cable. FIG. 15 shows an example of an image 150 that is captured by the camera 16, featuring the person 114 sitting on the sofa 113.

Figure 17:
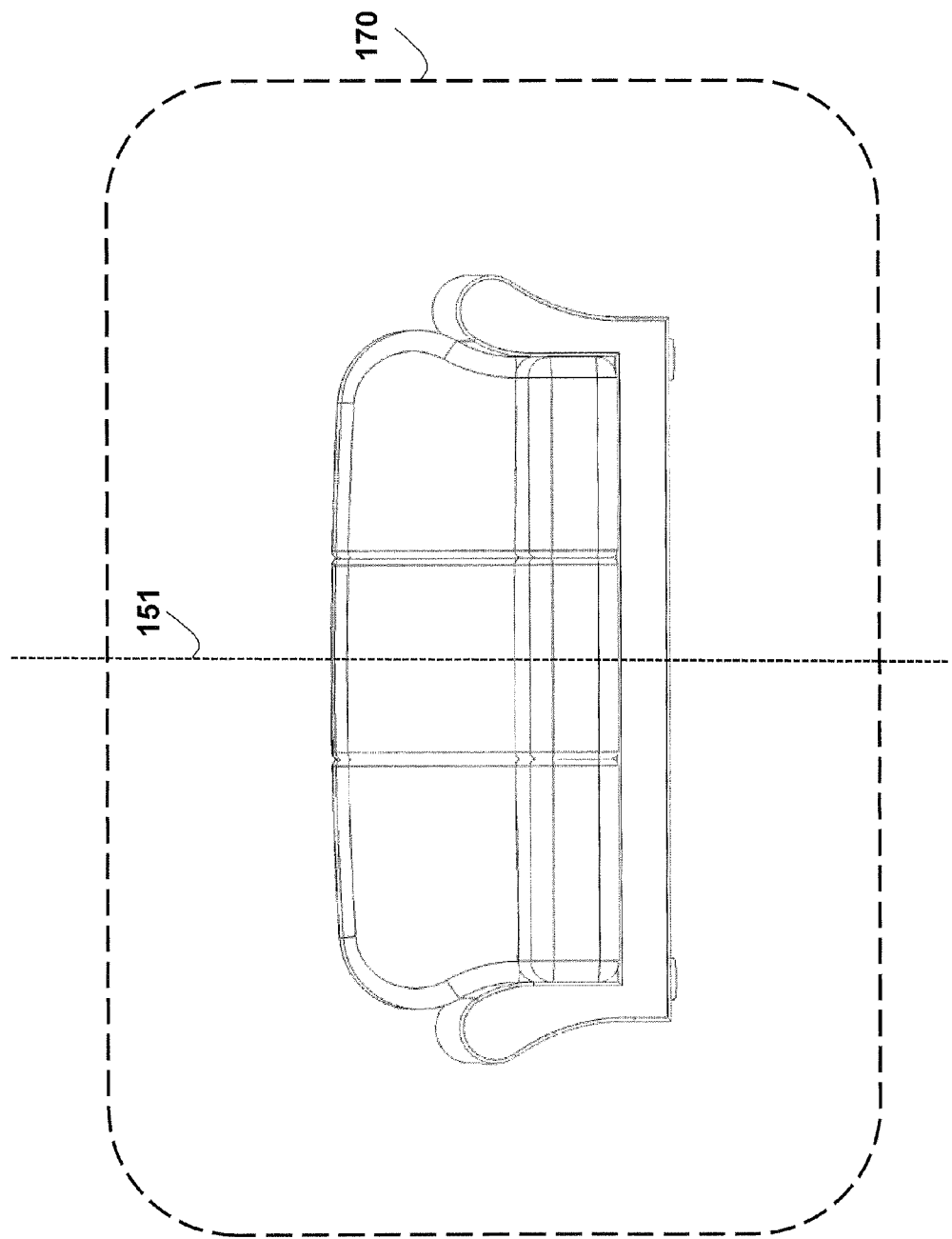
FIG. 17 illustrates schematically an image captured and analyzed in a system according to the invention.

The captured image (such as image 150) is then processed by the image processor 12 in 'Face Detection' step 103. A face detection algorithm is executed on the image captured, and the count of detected faces is checked in 'Faces Count' step 104. If human faces are detected in step 103 by the image processor 12, the detected face location is determined, such as rectangular 152 relating to person 114 face detected in image 150. In some cases, no person is present in the room, as shown in top view 160 in FIG. 16. In such a case, the image captured is shown an image 170 in FIG. 17, wherein only the sofa 113 is present, the image captured. If no human faces are detected, either due to the fact that no humans are present in the image or they are not watching at the display 18 or camera 16, then it is assumed that no humans are currently watching the display 18 (Faces Count equal zero). In this case, the system waits a predetermined period TIMER in 'Wait Time' step 105 during which the system is idle, and afterwards the system resumes to its operation from the start in step 102. The TIMER period can be in the order of seconds (e.g. 1 to 10 seconds), dozens of seconds (e.g. 30 to 60 seconds), minutes (e.g. 1 to 10 minutes), dozens of minutes (e.g. 30 to 60 minutes) or hours (e.g. 1 to 10 hours).

In the case a single human face is detected in step 103 (such as face detection 152 in image 150), the horizontal location of the face center is determined by the image processor 12, shown as dashed line 153 in FIG. 15. The dashed vertical line 153 is calculated to be at the detected face 152 center.

In the next step 'Face Location Deviation' 106, the distance deviation between the image center represented by the imaginary dashed line 151 horizontally centered in the image, and the detected face 152 center location line 153 is calculated (shown as the deviation line 154 in FIG. 15). This distance represents the deviation of the person location (particularly its face location) from the optimal viewing point represented by the image center line 151.

Figure 19:
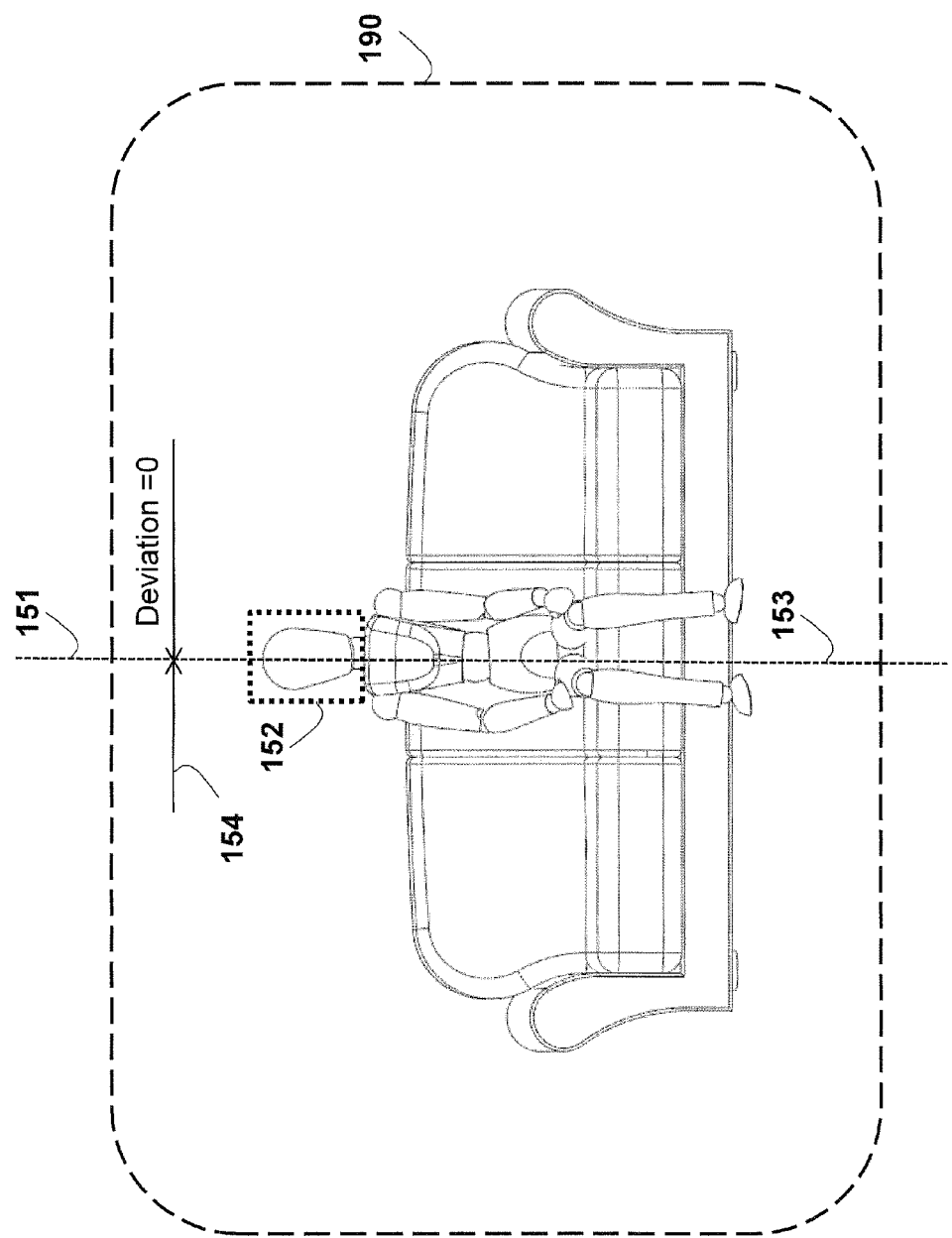
FIG. 19 illustrates schematically an image captured and analyzed in a system according to the invention.

Next, the deviation is checked in 'Deviation<Delta' step 107. In the case there is no deviation (Deviation=0), or if the deviation value is lower from a pre-set limit value, this means that the person watching the screen of the display 18 is exactly or substantially locate in the best viewing position. Hence, there is no need for any improvement of the viewing angle, and the system reverts to idling in step 105. Such a case is described in FIG. 18 showing a top view 180 of a room wherein the person 114 watching the display 18 is sitting in the center seat of the sofa 113 and thus is located directly across the system having an optimum display 18 view. The image captured in such a case is shown as image 190 in FIG. 19, showing that the image horizontal center line 151 coincides with the detected face 152 center line 153, hence the deviation 154 is zero. In the case the deviation is above a pre-set value, the controller 13 operates in step 'Display Rotation' 111 to rectify the situation by ordering the motor 15 (via the motor controller 14) to rotate in a direction that reduce the deviation. In the example of image 150 in FIG. 15, the person is located to the left side of the image, when viewed from the camera 16 point of view. In this case, the motor 15 rotates the display counter-clockwise when looked from the top, bringing the display 18 to the viewer person 114 line of sight.

In one embodiment, in the case wherein it is determined that the rotation of the motor 15 is required to correct the line-of-sight deviation 154, the motor 15 will rotate a pre-set angular movement to the required direction, regardless of the measured deviation 154. For example, an angular shift of 1 degree (1°) can be used. The rotation will be clockwise or counter-clockwise depending upon the deviation side versus the center line 151. Similarly, other angular shifts such as 2 degrees (2°), 5 degrees (5°) or 10 degrees (10°) may be used. In another embodiment, the motor 15 angular shift is dependent upon the actual measured deviation 154. Large deviation will result in a larger shift, while small deviation value will result in a smaller angular shift. For example, the angular rotation can be proportional to the value of the deviation 154.

After executing the required angular shift in 'Display Rotation' step 111, the system is idling for a period of TIMER in 'Wait Time' step 105 before another correction cycle starts (a cycle comprising all the required steps from 'Image Capture' step 102 to completing a 'Display Rotation' step 111). The case may be wherein few cycles will be required before the deviation is fully corrected and the system is idling after getting into zero (or substantially small) deviation. For example, in the case of a fixed angular rotation of 2 degrees (2°) is performed in 'Display Rotation' step 111, the system will require 5 (five) cycles to compensate for an angular deviation of 10 degrees (10°). Further, continuous operation also allows for continuous correction of the deviation, which may result due to the shift of the person position in the room. For example, in the case the person 114 moves to another seat on the sofa 113, one or more cycles may be required to adjust the system to the new location of the person. Similarly, adding watching persons can also require system adjustments will be described hereafter.

The continuous operation of the system as shown in flow chart 100 effectively implement a feedback control loop, wherein the camera 16 acts as a sensor for obtaining the deviation 154 and the motor 15 serves as an actuator, and the control loop (which may be a linear control loop) tries to regulate in order to minimize the value of the deviation 154 (set point zero for the measured deviation 154). Linear control may also be used for such negative feedback system. Such a system can use a proportional-only control loop, however PID (Proportional, Integral, Derivative) control known in the art commonly provides better control results.

Figure 20:
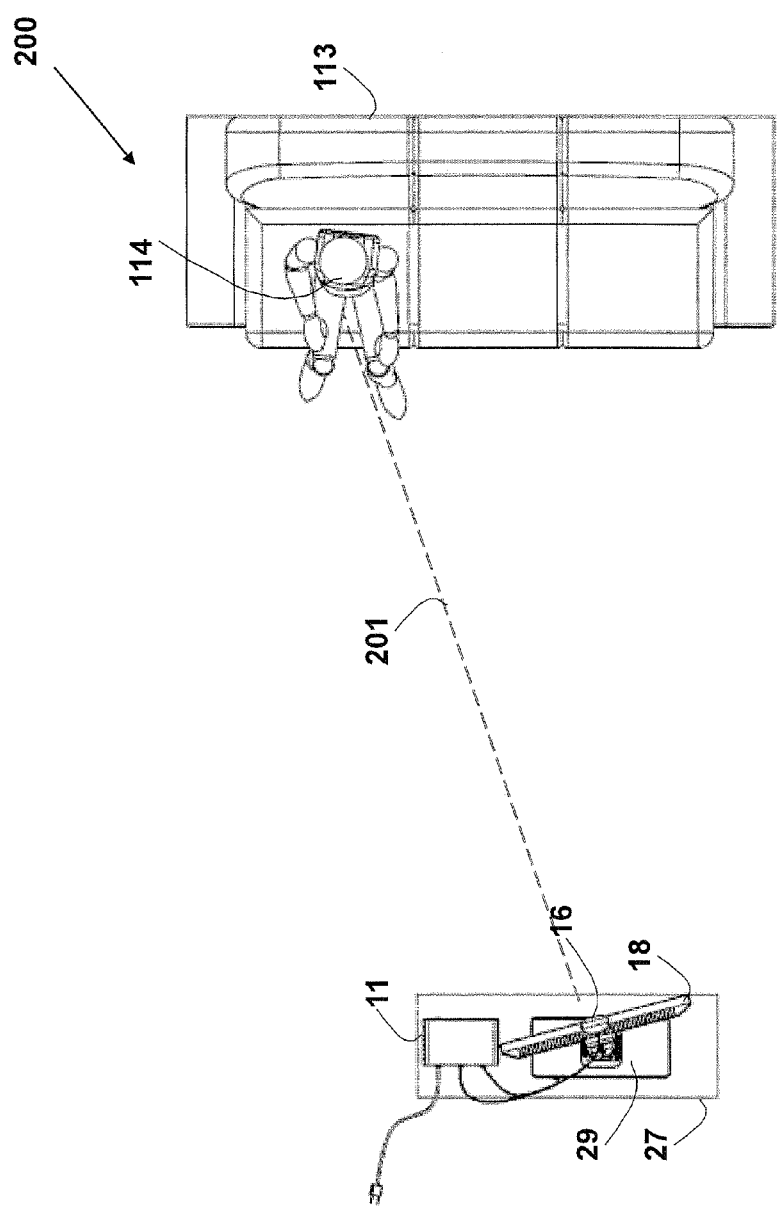
FIG. 20 illustrates schematically a top view of a room with a system according to the invention.
Figure 23:
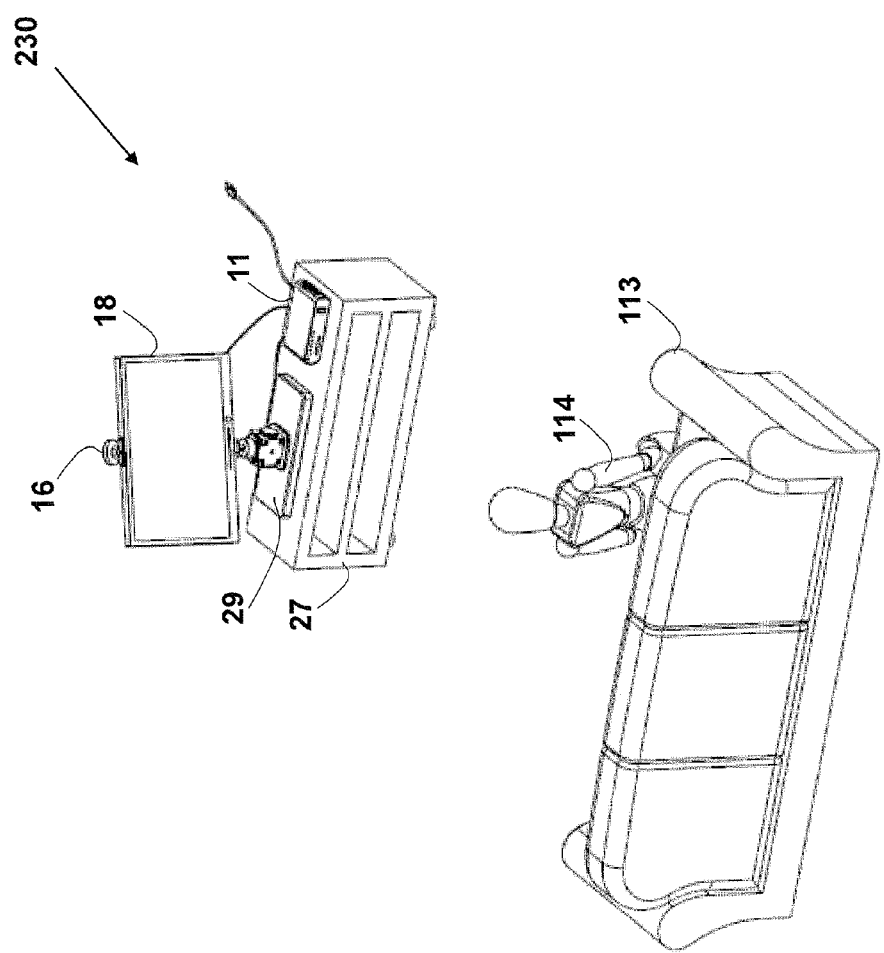
FIG. 23 illustrates schematically a side view of a room with a system according to the invention.

The system steady-state situation after completing all required cycles (one or more) to align the line-of-sight to its optimal position is described with regard to FIGS. 20 to 24, showing a living room wherein a person 114 is sitting on a sofa 113 and watching the display 18 (e.g. a flat screen television set) being part of a system 10 according to the invention. FIG. 20 shows a top view 200 wherein the display 18 is shown facing directly the person 114 on sofa 113, as shown in the dashed line-of-sight 201. FIG. 21 shows a perspective front view 210 of the display 18 (and a perspective rear view of the person 114 sitting on the sofa 113). FIG. 22 shows a side view 220 and FIG. 23 is another perspective front view 230 of the system 10 (and a perspective rear view of the person 114 sitting on the sofa 113).

Figure 24:
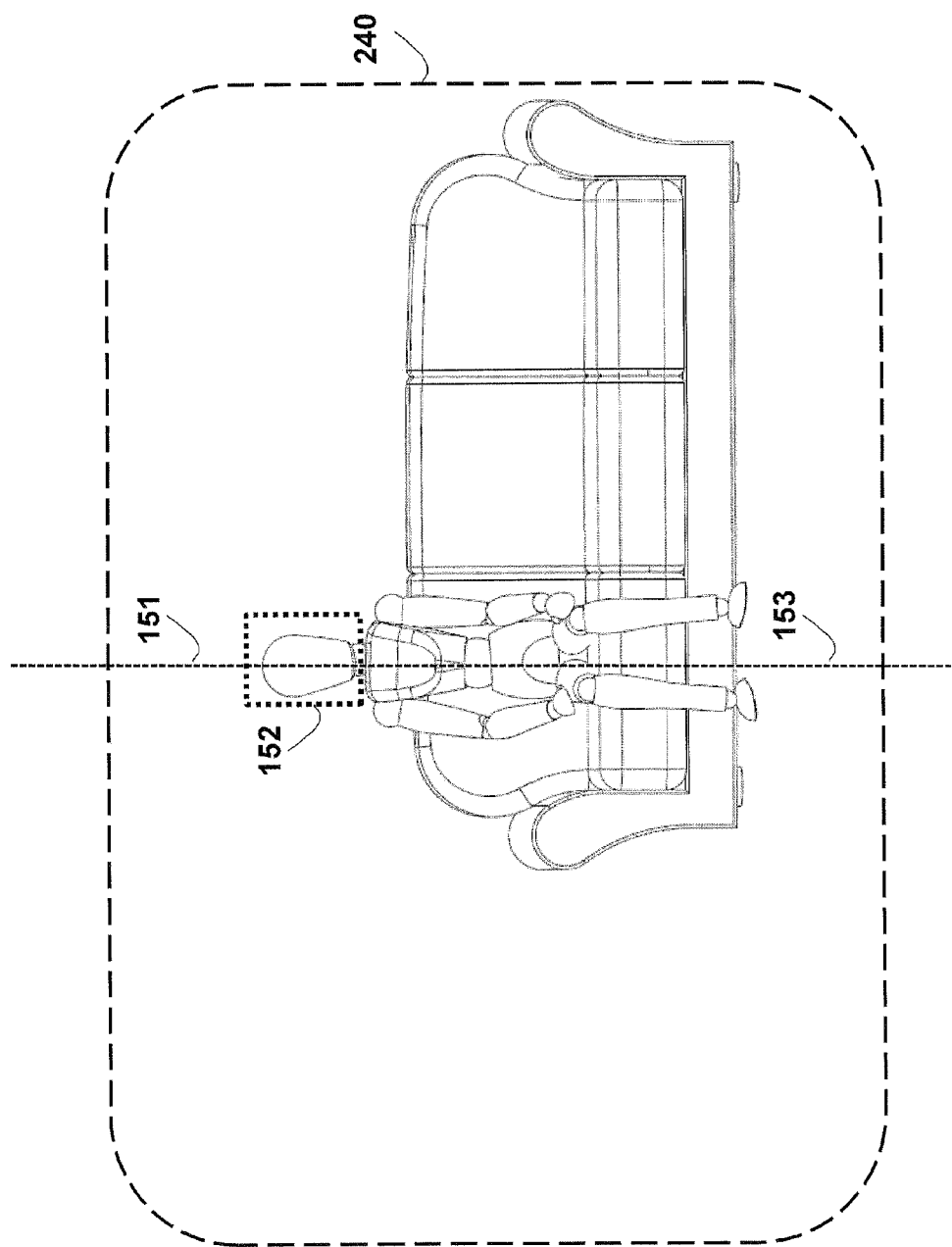
FIG. 24 illustrates schematically an image captured and analyzed in a system according to the invention.

FIG. 24 shows the image 240 captured by the camera 16 at this steady state. The face detected 152 center line 153 coincides with the image center line 151, resulting deviation distance of zero (actually or practically less than Delta).

Figure 25:
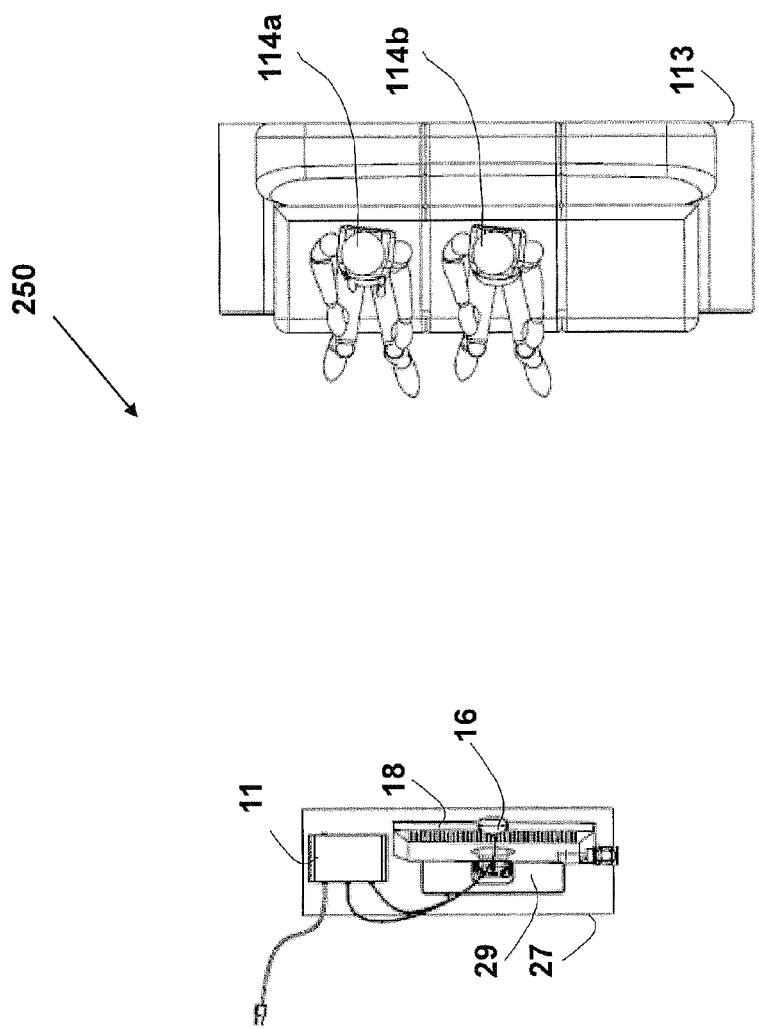
FIG. 25 illustrates schematically a top view of a room with a system according to the invention.

In some cases, multiple persons may be watching the display 18 at the same time. Such scenario is shown in a top view 250 in FIG. 25. An additional person 114b is shown sitting in the sofa 113 center seat, added to the person 114a sitting on the sofa 113 side-seat as described above. In such a situation, the optimal viewing angle is different for each person being in a different location. The best solution is to direct the display 18 towards the center between the persons 114a and 114b, such that each will enjoy a low deviation in a fair partition. Handling few detected faces is handled in the left side of flow chart 100, consisting of 'Average Location Calculation' step 108 and 'Average Location Deviation' step 109.

Figure 26:
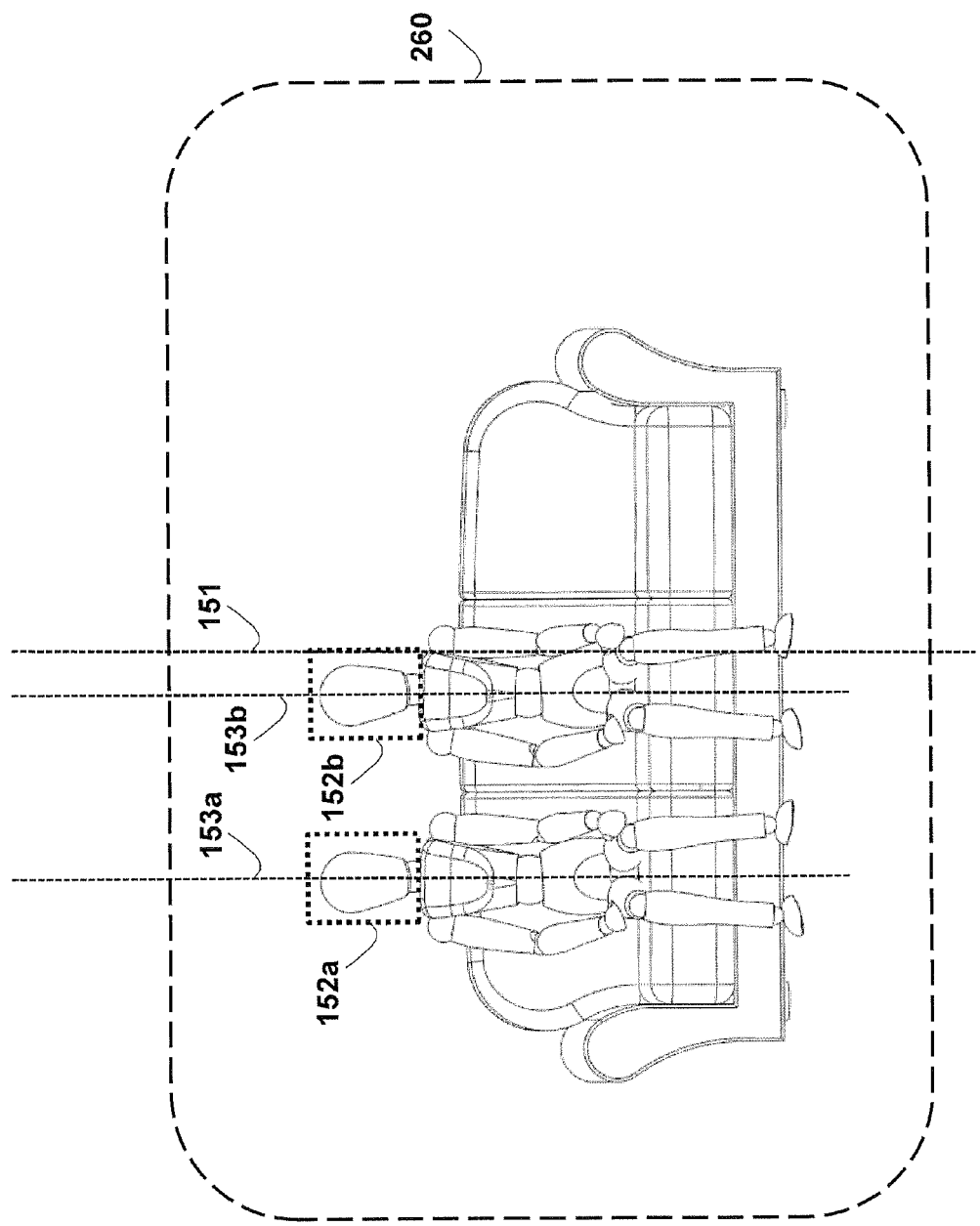
FIG. 26 illustrates schematically an image captured and analyzed in a system according to the invention.
Figure 27:
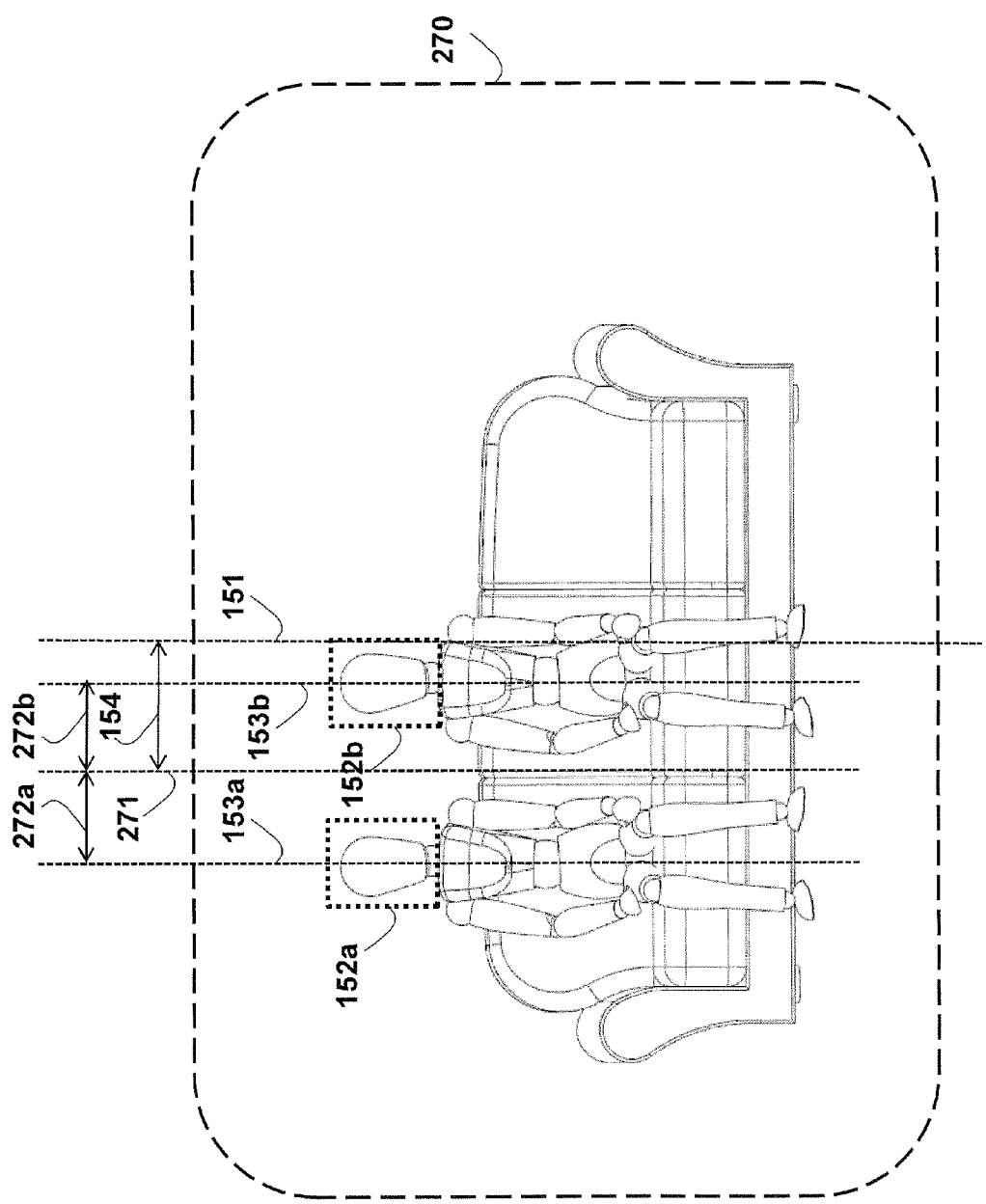
FIG. 27 illustrates schematically an image captured and analyzed in a system according to the invention.

Image 260 shown in FIG. 26 shows the captured image in the camera 16 in the case shown in FIG. 26. The image processor 12, using face detection algorithms, identifies the two faces of persons 114a and 114b by the respective face frames 152a and 152b, and associate with horizontal location lines 153a and 153b respectively, similar to above discussion relating to FIG. 15. Next, as part of 'Average Location Calculation' step 108 in flow-chart 100, the average face location is calculated. Such average horizontal location 271 is shown as part of image 270 in FIG. 27. The lines 153a and 153b, representing the respective location of the detected faces 152a and 152b, are equally distant from the average line 271, as shown by distances 272a and 272b respectively. The average location 271 is used, as a substitute to the location line 153 shown in FIG. 15, as the means for calculating the deviation from the image center line 151. The deviation 154 between the image center line 151 and the average line 271 will be calculated in 'Average Location deviation' step 109.

Figure 28:
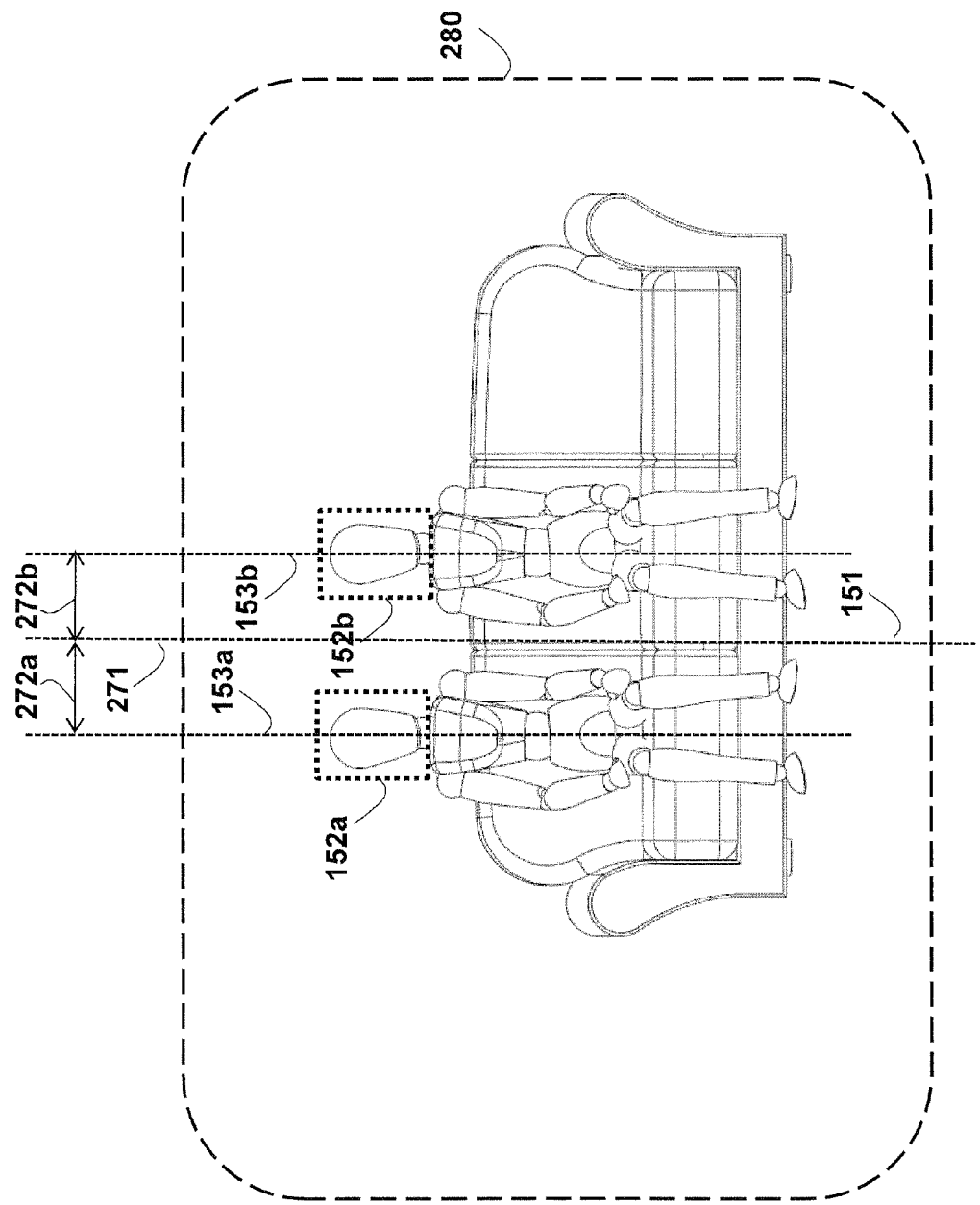
FIG. 28 illustrates schematically an image captured and analyzed in a system according to the invention.
Figure 29:
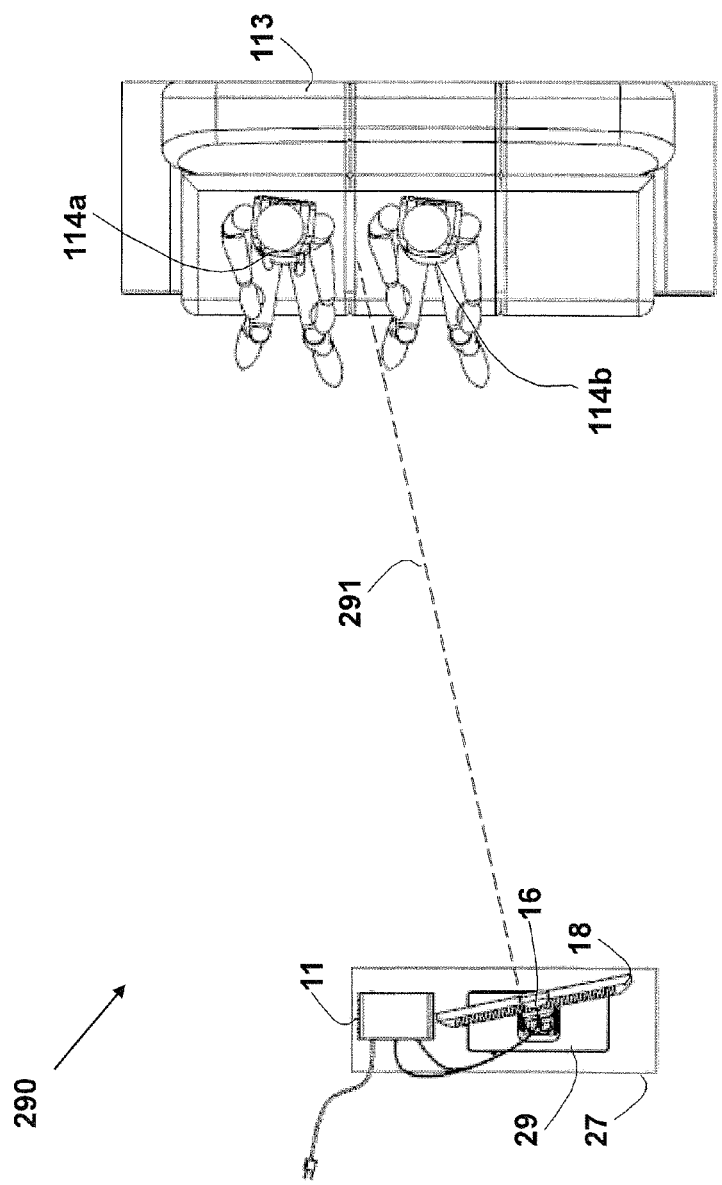
FIG. 29 illustrates schematically a top view of a room with a system according to the invention.

Based on the deviation value 154 (derived from the average position of both faces), the system will rotate the display 18 such that the deviation will be minimized as described above. The system steady-state situation after completing all required cycles (one or more) to align the line-of-sight to its optimal position is described with regard to FIG. 29, showing a living room wherein the two persons 114a and 114b are sitting on a sofa 113 and watching the display 18 (e.g. a flat screen television set) being part of a system 10 according to the invention. FIG. 29 shows a top view 290 wherein the display 18 is shown facing directly the middle point between the persons 114a and 114b on sofa 113, as shown in the dashed line-of-sight 291. The image captured by the camera 16 in this situation is shown as image 280 in FIG. 28, wherein the average line 271 and the image center line 151 coincides, resulting in zero deviation value.

While the invention has been exampled above with regard to a single motor and rotating the display 18 in a single axis, being the horizontal axis, it is the invention may equally apply to rotating the display 18 in the vertical axis only. In such a scenario, the display 18 will be inclined as required to ensure a direct line of sight for optimum view in the vertical axis.

Figure 30:
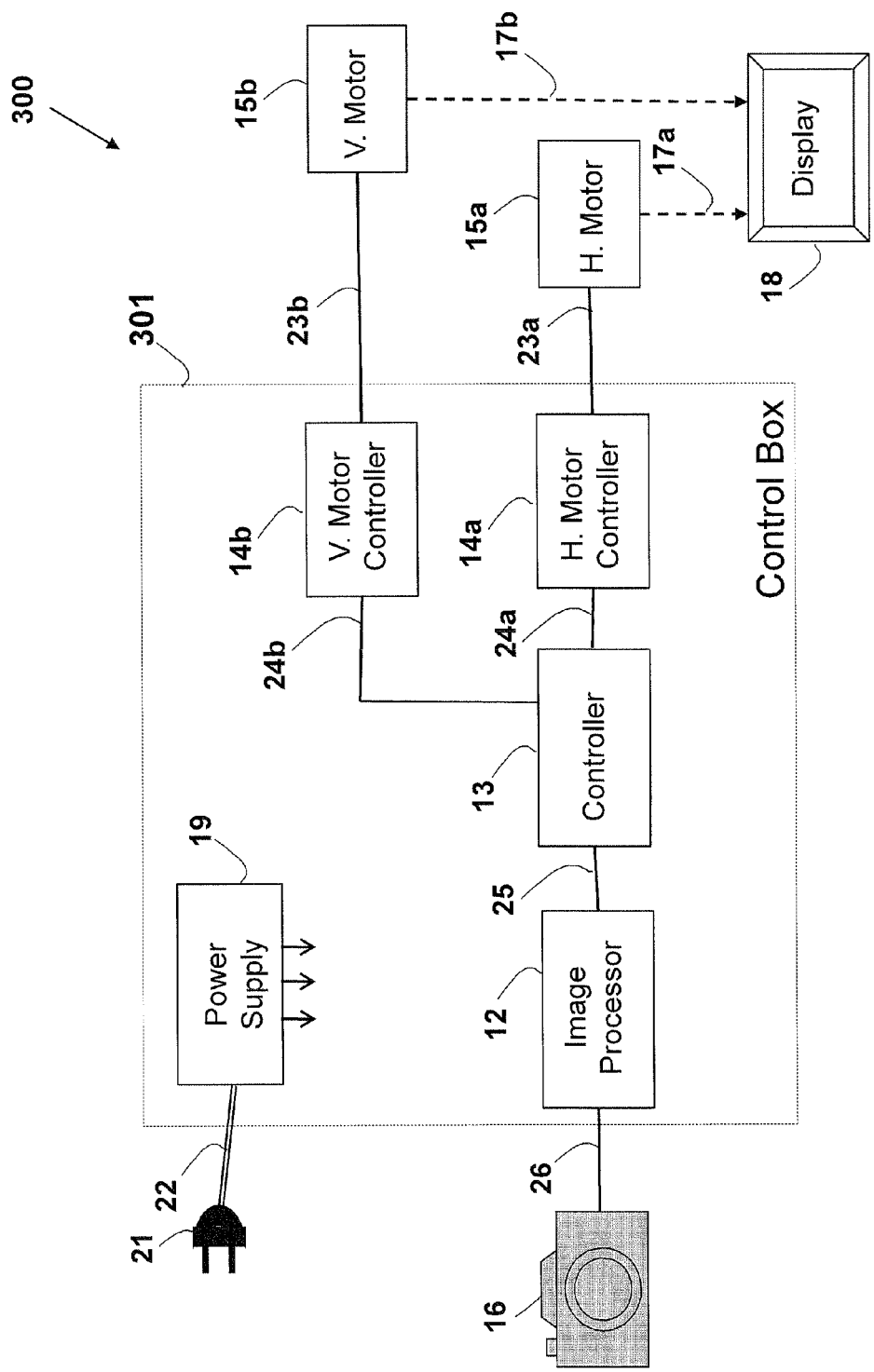
FIG. 30 illustrates schematically a simplified general functional block diagram of a system according to the invention.

Further, the invention can be applied to rotate the display 18 in both the horizontal and vertical axes, thus allowing for better and optimal viewing. A block diagram of such a system 300 is shown in FIG. 30, using a two-axes control box 301. The horizontal rotation is using the horizontal motor (H. Motor) controller 14a which receives commands from the controller 13 via the connection 24a, and controls horizontal motor 15a via connection 23a, which axis is in turn mechanically coupled to the display 18 for horizontal rotation. This horizontal handling corresponds to system 10 shown in FIG. 1, showing the horizontal motor (H. Motor) controller 14 which receives commands from the controller 13 via the connection 24, and controls the horizontal motor 15 via connection 23, which axis 17a is in turn mechanically coupled to the display 18 for horizontal rotation. A set of a vertical motor (V. Motor) controller 14b and a vertical motor 15b are added to system 10 for inclining the display (in the vertical axis) as required. The vertical rotation is using the vertical motor (V. Motor) controller 14b which receives commands from the controller 13 via the connection 24b, and controls vertical motor 15b via connection 23b, which axis 17b is in turn mechanically coupled to the display 18 for vertical rotation.

Figure 31:
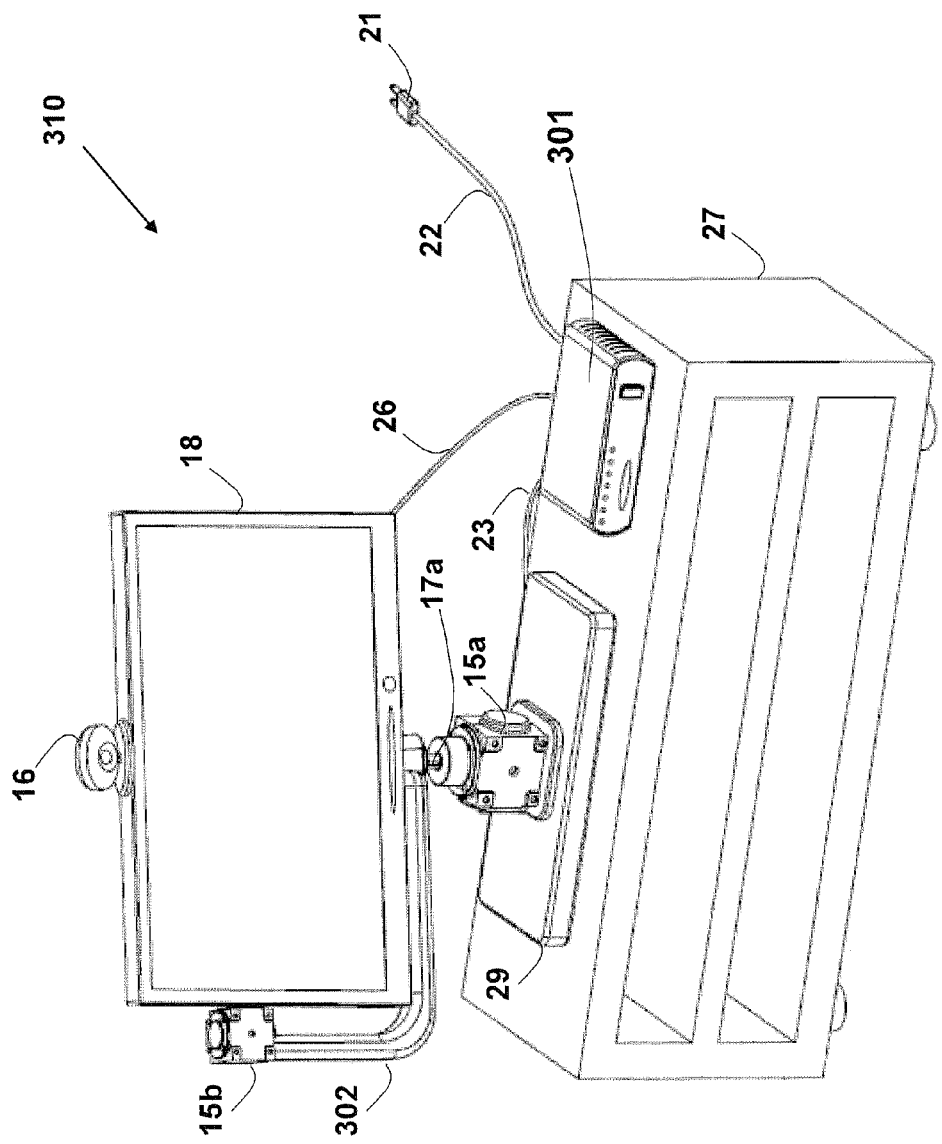
FIG. 31 illustrates schematically a perspective front view of a system according to the invention.
Figure 32:
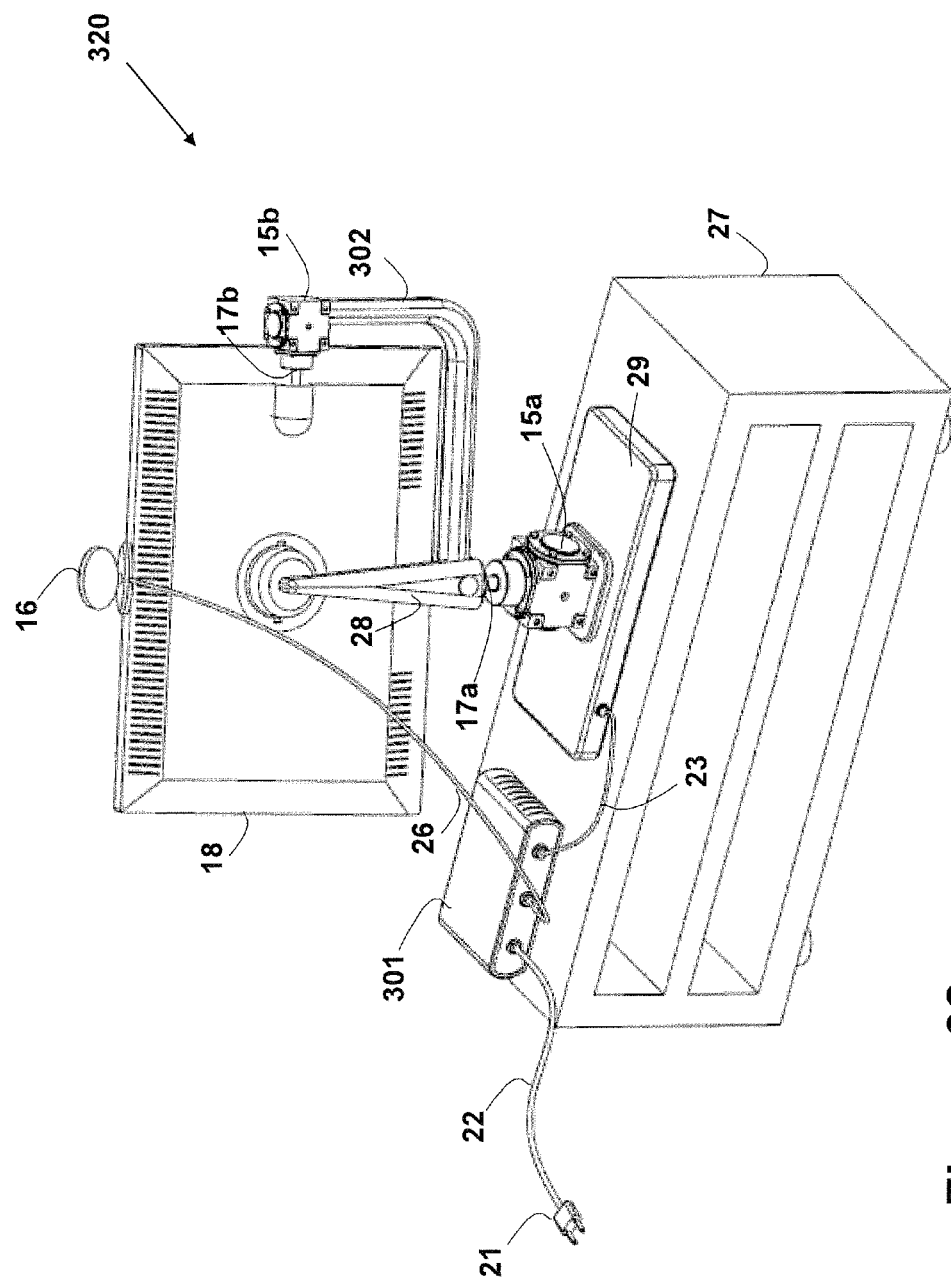
FIG. 32 illustrates schematically a perspective rear view of a system according to the invention.
Figure 33:
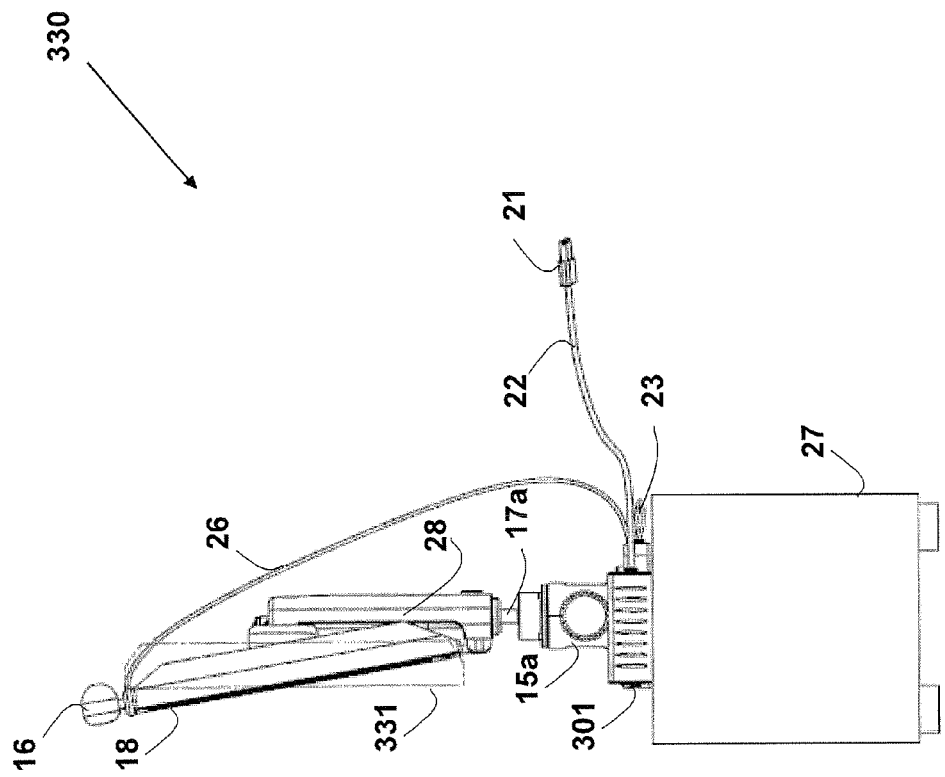
FIG. 33 illustrates schematically a side view of a system according to the invention.
Figure 34:
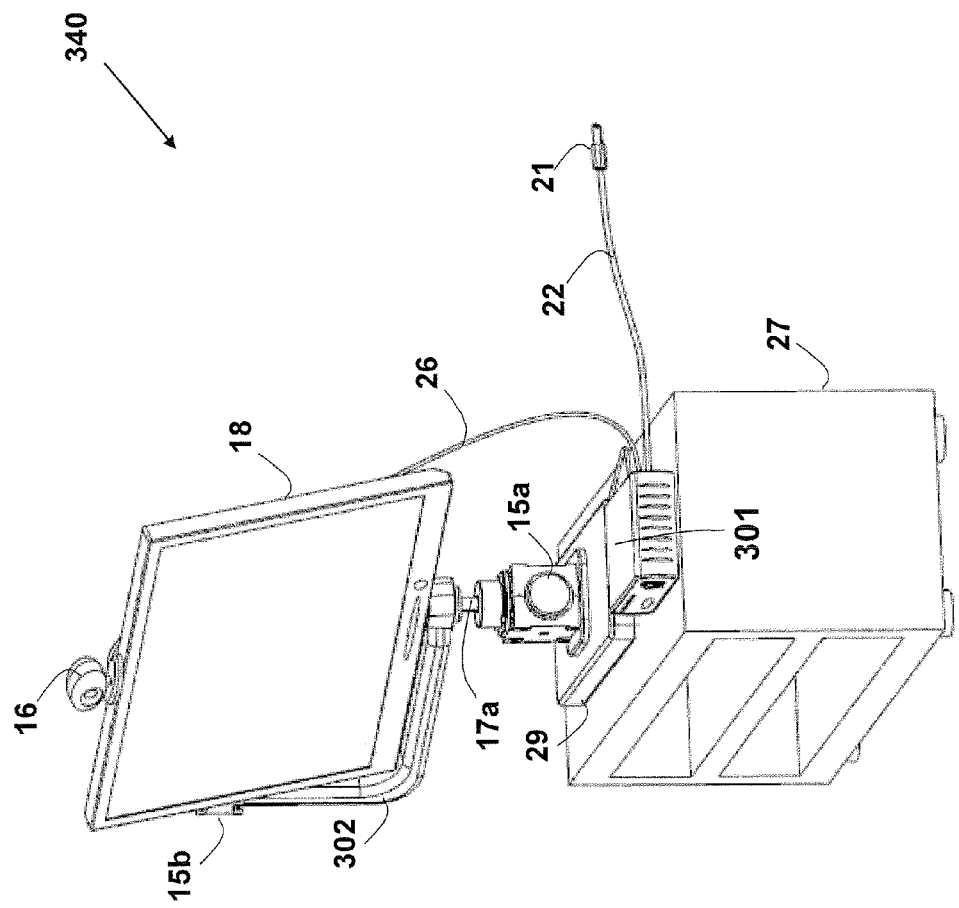
FIG. 34 illustrates schematically a perspective side view of a system according to the invention.

A pictorial exemplary system is shown in FIGS. 31 to 34, wherein a pictorial front perspective view 310 of the system having two axes line of sight correction is shown in FIG. 31, a rear perspective view 320 is shown in FIG. 32, a side view 330 is shown in FIG. 33 and an another perspective side view 340 is shown in FIG. 34. A control box 301 is shown supporting operation in both vertical and horizontal planes. Horizontal motor 15a is shown attached to pedestal 28 via axis 17a, for horizontal rotating of the display 18, as described above relating to FIGS. 2 to 6. In order to allow rotation also in the vertical plane, a second pedestal 302 is added attached to the former pedestal 28. The second pedestal 302 serves a basis to the vertical motor 15b, which is attached to the display 18 via the axis 17b. In operation, vertical motor 15b rotates its axis 17b and the display 18 attached thereto thus inclining the display 18, hence controlling its vertical line of sight. FIG. 3 shows a display 18 shifted from its original inclination (shown as dashed frame 331) to a reclining position. Similarly, a reclining display 18 is shown in FIG. 34.

Figure 35:
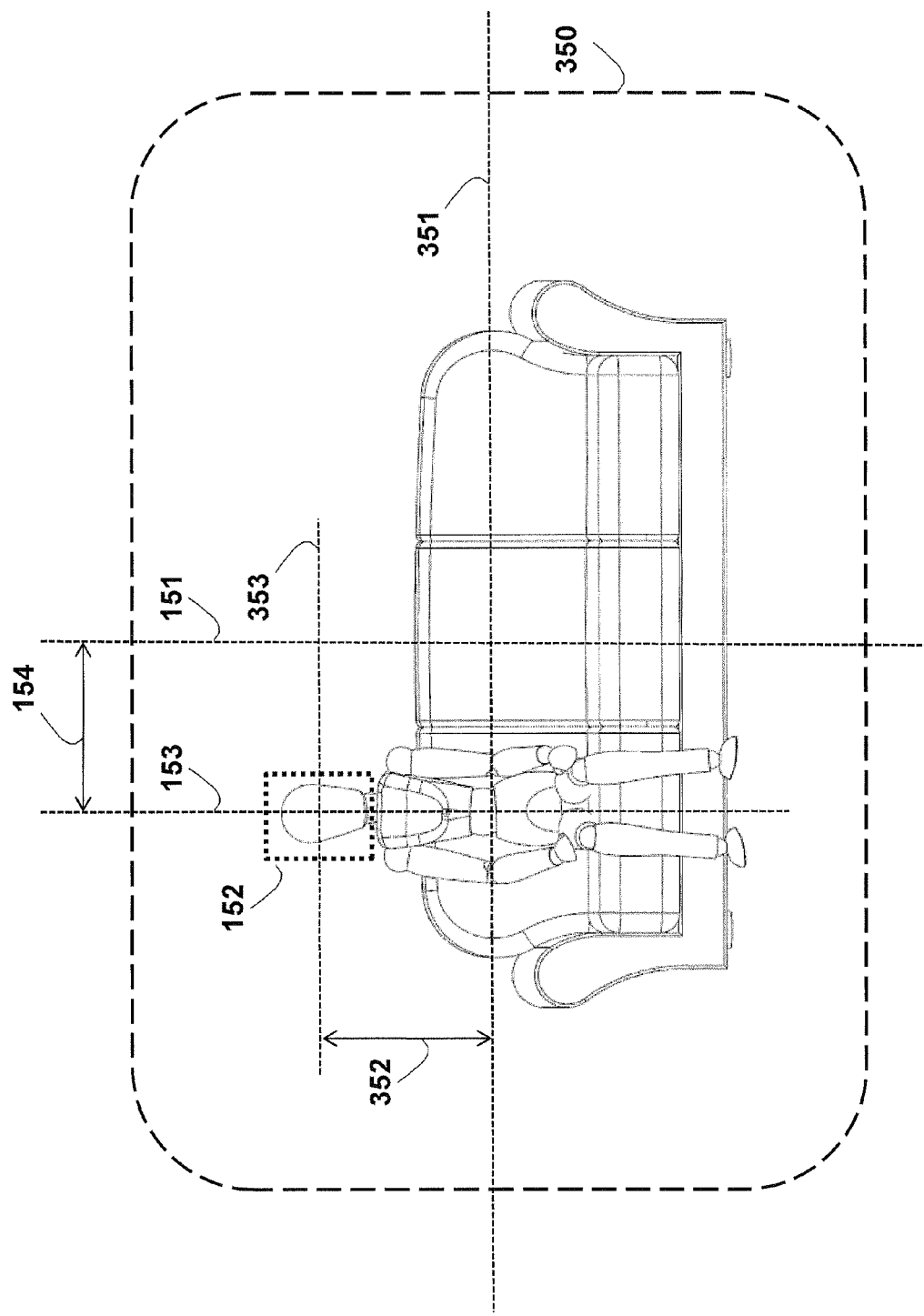
FIG. 35 illustrates schematically an image captured and analyzed in a system according to the invention.

The operation of such two-axes system in the horizontal plane will be similar to the above operation described in FIG. 10 and the appended FIGS. 11 to 29, wherein the horizontal rotation required in affected by the H. Motor 14a via its axis 17a. In parallel, and simultaneously with the horizontal loop, a similar vertical control loop is executed. He image processing in case of correcting two planes is exampled with regard to image captured 350 shown in FIG. 35 (based on FIG. 15). In the 'Face Location deviation' step 106 executed as part of flow chart 100 executed by the image processor 12, not only the horizontal deviation 154 is estimated, but rather the vertical deviation 352 is calculated as well. Similar to the horizontal calculation above regarding the horizontal deviation 154, the vertical deviation 352 is the difference between the image horizontal center line 351 and the vertical position 353 of the detected face 152. Similar to the above description, the control loop is operative to lower the vertical deviation 352 to a minimum value or zero, thus aligning the viewer line of sight with the plane of the display 18 offering optimal viewing experience.

While the invention has been exampled above with regard to a single motor and rotating the display 18 in a single axis, being the horizontal axis, and with regard to including a second motor for rotating the display 18 in both horizontal and vertical planes, the invention may equally apply to rotating the display 18 in the vertical axis only. In such a scenario, the display 18 will be inclined as required to ensure a direct line of sight for optimum view only in the vertical axis. In this case, the system 300 shown in FIG. 30 will use only the vertical motor 15b and its controller 14b, and the horizontal components (such as motor 15a and controller 14a) may be obviated.

While the invention has been exampled above with regard to a specific partition of the system components into various enclosures, the invention may equally apply to any other partition. For example, the camera 16 has been described above having a dedicated casing housing only the camera related hardware. However, the camera may as well be integrated into the control box 301 (or control box 11), obviating the need for additional enclosure and cable 26.

The integration may be just housing of the camera 16 in the same enclosure, or may share common hardware such as power supply, control lines and mechanical fixing. In one embodiment, the camera 16 is integrated with the display 18 or fixedly attached thereto. One advantage of such solution is that many displays already include a build-in camera for video conferencing (such as laptops). In another embodiment, the image processor 12 is integrated into the camera 16 enclosure.

In one example, the motor controller 14a is integrated within the casing of the motor 15a. Similarly, the motor controller 14b is integrated within the casing of the motor 15b. Further, the motor 15a (and/or the motor 15b) may be integrated or fixedly combined with the display 18. In another embodiment, the control box 301 (or control box 11) may be enclosed (in part or in full) in the camera 16 enclosure or with the motor 15a (or motor 15b). Alternatively, the control box 301 may be fully integrated within the display 18 housing.

While the invention has been exampled above with regard to using the face detection means in order to mechanically move the display 18 based on the location of the detected face or faces, the invention may equally apply to using the face detection for other controls of the display 18 or other devices.

Figure 36:
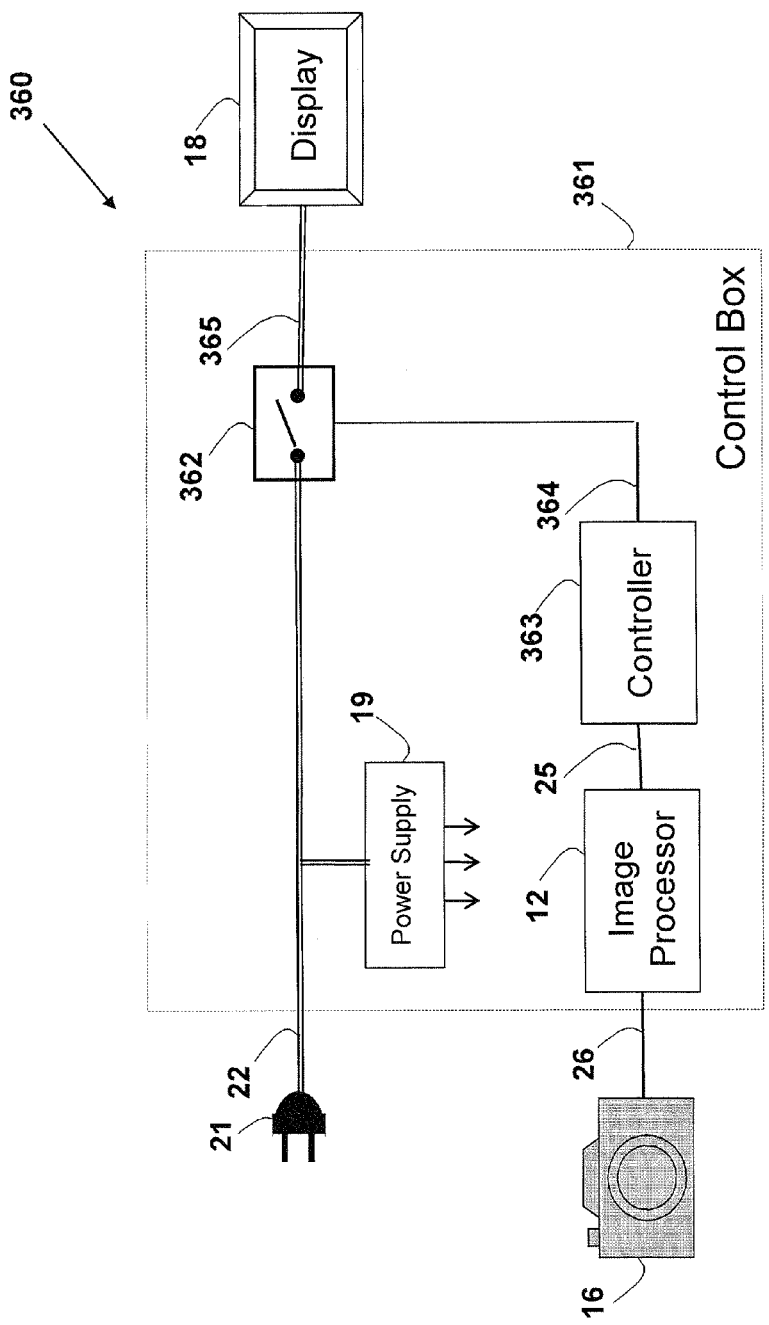
FIG. 36 illustrates schematically a simplified general functional block diagram of a system according to the invention.

In one exemplary embodiment, the face detection mechanism is used for turning the display ON and OFF. The detection of a human face in the captured image is serving as an indication that at least one person is watching the screen. In the case no faces are detected, the system assumes that no one is watching the screen, thus shutting off the display. This provides the benefit of not consuming power when not required, thus saving energy and the associated electricity expenses. Further, since electrical systems in general and displays in particular have a limited life span, such shutdown increases the usage of the screen and its operation life by saving wear and tear of the screen when its operation is not required. A block diagram 360 of such a system is shown in FIG. 36, based on a control box 361 (substituting the control box 11 described above). Similar to system 10 described above the system 360 comprises a camera 16, feeding its captured image to the image processor 12 via a communication link 26. The image processor 12 uses face detection image processing algorithms, detect the existence of human faces in the image captured, and notify the controller 363 via connection 25. Controller 363 may be identical or similar to controller 13 above. The display 18 is powered from the AC plug 21 via controlled on/off switch 362 and power cable 365, which is controlled by the controller 363 via the control connection 364. Hence, the controller 363 may turn the display 18 on and off by activating switch 362. The switch 362 may be implemented by relay contacts, wherein line 364 is a control signal used to energize and de-energize the coil of the relay, or may be implemented using solid state circuitry as known in the art.

Figure 40:
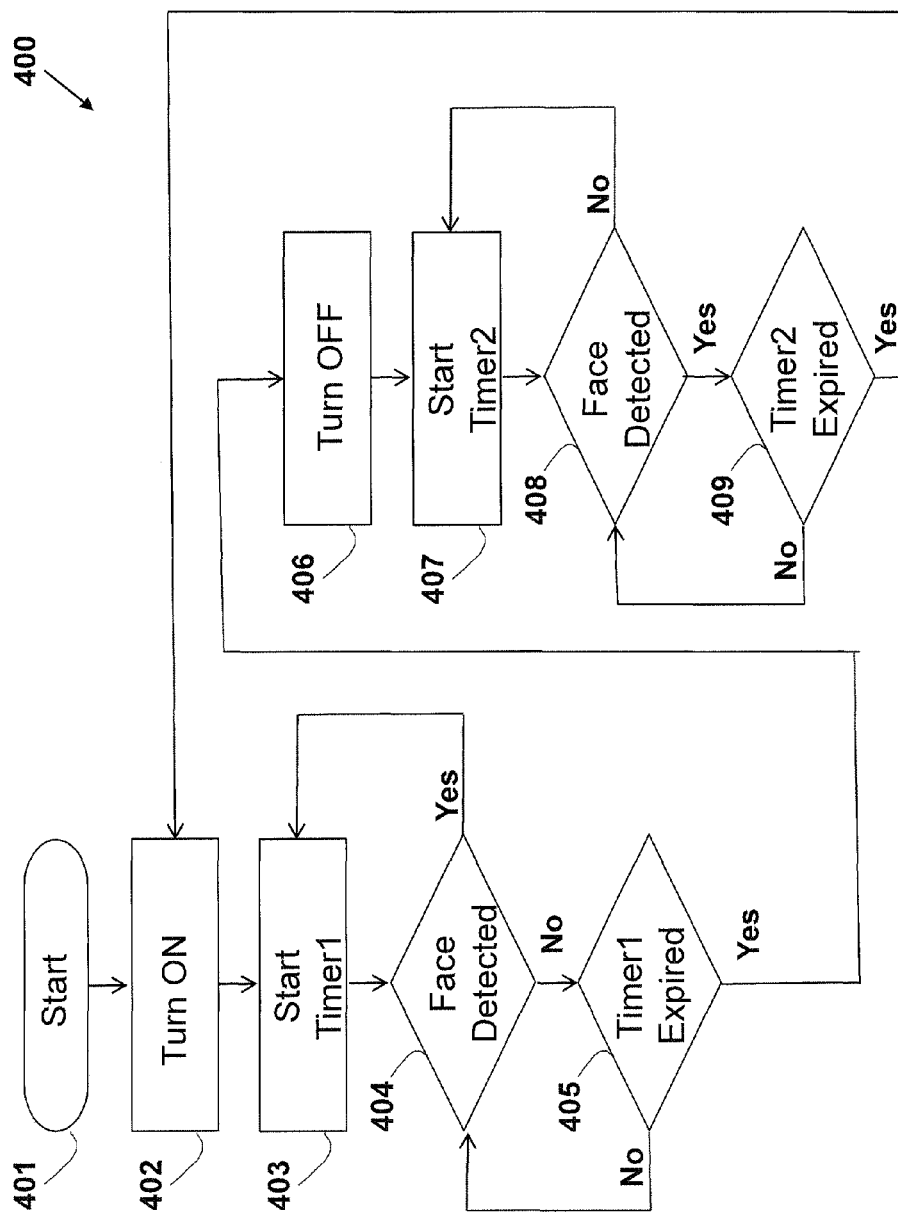
FIG. 40 illustrates schematically a flow chart of the system operation according to the invention.

The system operation is exampled as flow chart 400 in FIG. 40. The flow chart 400 execution is managed, controlled and handled by the controller 363 in control box 361. Upon system activation in Start step 401, the controller 363 provides an activation control signal 364 to the switch 362, commanding it to close and pass the AC power from the AC plug 21 to the display 18, thus turning the display 18 on. Then 'Start Timer1' step 403 is executed, wherein a timer having a pre set period of time (Timer1) starts to count the elapsing time, counting down from the specified time interval to zero. 'Face Detected' Step 404 is similar (or the same) as 'Face Detection' step 103, wherein the image processor 12 analyzes the captured image and notify the existence of a detected face to the controller 363. If a face (or multiple faces) is detected, the Timer1 is reset and start its count again in 'Start Timer1' step 403. Hence, as long as a face is detected, the system will be in the continuously performing the loop of steps 'Start Timer1' step 403 and 'Face Detected' step 404, wherein the display 18 is in ON state as it continues to receive power via switch 362. In the case no face is detected by the image processor 12, the time elapsed is checked in Timer1 in 'Timer 1 expired' step 405. As long as Timer has not elapsed, the system will continue to check if a face has been detected in 'Face Detected' step 404, and will reset the timer upon such detection. Only if throughout the Timer1 operation period no face has been detected, the power to the display 18 will be turned off in 'Turn OFF' step 406, by opening the switch 362 contacts and thus de-energizing the display 18. This mechanism allows for secure shutting off of the display 18, and will obviate the false detection such as the case of turning the display 18 off due to intermittent missing of a face detection occurrence or after too short period of lacking of face detection, thus adding to the system reliability.

After turning off the power to the display 18 in 'Turn OFF' step 406, a second timer (Timer2) is initiated in 'Start Timer2' step 407. Timer2 is pre set to a period which may be similar or distinct from the period set for Timer 1. Further, the two timers can be implemented using the same hardware or software/firmware, or sharing part of the means required for these timers. Then a face detection mechanism is executed in 'Face Detected' step 408 (similar to the Face detected step 404). If no face is detected in 'Face Detected' step 408, the Timer2 is restarting its count. As long as no face is detected, it is assumed that no person is viewing the display 18 hence no power is supplied to the display 18 rendering it turned off. Similar to the action of 'Timer1 Expired' step 405, 'Timer2 Expired' step 409 assures that a face needs to be detected for at least the period set in Timer2. Upon such occurrence, it is assumed that a person is actually looking at the display 18, and thus the power to the display 18 is resumed in 'Turn ON' step 402. This mechanism provides a reliable and stable operation promising that no action will be taken before assuring that the face detection is consistent and stable.

Each of said timers period can be in the order of seconds (e.g. 1 to 10 seconds), dozens of seconds (e.g. 30 to 60 seconds), minutes (e.g. 1 to 10 minutes), dozens of minutes (e.g. 30 to 60 minutes) or hours (e.g. 1 to 10 hours). The timers' periods can be the same, substantially similar or having substantial differences periods.

While the invention has been exampled above with regard to a specific partition of the system components into various enclosures, the invention may equally apply to any other partition. For example, the camera 16 has been described above having a dedicated casing housing only the camera related hardware. However, the camera may as well be integrated into the control box 361 obviating the need for additional enclosure and cable 26. The integration may be just housing of the camera 16 in the same enclosure, or may share common hardware such as power supply, control lines and mechanical fixing. In one embodiment, the camera 16 is integrated with the display 18 or fixedly attached thereto. One advantage of such solution is that many displays already include a build-in camera for video conferencing (such as laptops). In another embodiment, the image processor 12 is integrated into the camera 16 enclosure. Alternatively, the control box 361 may be fully integrated within the display 18 housing.

Figure 41:
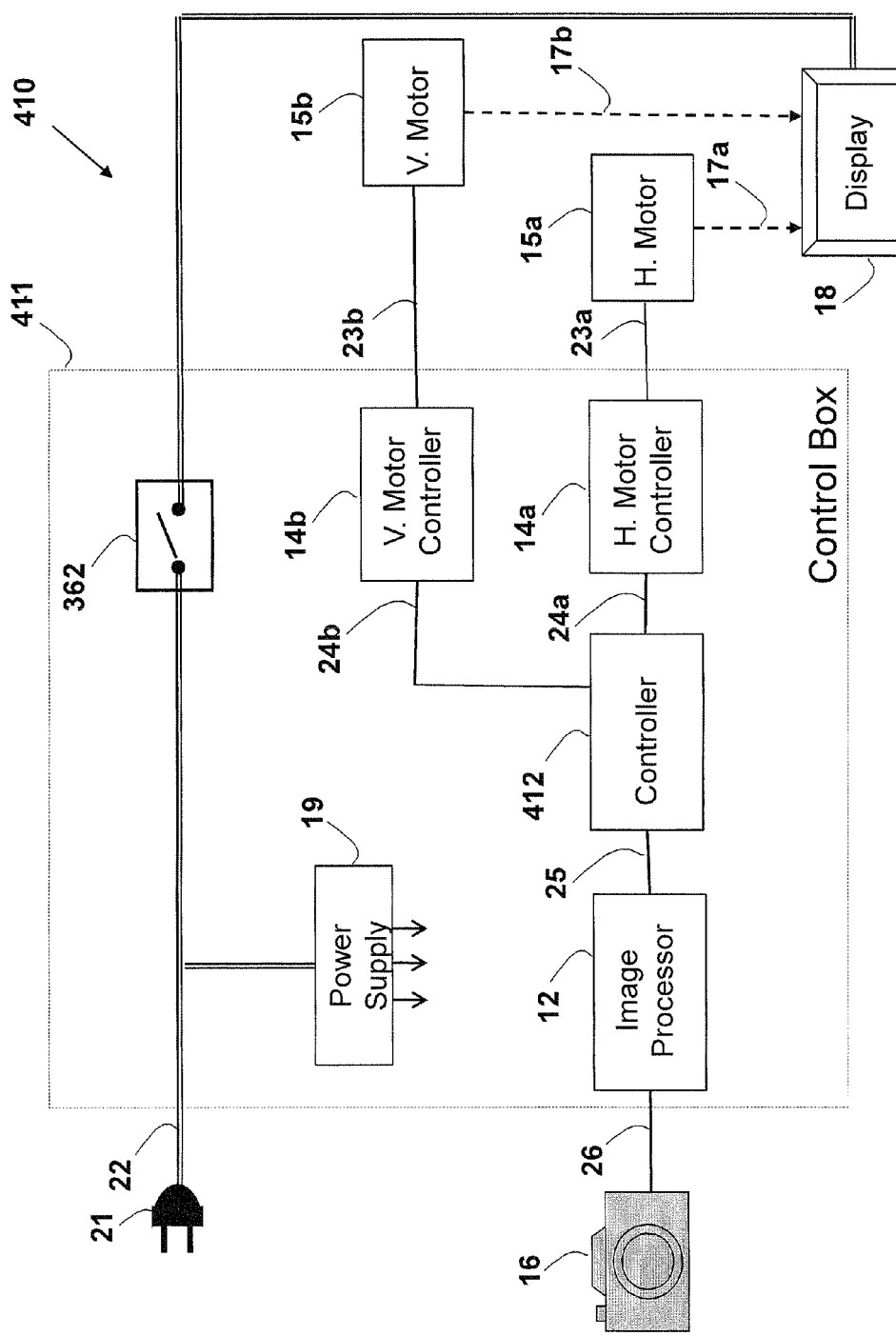
FIG. 41 illustrates schematically a simplified general functional block diagram of a system according to the invention.

System 410 shown in FIG. 41 is a block diagram of a system according to the invention which uses the face detection functionality for both obtaining a better viewing of the display 18 as described above (for example with regard to FIGS. 1 to 35), and for controlling the screen functions (e.g. turning on/off as exampled in FIGS. 36 to 40). The block diagram 300 shown in FIG. 30 is combined with the system 360 shown in FIG. 36, making an efficient use of the common components such as camera 16 and power supply 19. Controller 412 combines the functions of controller 363 with the functions of controller 13, and the control box 411 is used to house all the relevant components as shown in FIG. 41.

Figure 42:
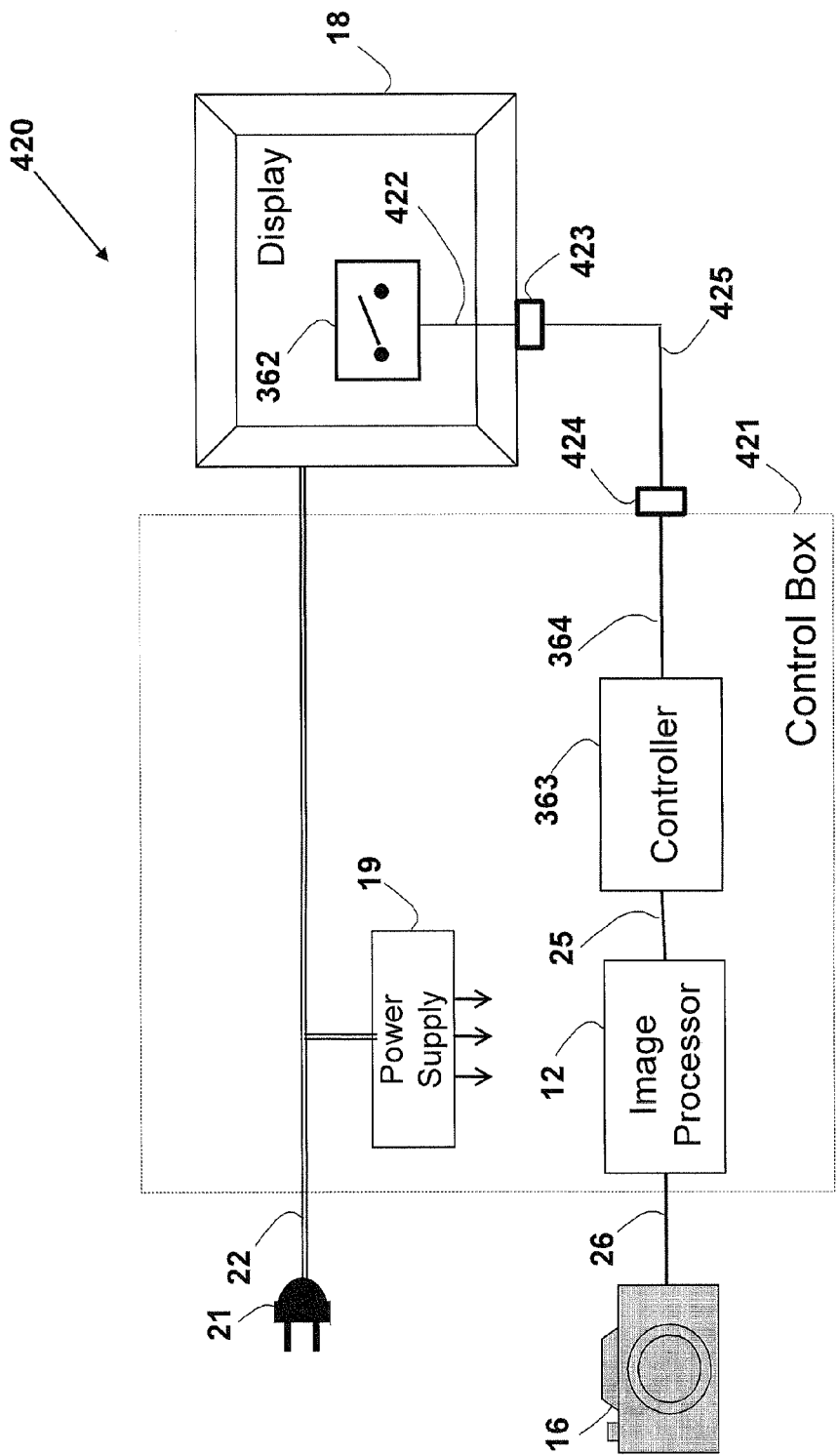
FIG. 42 illustrates schematically a simplified general functional block diagram of a system according to the invention.

While the invention has been exampled above in FIG. 41 with regard to turning the display 18 on and off by connecting or disconnecting the power to the display 18 (allowing the usage with any type of a display 18), the invention may equally apply to the case wherein the controlled functionality is internal to the display 18. For example, only the power to the screen itself (e.g. the LEDs—Light Emitting Diodes illuminating the screen) may be stopped, thus blanking the display. Alternatively, the display 18 may be commended to shift to a shutdown mode, similar to the mode used upon turning off a display by a remote control. Further, excessive power on/off actions (for the whole display 18 system) may reduce its operative life span. An example of such a system 420 is shown in FIG. 42. The switch 362 is internal to the display 18 and controlled via connection 422 connected to a connector 423, and effect only part of the display 18 functions, such as only excessive power consuming circuits or limited life span components. Upon decision to turn off, the control box 421 comprises a connector 424, used for connecting to the display 18 via cable 425. Thus, the controller 363 extends its control port 364 to manage and control the switch 362 internal to the display 18.

Figure 37:
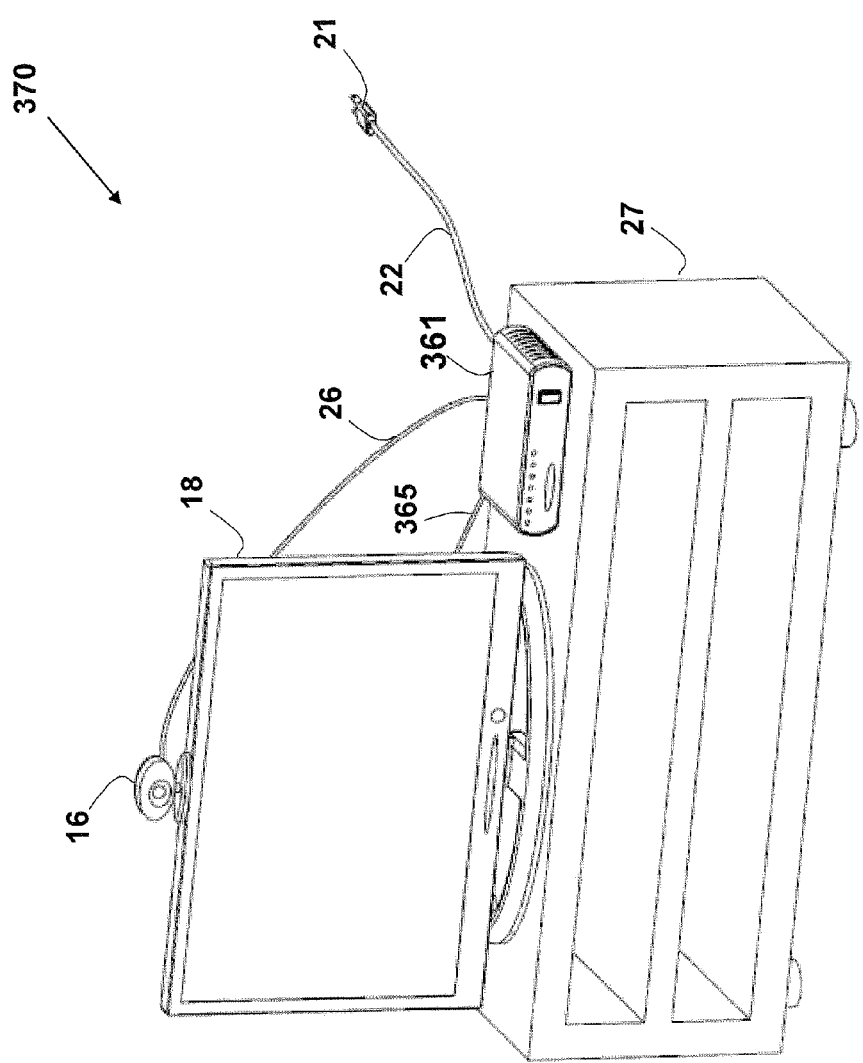
FIG. 37 illustrates schematically a perspective front view of a system according to the invention.
Figure 38:
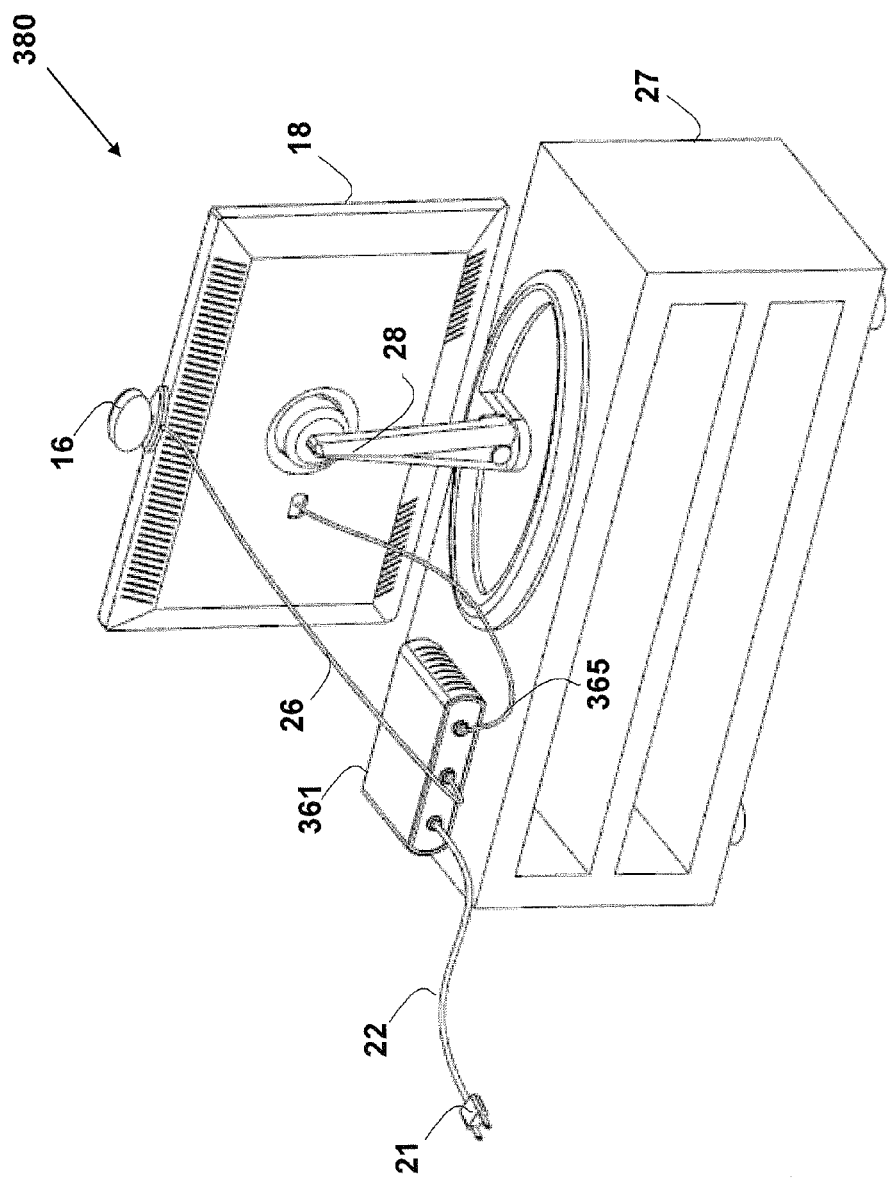
FIG. 38 illustrates schematically a perspective rear view of a system according to the invention.
Figure 39:
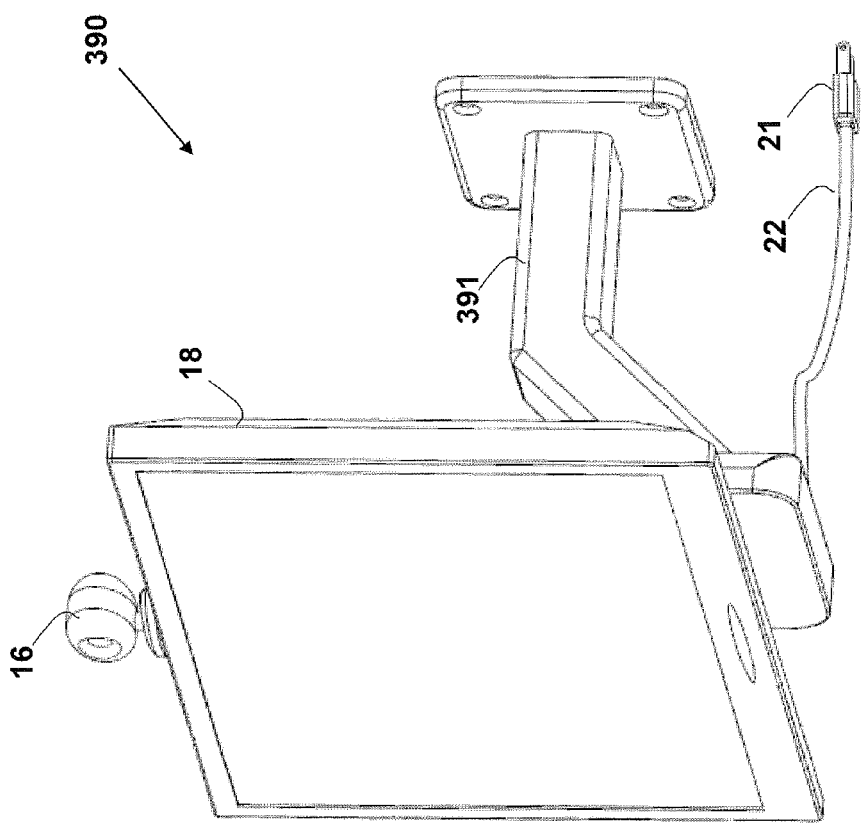
FIG. 39 illustrates schematically a perspective front view of a system according to the invention.

A pictorial perspective front view 370 of such a system is shown in FIG. 37, and a pictorial perspective rear view 380 of such a system is shown in FIG. 38. These views are similar respectively to views 20 and 30 shown in FIGS. 2 and 3 respectively, where the motor 15 (and its associated parts such as axis 17) is not used. The display power cord 365 is shown connecting the display 18 to the control box 361 for receiving power therefrom via the switch 362.

While the invention has been exampled above with regard to the display 18 placed on a horizontal plane such as drawers chest 27, the invention may equally apply to other positioning means such as wall (or other vertical plane) mounting. An example of a wall mounting system is shown in view 390 in FIG. 39, wherein a wall mounting fixture 391 is used, including a bracket for wall mounting.

While the invention has been exampled above with regard to using face detection to control various devices, the invention may equally apply to the case wherein the system is using detection relating to other human organs. Further, the invention may equally apply to the case wherein active action from the person involved is detected such as a gesture made by a part of the human body, and detected by the image processor 12. For example, nodding, bobbling or shaking can be used as indication to be detected by the image processor and used for various remote control applications.

Figure 43:
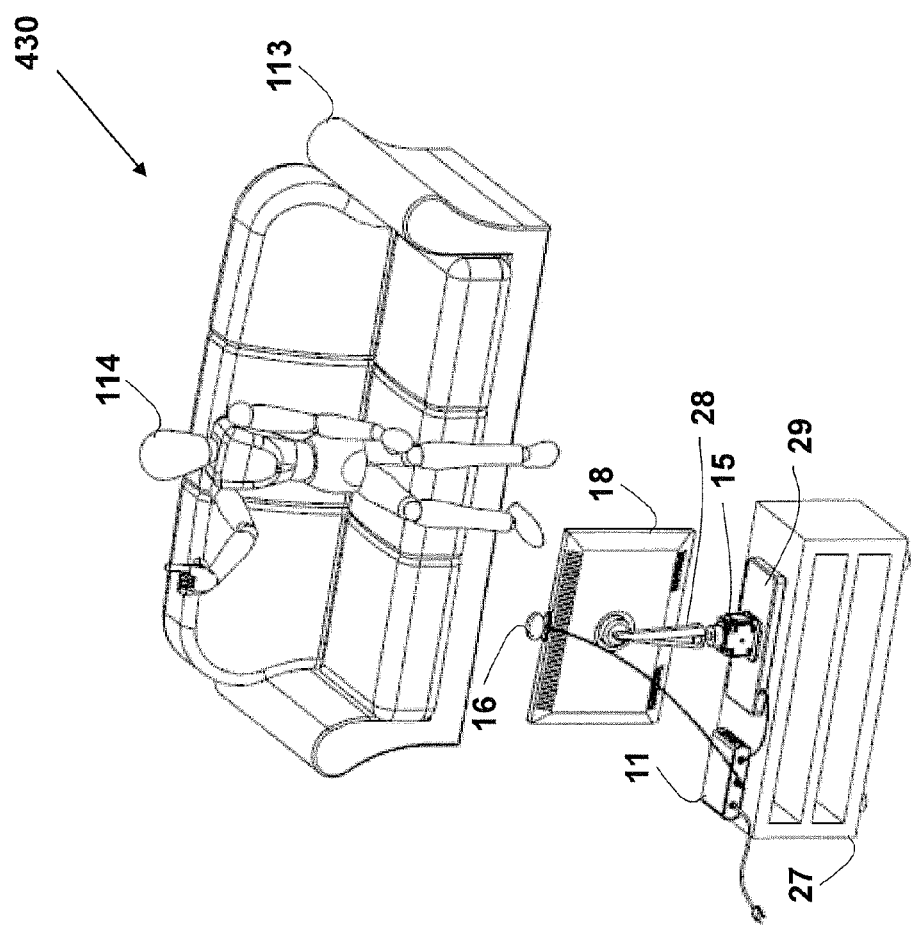
FIG. 43 illustrates schematically a perspective front view of a room according to the invention.
Figure 46:
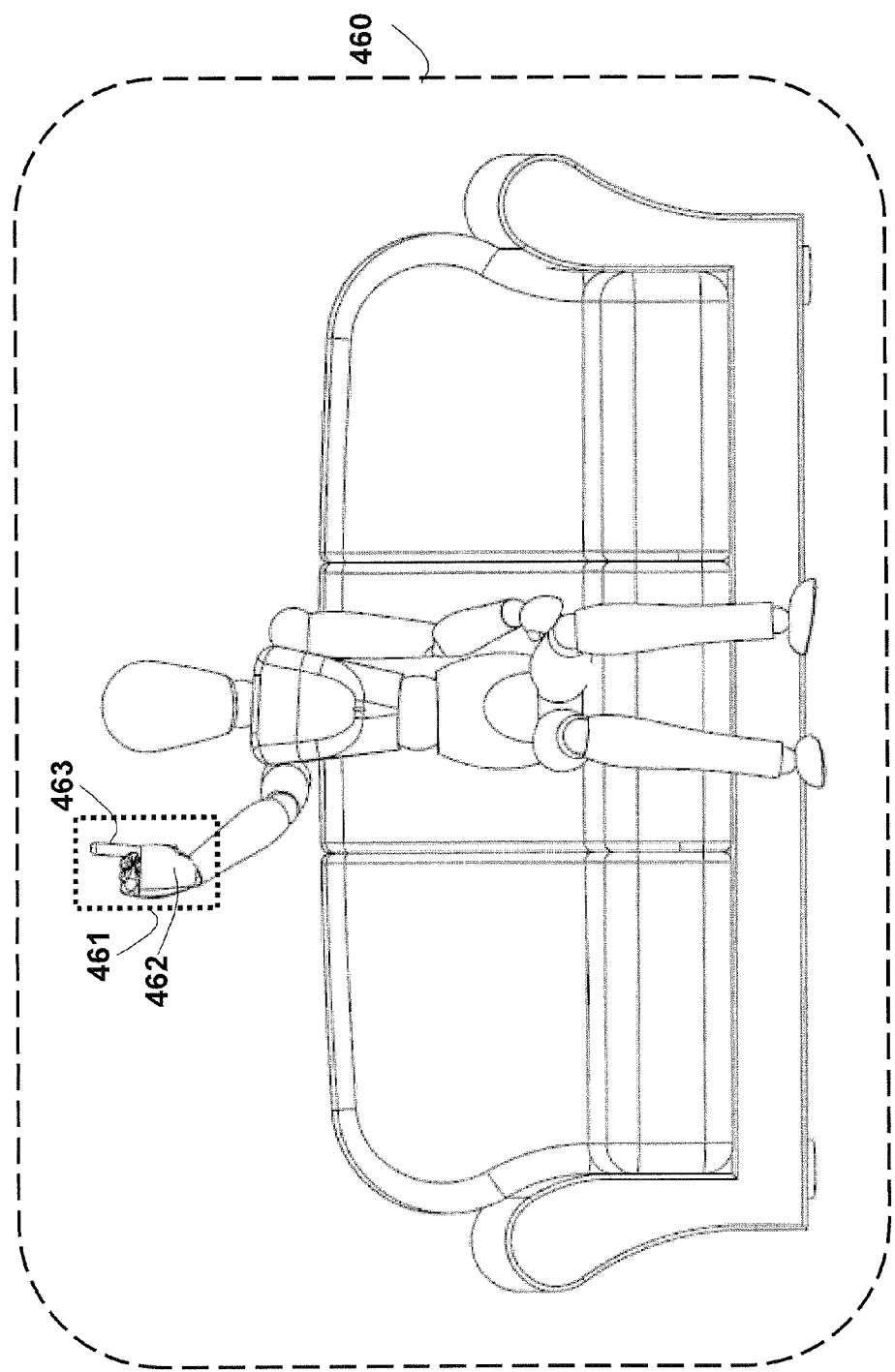
FIG. 46 illustrates schematically an image captured and analyzed in a system according to the invention.
Figure 47:
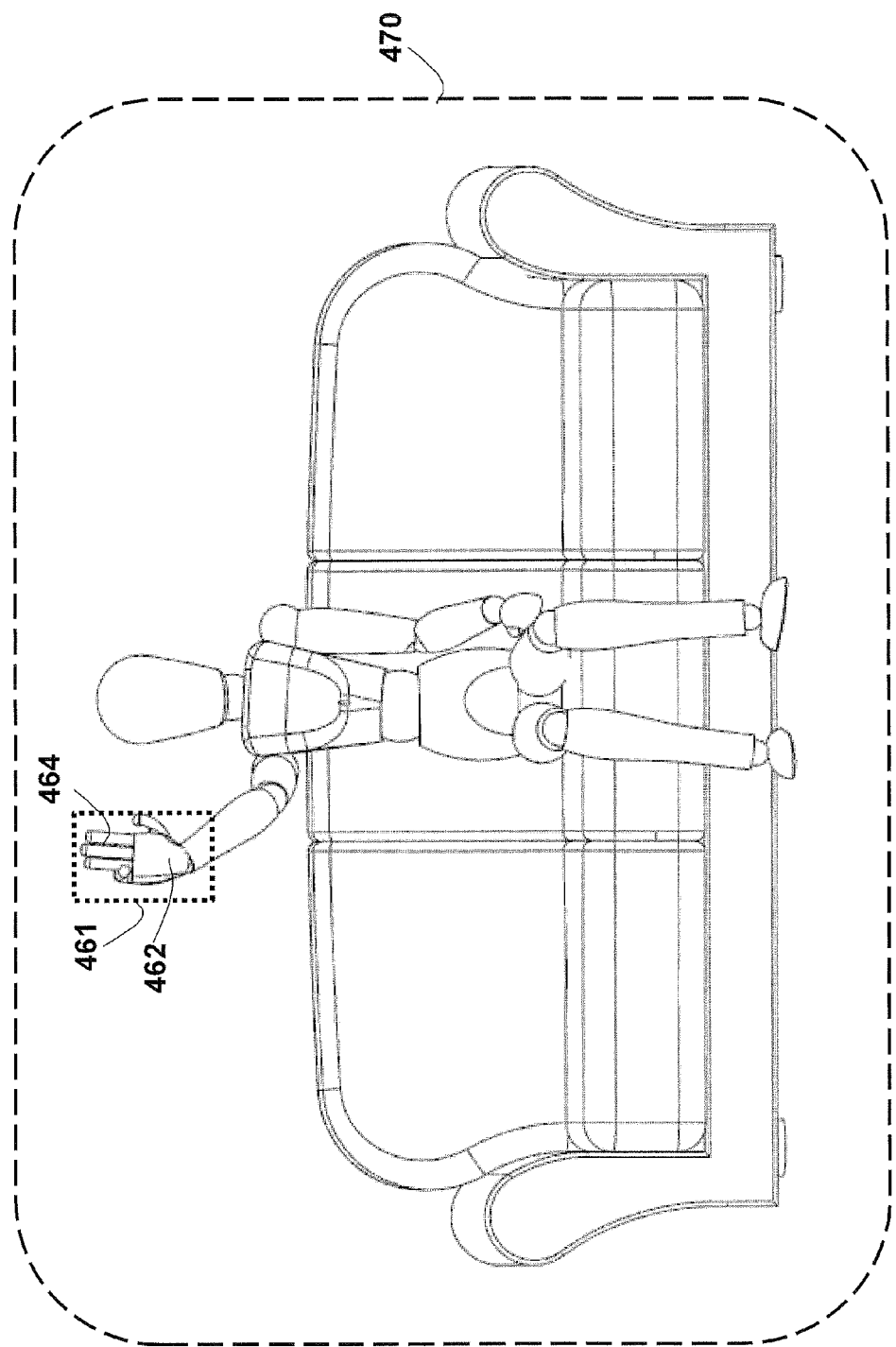
FIG. 47 illustrates schematically an image captured and analyzed in a system according to the invention.

In one example, hand gesture is used for signaling the system, as exampled in FIGS. 43 to 46. FIG. 43 shows a perspective rear view 430, FIG. 44 shows a side view 440 and FIG. 45 shows a top view 450. As shown in the views in these figures, the person 114 on the sofa 113 signal the system by a hand gesture, consisting of extracting only the index finger, thus 'pointing' to the ceiling of the room. While the above description referred to the image processor 12 performing face detection algorithms such as in 'Face Detection' step 103 in flow chart 100 (and 'Face Detected' steps 404 and 408 in flow chart 400), the image processor 12 executes 'hand gesture detection' algorithms in order to detect the hand gesture made by the person 114. The analysis results are exampled in the image captured 460 in FIG. 46, wherein the hand 462 (or the palm) is detected as shown in the dashed rectangular 461, and the index finger 463 is detected and identified as pointing upwards.

Figure 48:
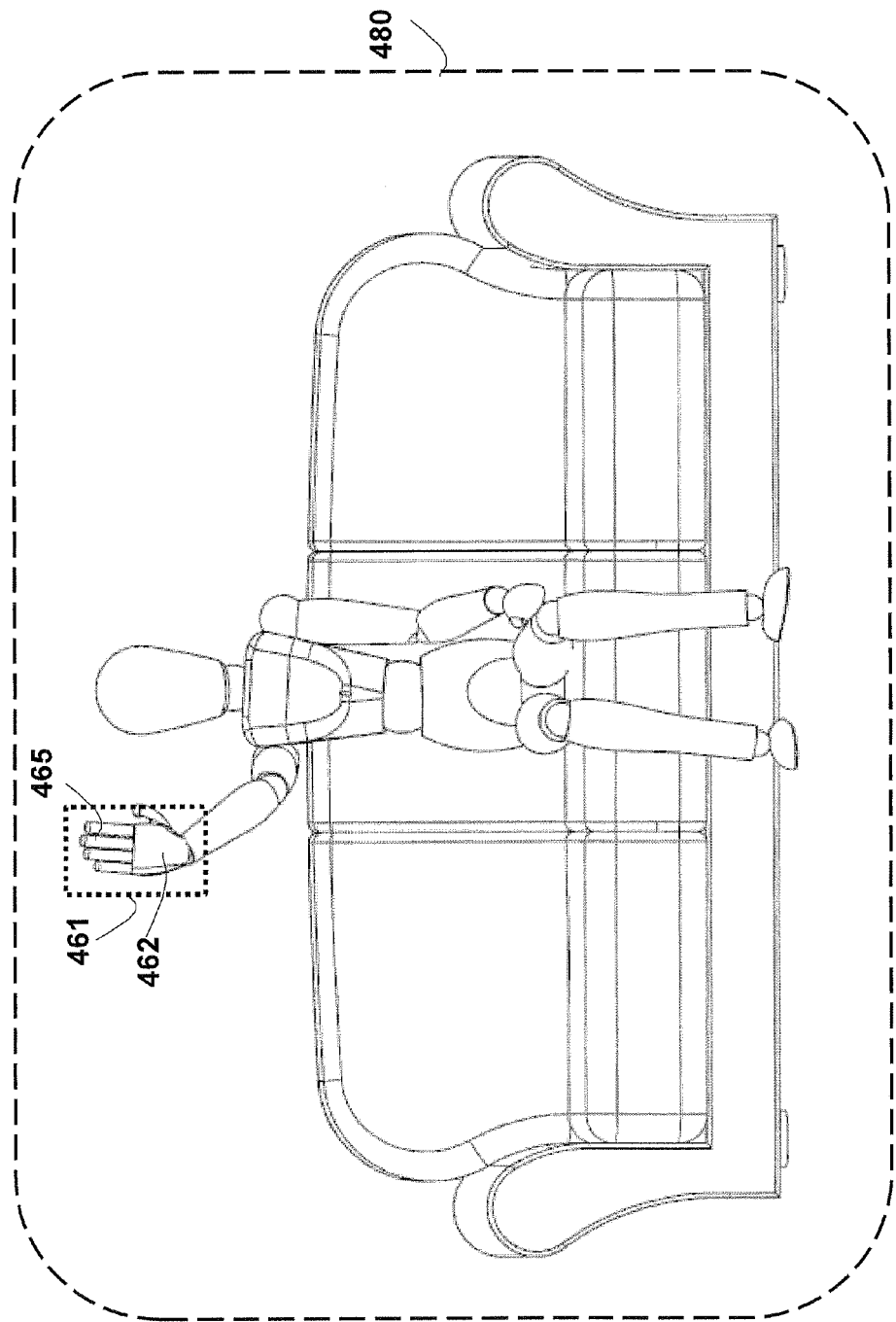
FIG. 48 illustrates schematically an image captured and analyzed in a system according to the invention.
Figure 49:
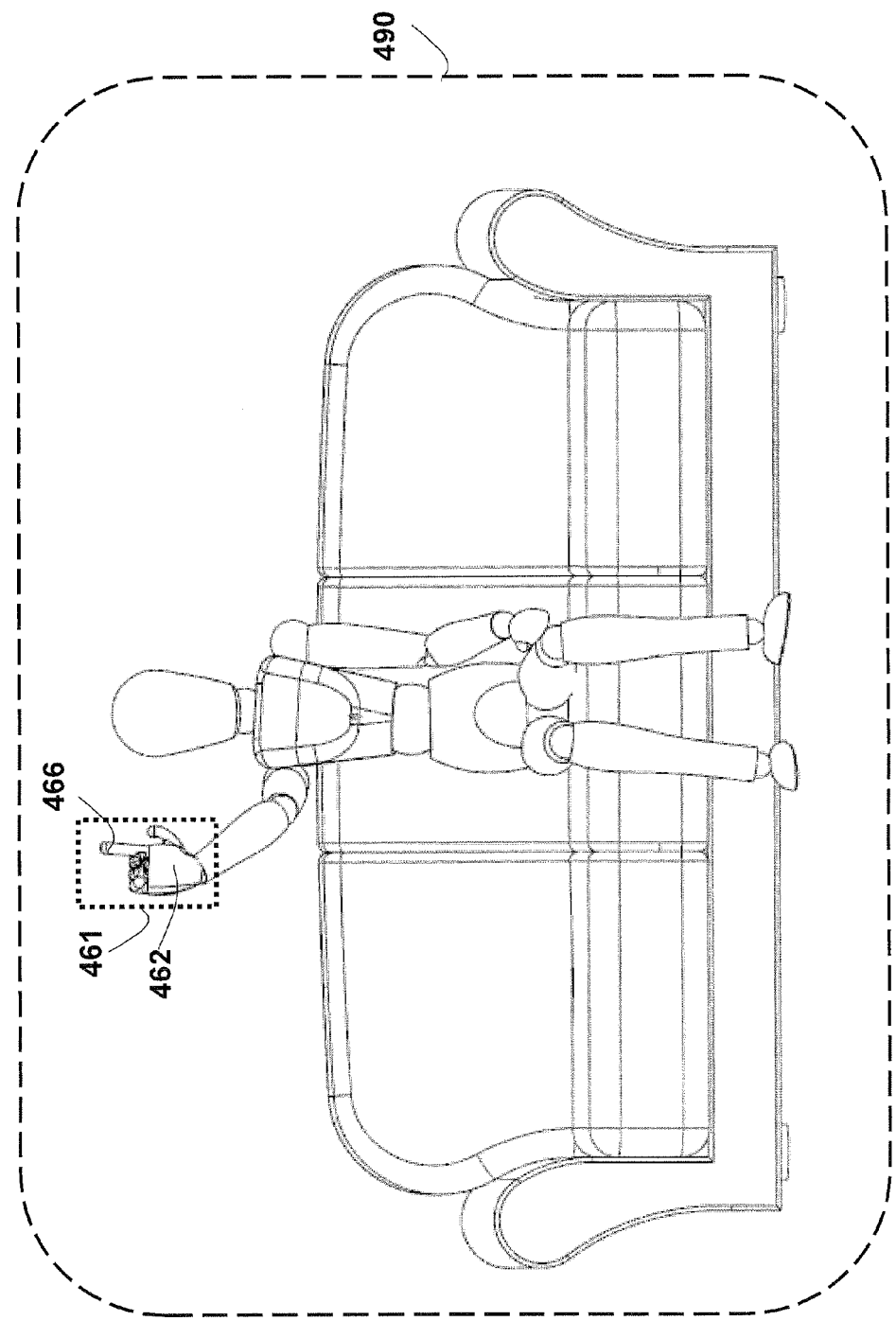
FIG. 49 illustrates schematically an image captured and analyzed in a system according to the invention.
Figure 50:
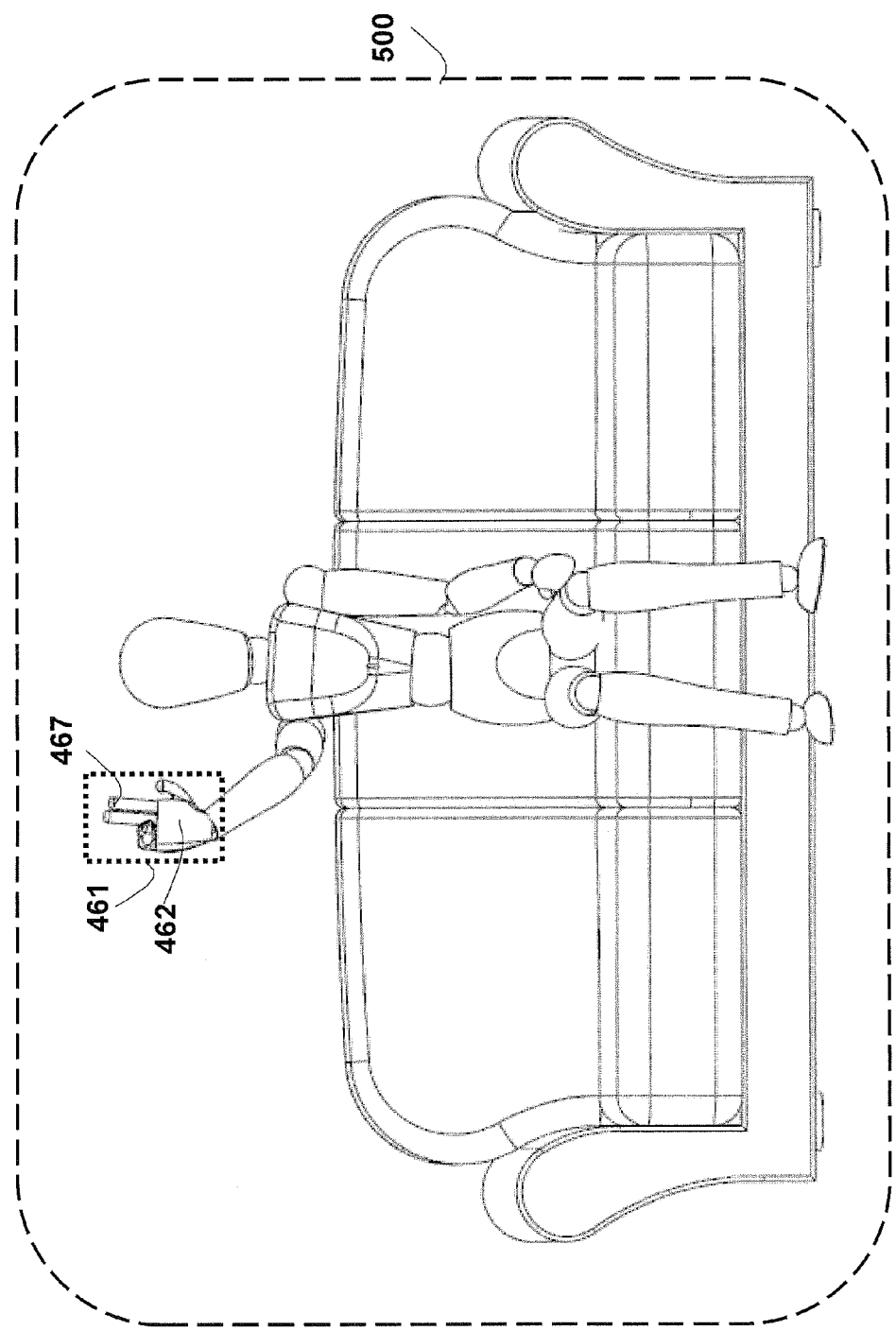
FIG. 50 illustrates schematically an image captured and analyzed in a system according to the invention.

Similarly, other hand gestures may be signaled and detected (and identified as such), involving extending of all or part of the fingers. For example, image view 470 shows three fingers 464 raised (the index, middle and ring fingers, added to the thumb). Similarly, image view 480 in FIG. 48 detects a person extracting all his/her fingers 465, and image view 490 in FIG. 49 shows a case wherein only an index finger 466 is raised (added to the thumb). Two fingers 467 (index and middle) and a thumb are shown detected in the hand 462 as part of image 500 in FIG. 50.

Figure 51:
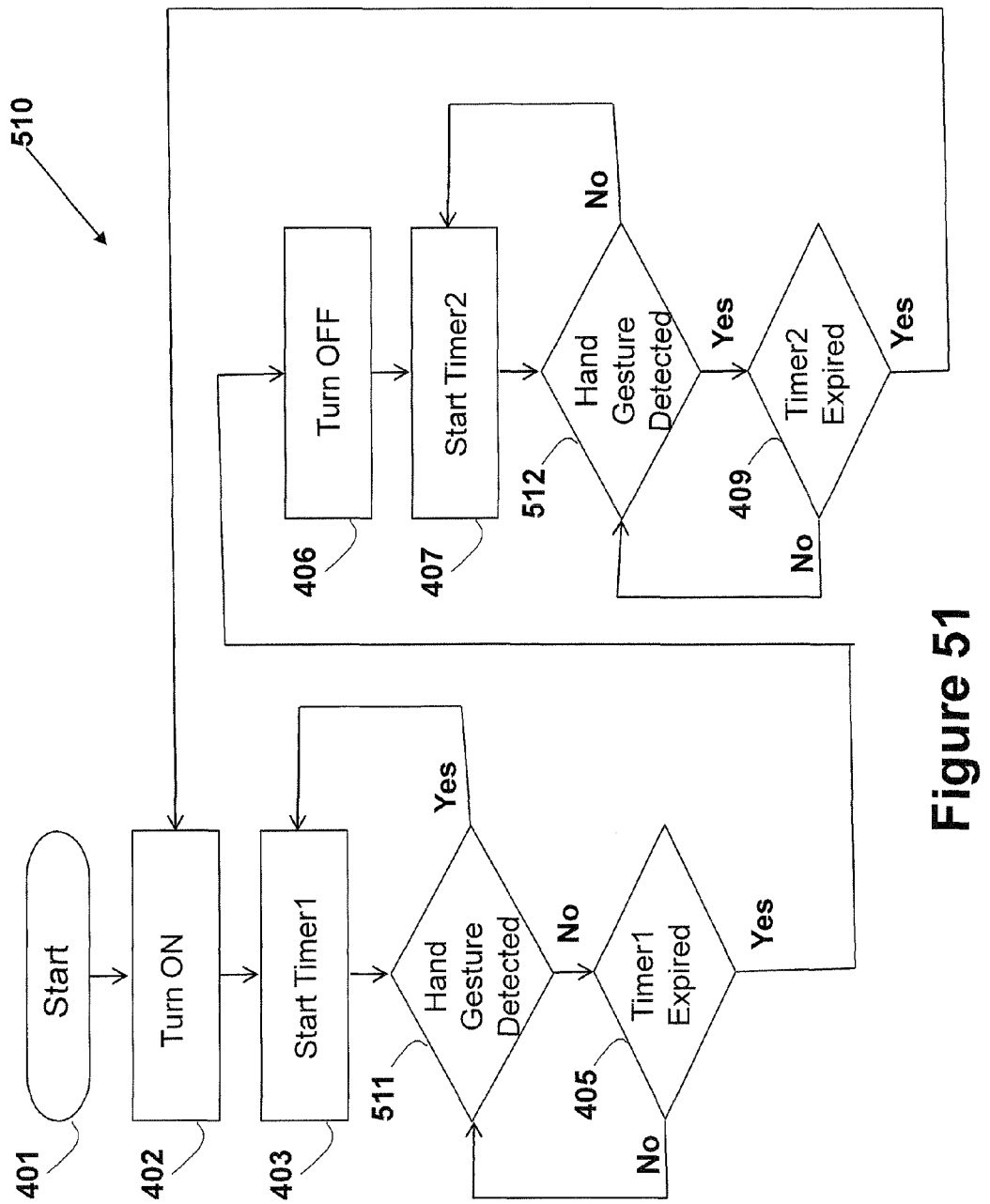
FIG. 51 illustrates schematically a flow chart of the system operation according to the invention.

In one embodiment, the hand gesture is used to control the display 18 as a substitute to the face detection described above. For example, the control may involve turning the display 18 on and off as described above relating to FIGS. 36 to 42, wherein the image processor 12 is notifying the controller 412 regarding the detection of a hand gesture. An operation of such a system is described in flow chart 510 shown in FIG. 51, based on the flow chart 400 shown in FIG. 40 and described above. The 'Face Detected' steps 404 and 408 are respectively replaced with 'Hand Gesture Detected' steps 511 and 512, wherein the 'Yes' branch related to the event when a hand gesture is detected and identified by the system.

Remote controls are known in the art as electronic devices used for the remote operation of equipment. Wired or wireless remote control devices including Infra-Red (IR) or RF transmitter for remotely operating AC powered electrical appliances such as television receivers, home heaters, air conditioners, motorized curtains, lighting and other electrical appliances in homes, apartments, offices and buildings in general are switched on and off by a one way control or command signal. In most cases, the person operating the remote control device verifying the on or off status of the operated device by visual means, such as the TV is on, or the lights are off, or the air-condition unit is activated or not, by being at the site of the operated appliance. Commonly, remote controls are Consumer IR devices used to issue commands from a distance to televisions or other consumer electronics such as stereo systems DVD players and dimmers. Remote controls for these devices are usually small wireless handheld objects with an array of buttons for adjusting various settings such as television channels, track number, contrast, brightness and volume. In fact, for the majority of modern devices with this kind of control, the remote contains all the function controls while the controlled device itself only has a handful of essential primary controls.

Figure 52:
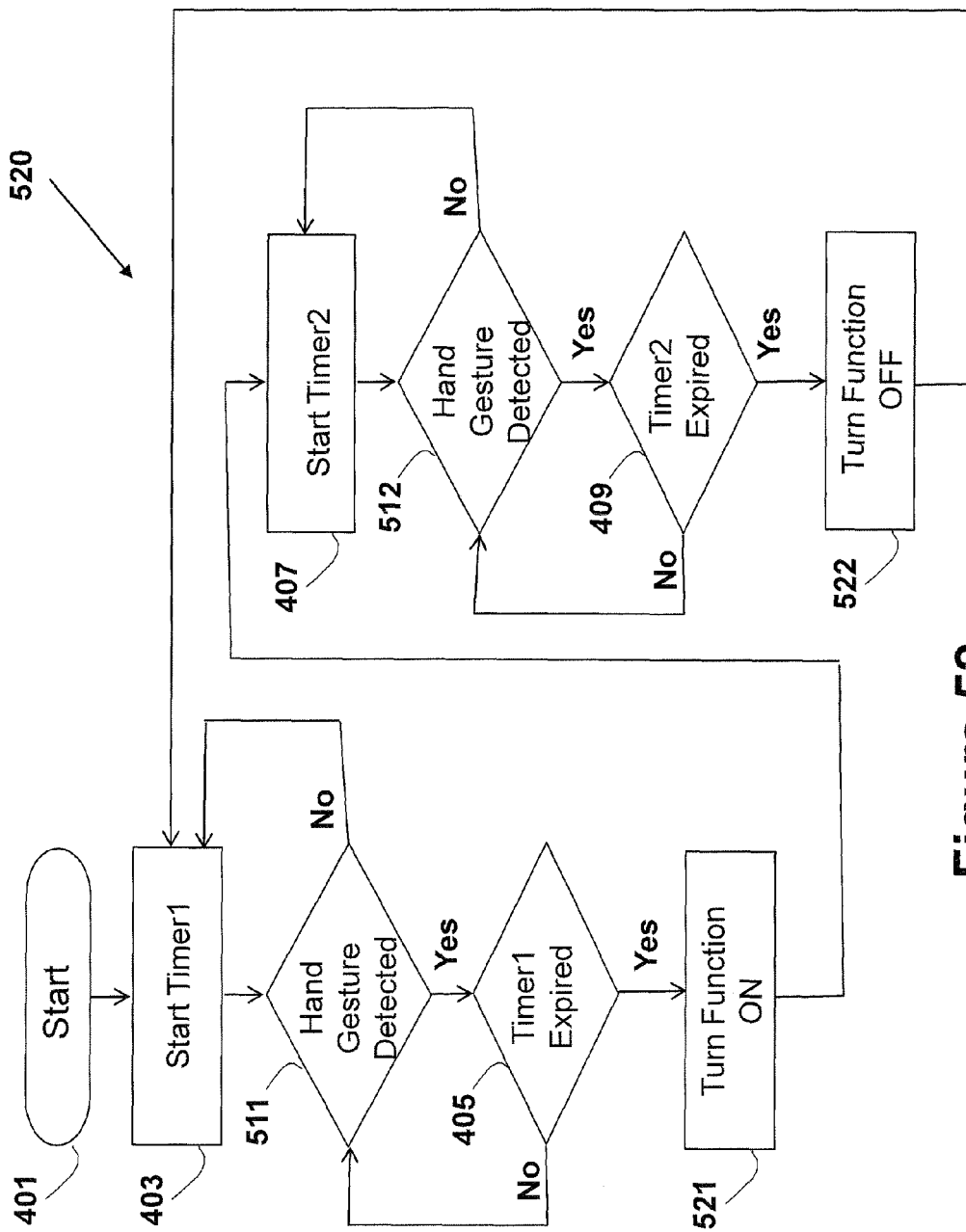
FIG. 52 illustrates schematically a flow chart of the system operation according to the invention.

Using face detection or hand gesture detection can replace part of or all the functions of a remote control unit, thus obviating the need for using such additional and dedicated device for control. In one embodiment, the system is used for turning on and off a specific function in the controlled device, or in general switching from one state to the other of two states. In the example of a display 18 being controlled (e.g. television set), the function controlled may be turning the display on and off by supplying or disconnected power to the display (e.g. as disclosed in FIG. 36), a 'mute' function or a 'pause'/'continue' command to a DVD player. Such system operation may be based on the flow chart 520 shown in FIG. 52, wherein the 'Turn ON' step 402 and the 'Turn OFF' step 406 are substituted with the 'Turn Function ON' step 521 and 'Turn Function OFF' step 522. The 'Turn Function ON' step 521 is executed after the hand gesture is detected in 'Hand Gesture Detected' step 511 for at least the period Timer1, and the 'Turn Function OFF' step 522 is executed after the hand gesture is detected in 'Hand Gesture Detected' step 512 for at least the period Timer2. In the 'Turn Function ON' step 521 the function commanded (e.g. 'mute') is activated (e.g. power turned on in the case of on/off control) or switched to a first state (out of two states available), while in the 'Turn Function OFF' step 522 the function commanded (e.g. 'mute') is deactivated (e.g. power turned off in the case of on/off control) or switched to the other state (out of two states available). In the case wherein more than two states are available in the involved function, such as television channels wherein multiple channels are available to choose from, or in the case of a track number in a DVD player, and volume having continuous or multiple discrete steps, the hand gesture can be used to signal a single step of the function. For example, each time a detection of a hand gesture occurs may signal to shift to the next television channel, to the track number or to the next volume level. In such control scheme, the 'Turn Function ON' step 521 (or the 'Turn Function OFF' step 522 or both steps) activates the controlled unit to shift to the next step or level, out of the multiple steps relating to the required function.

In one embodiment only a single hand gesture can be detected. For example, the system may only detect the hand gesture involving extending only the index finger as shown in FIGS. 43 to 46. Such system may use simple image processor 12 since only a single object needs to be detected, and such detection of the hand gesture will be detected in 'Hand Detection Detected' steps 511 and 512 in flow chart 520. The detected hand gesture may be used for a single activation (or deactivation) of a function. Alternatively, the hand gesture may be used to continuously toggle between activation and deactivation of a function, wherein each such new detection of a hand gesture results in switching from a state to the other (or shifting to the next level or step), as described in flow chart 520 in FIG. 52.

In another embodiment, multiple hand gestures can be detected and identified by the image processor 12. In this case, separate hand gestures may be used for activation or deactivation of a function. For example, the hand gesture of 'pointing up' shown in FIGS. 43 to 46 can be detected and identified, together with the 'all fingers up' gesture shown in view 480 in FIG. 48. For example, the 'pointing up' gesture will be detected in 'Hand Gesture Detected' step 511 in flow chart 520 and will cause to activate the function in 'Turn Function ON' step 521, while the 'all fingers up' gesture will be detected in 'Hand Gesture Detected' step 512 in flow chart 520 and will cause to deactivate the function in 'Turn Function OFF' step 522. Similarly, one hand gesture may cause a multiple states function (such as television channel selection) to shift upwards while the other hand gesture may result in shifting downwards. For example, assuming the television set is currently set to channel 15, one gesture shifts to channel 16 ('upwards'), while the other shifts to channel 14('downwards' Similarly, one type of hand gesture detected may affect increasing the volume for a louder result, while the other will lower the volume to more silent performance.

While the invention has been exampled above with regard to using hand gestures for a single function control, the invention may equally apply to the case wherein multiple types of hand gestures will be used to control multiple functions. For example, each hand gesture may be used to control a single function, such as one hand gesture for 'mute', one for 'volume' and one for turning the television on and off.

Figure 53:
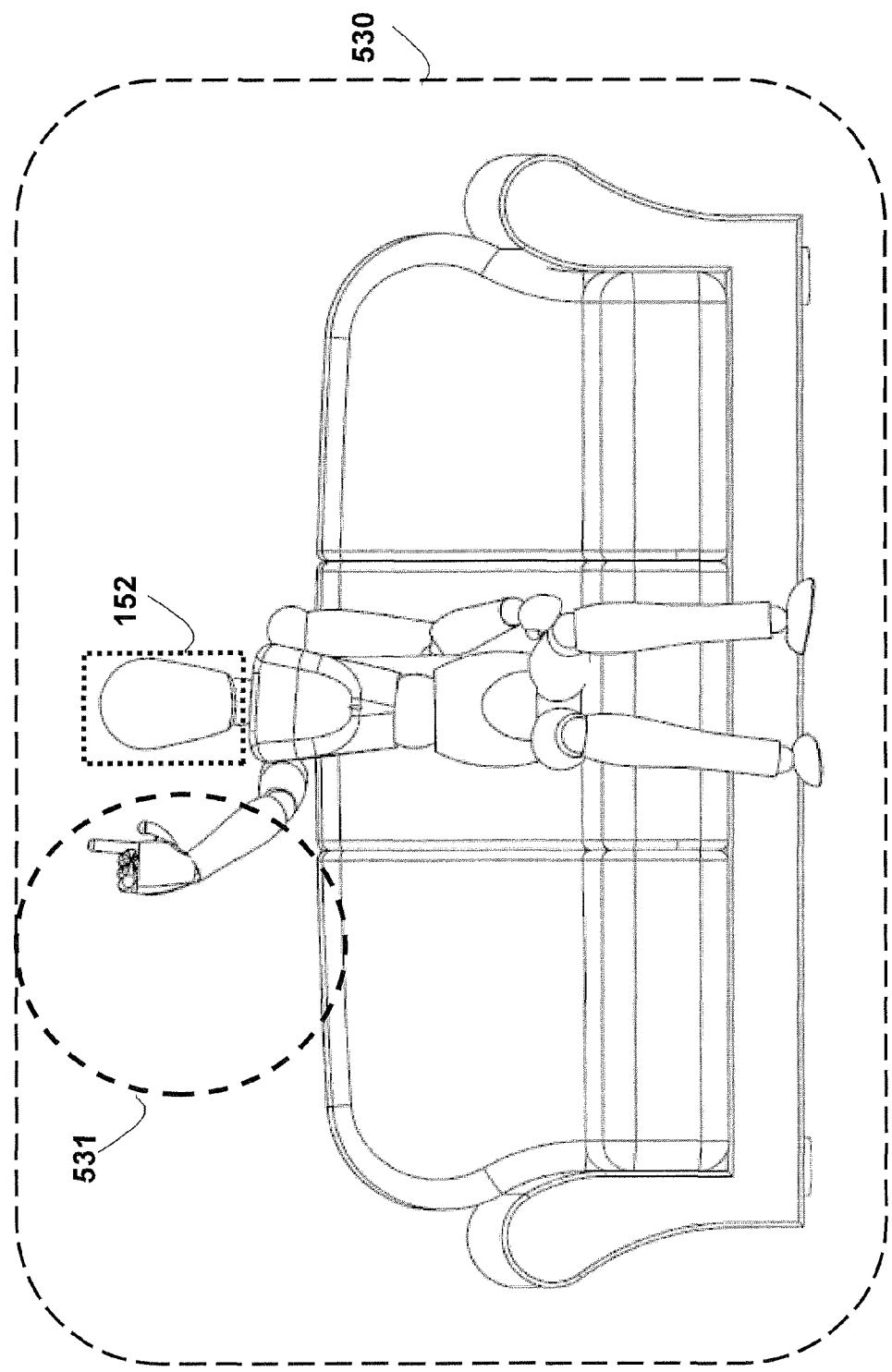
FIG. 53 illustrates schematically an image captured and analyzed in a system according to the invention.
Figure 54:
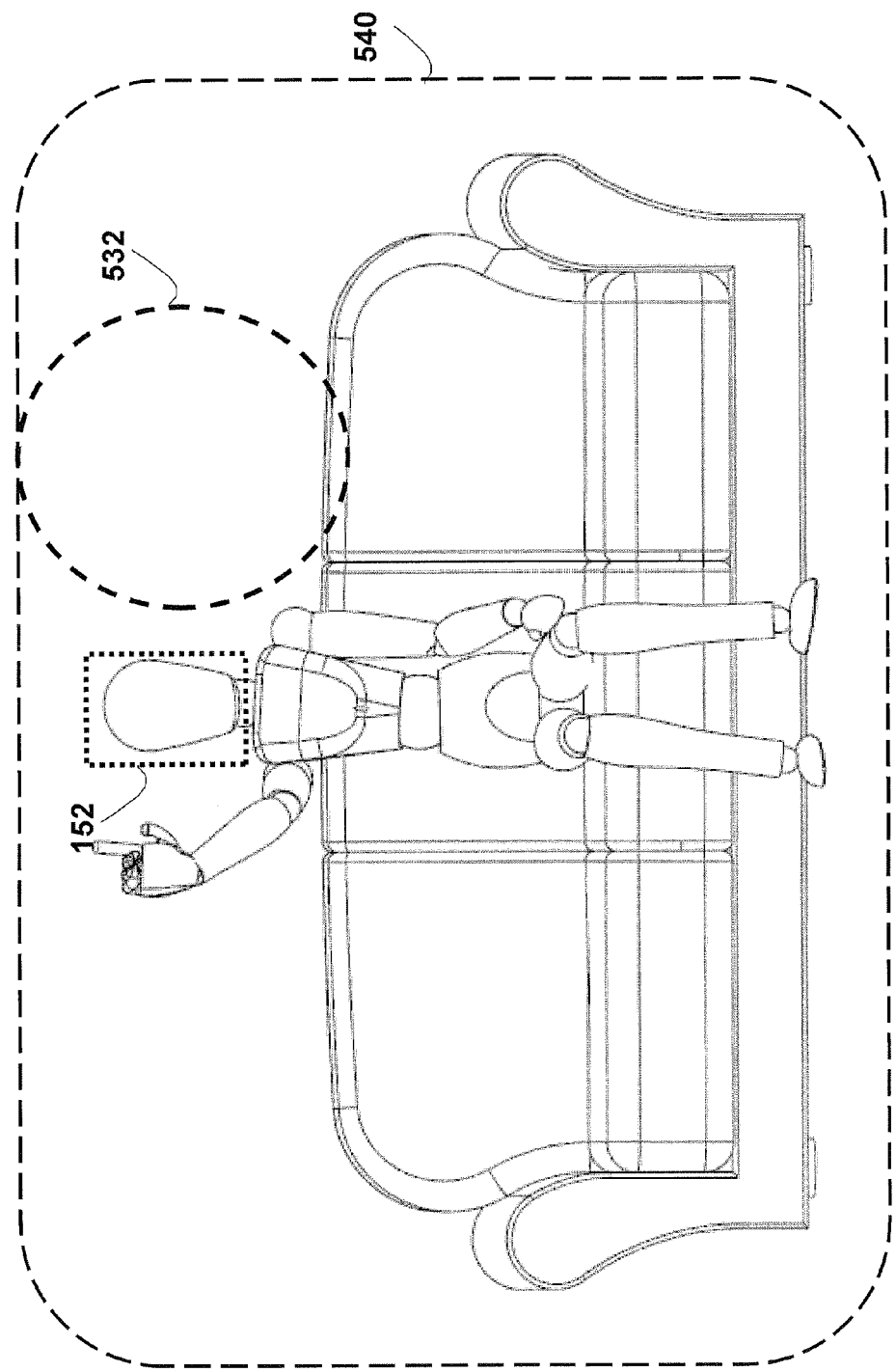
FIG. 54 illustrates schematically an image captured and analyzed in a system according to the invention.

In one embodiment, the image processor 12 is capable of detecting both hand gestures and human faces. Such capability can be used in order to increase the reliability of the hand gesture and to minimize false hand gesture detection by searching for hand gesture in the image only if a face is detected in that image, since it is assumed that the hand gesture is signaled by a person viewing the display 18, and thus his/her face is captured in the camera image. Hence, items which may be falsely identified as a hand gesture being of similar shape, will not be considered and thus will not be identified as a hand gesture. Further, since the location of the face and the hand of a person are related, this can be further used to improve the system performance, by searching and applying the algorithms for detecting hand gestures only in a defined location based on the detected face location. An example is shown in image 530 shown in FIG. 53, based on image 460 in FIG. 46. The face detection mechanism will detect the face, as shown in the dashed rectangular 152 as described above. Assuming right-hand person, the probable location of the signaling hand is expected (based on normal human dimensions) to be in the circled area 531, hence the hand gesture detection should only search for a hand gesture in this area 531, saving processing time and minimizing false detection. Similarly, for a left-handed person, the circle is placed to the person left side as shown in area 532 as part of image 540 in FIG. 54.

While the invention has been exampled above wherein the camera 16 transmits the image to the image processor 12 via cable 26, the invention may equally apply to the case wherein no such cable 26 is used for the communication. In one embodiment according to the invention, the camera 16 is cordless, thus untethered and fully portable. In such a configuration, the camera 16 is preferably battery operated, thus powered from an internal battery during operation without the need to connect to a power source, such as AC power via a cord. Further, the image is transmitted over the air using radio frequency, thus obviating the need for a cable or any other conductor connecting the camera 16 and the control box. It is apparent the radio communication of the image can be implemented also in the case of AC powered (via cable) camera.

Figure 55:
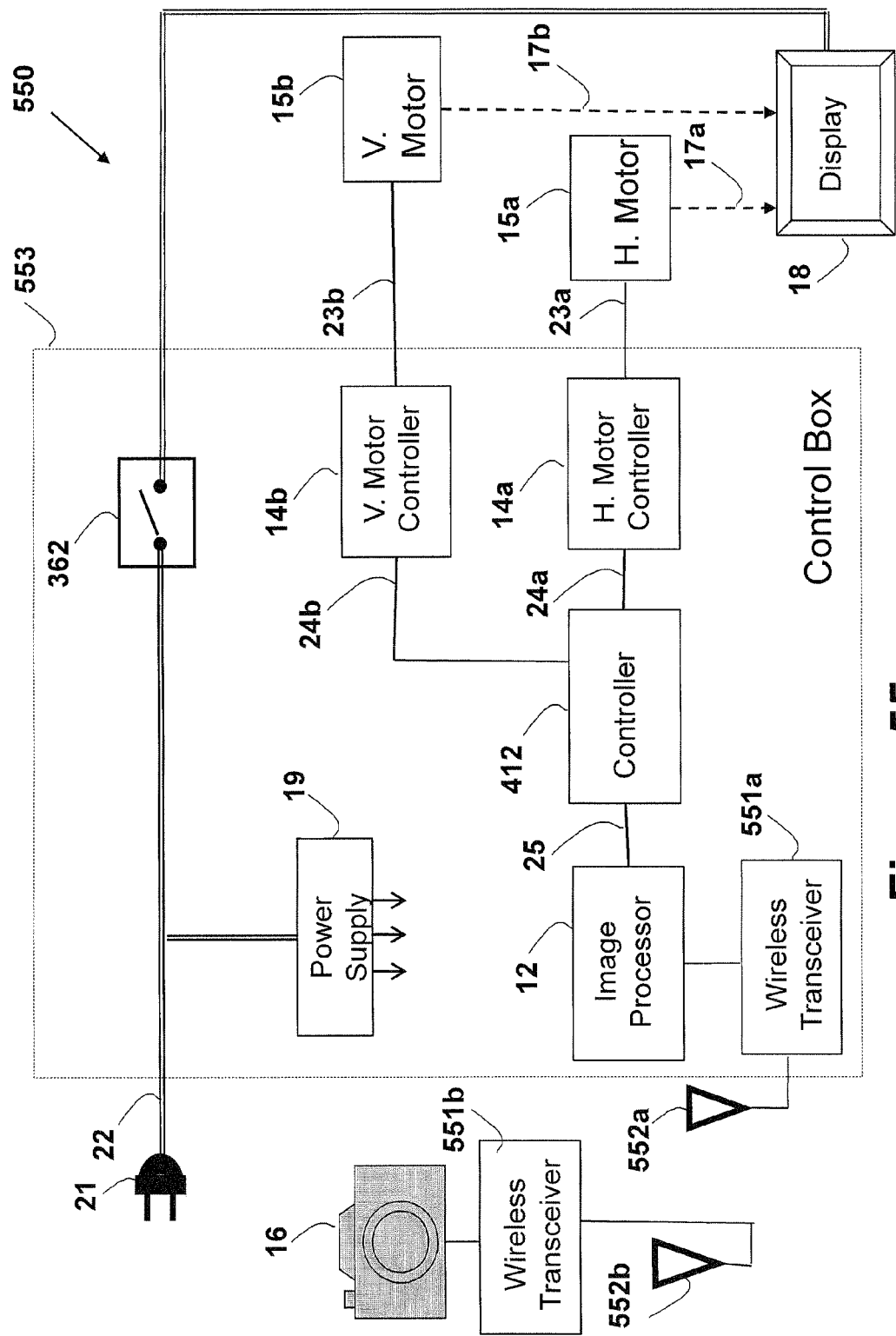
FIG. 55 illustrates schematically a simplified general functional block diagram of a system according to the invention.

Such a system 550 is shown in FIG. 55, adapter from system 410 in FIG. 41. The transceiver 75 in camera 16 shown in FIG. 7 is substituted with wireless transceiver 551b, connected to antenna 552b. The wireless transceiver 551b may be internally to the camera 16 enclosure or in a separate housing. The control box 553 (adapted from control box 411 in FIG. 41) comprises a mating wireless transceiver 551a connected to antenna 552a. The image is transmitted from the camera 16 via the wireless transceiver 551b and antenna 552b over the air communication, to be received at the antenna 552a and wireless transceiver 551a. Hence, no cable is required between the camera 16 and the control box 553, thus avoiding the inconvenience associated with such cord. Various types of antennas 552a and 552b (or any other radio ports) can be used. Among these are PCB printed antennas, chip antennas, as well as panel and dome antennas. Furthermore, the antennas may be omni-directional or directional. Typically, the antennas are coupled using mating coaxial connectors, such as SMA, F-Type, N-Type and IPX, providing both the electrical connection as well as the mechanical attachment. In many cases, the antenna connection allows for easy disconnection and connection by means of snapping or screwing.

Similarly, while the invention has been exampled above in system 420 shown in FIG. 42 wherein the controlled display 18 is controlled via cable 425, the invention may equally apply to the case wherein no such cable 425 is used for the control or communication link. In one embodiment according to the invention, this control link is cordless, thus untethered and fully portable. Hence the control information is transmitted over the air using radio frequency, thus obviating the need for a cable or any other conductor connecting the control box and the display unit 18.

Figure 56:
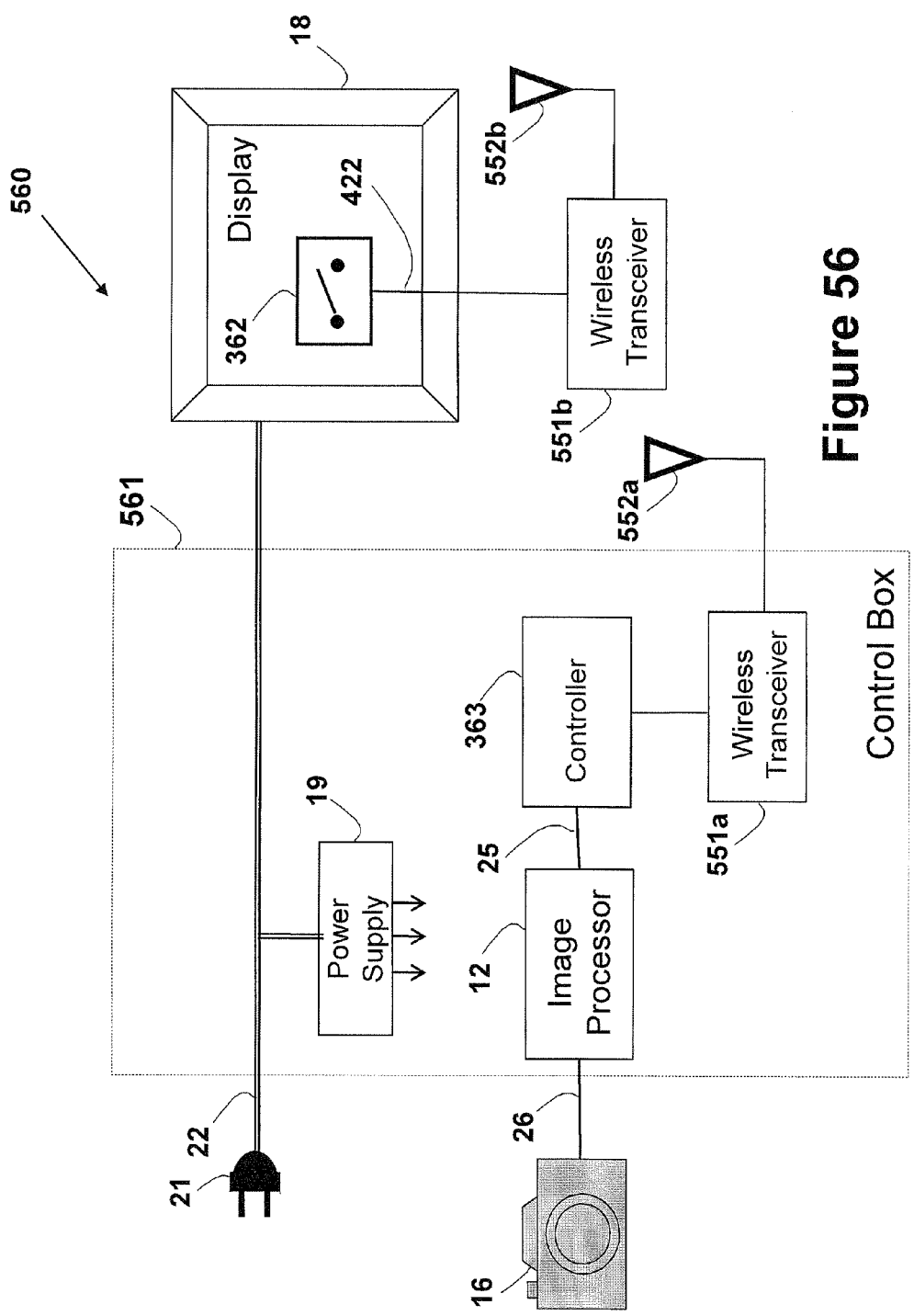
FIG. 56 illustrates schematically a simplified general functional block diagram of a system according to the invention.

Such a system 560 is shown in FIG. 56, adapter from system 420 in FIG. 42, wherein the connector 424 in the control box 421 is replaced with a wireless transceiver 551a in control box 561 (adapted from control box 421 in FIG. 42), connected to antenna 552a. A mating wireless transceiver 551b connected to antenna 552b are added to the display 18 side, and may be separated or housed integrally within the display 18 housing. The control information is transmitted from the controller 363 in control box 561 via the wireless transceiver 551a and antenna 552a over the air communication, to be received in the antenna 552b and wireless transceiver 551b. Hence, no cable is required between the display 18 and the control box 561, thus avoiding the inconvenience associated with such cord. Various types of antennas 552a and 552b (or any other radio ports) can be used. Among these are PCB printed antennas, chip antennas, as well as panel and dome antennas. Furthermore, the antennas may be omni-directional or directional. Typically, the antennas are coupled using mating coaxial connectors, such as SMA, F-Type, N-Type and IPX, providing both the electrical connection as well as the mechanical attachment. In many cases, the antenna connection allows for easy disconnection and connection by means of snapping or screwing.

Any short-range wireless communication based on free-air propagation can be used for communication between the camera 16 and the control box 553 in system 550, or between the control box 561 and the display 18 in system 560. According to one embodiment of the invention, a WLAN communication link is used to interconnect two or more isolated (W)PAN (Wireless Personal Area Network) systems. The reach of a PAN is typically a few meters, hence such networks are confined to a limited space, such as in-room communication. IEEE 802.15 is the working group of the IEEE 802, which specializes in Wireless PAN (WPAN) standards. Non-limiting examples of WPAN systems include:

a. Bluetooth, which according to IEEE 802.15.1 standard, for example, operates over license-free ISM band at 2.45 GHz. An ad-hoc network of computing devices using Bluetooth technology protocols is known as piconet.
   b. Ultra-Wide-band (UWB), which according to the IEEE 802.15.3 standard, for example, uses a wavelet (sometimes referred to as wireless USB). UWB or impulse radio transmitters emit short pulses approaching a Gaussian monocycle with tightly controlled pulse-to-pulse intervals.
   c. ZigBee, which according to IEEE 802.15.4 standard, for example, offers low data rate and low power consumption.
   d. IEEE 802.11a, commonly considered as WLAN (Wireless Local Area Network), but since it works in 5 GHz spectrum its reach is considerably limited, thus IEEE 802.11a may also be considered as WPAN.

In addition to the above technologies, proprietary networking schemes may also be used for interconnecting the units. Further, the system 553 can make use of WLAN technologies. Currently widespread WLAN technologies (e.g. WiFi) are based on IEEE 802.11 and include IEEE 802.11b, which describes a communication using the 2.4 GHz frequency band and supporting a communication rate of 11 Mb/s, IEEE 802.11a uses the 5 GHz frequency band to carry 54 MB/s and IEEE 802.11g uses the 2.4 GHz band to support 54 Mb/s. Other technologies based on WPAN, WLAN, WMAN, WAN, BWA, LMDS, MMDS, WiMAX, HIPERMAN, IEEE802.16, Bluetooth, IEEE802.15, UWB, ZigBee, cellular, IEEE802.11standards, GSM, GPRS, 2.5G, 3G, UMTS, DCS, PCS and CDMA may be equally used. Wireless and wired technologies used for home networking can equally be used.

The Institute of Electrical and Electronic Engineers (IEEE) 802.11 standard group, branded as WiFi by the Wi-Fi Alliance of Austin, Tex., USA. IEEE 802.11b describes a communication using the 2.4 GHz frequency band and supporting a communication rate of 11 Mb/s, IEEE 802.11a uses the 5 GHz frequency band to carry 54 MB/s and IEEE 802.11g uses the 2.4 GHz band to support 54 Mb/s. This is described in an Intel White Paper entitled "54 Mbps IEEE 802.11 Wireless LAN at 2.4 GHz", and a chip-set is described in an Agere Systems White Paper entitled "802.11 Wireless Chip Set Technology White Paper", both of these documents being incorporated herein by reference. Such a 802.11 supporting transceiver block 551a and 551b may be implemented using WaveLAN™ WL60040 Multimode Wireless LAN Media Access Controller (MAC) from Agere Systems of Allentown, Pa. U.S.A., whose a product brief is incorporated herein by reference, which is part of a full chip-set as described in WaveLAN™ 802.11a/b/g Chip Set document from Agere Systems of Allentown, Pa., U.S.A., which is incorporated herein by reference. Reference is made to the manufacturer's data sheet Agere Systems, WaveLAN™ WL60040 Multimode Wireless LAN Media Access Controller (MAC), Product Brief August 2003 PB03-164WLAN, which is incorporated herein by reference.

Some wireless technologies, in particular microwave signals used in the WAN and MAN arenas, are using frequencies above 2-3 GHz where the radio path is not reflected or refracted to any great extent. Propagation in such frequencies requires a Line-of-Sight (LOS) relying on a line of sight between the transmitting antenna and the receiving antenna. Using this concept allows for NLOS (Non-LOS) wireless networks to interconnect over a LOS-based communication link. In addition, the wireless technology implemented may use either licensed frequency bands or unlicensed frequency bands, such as the frequency bands utilized in the Industrial, Scientific and Medical (ISM) frequency spectrum. In the US, three of the bands within the ISM spectrum are the A band, 902-928 MHz; the B band, 2.4-2.484 GHz (referred to as 2.4 GHz); and the C band, 5.725-5.875 GHz (referred to as 5 GHz). Overlapping and/or similar bands are used in different regions such as Europe and Japan. Further, cellular technologies can also be used, commonly using licensed spectrum. Such digital technologies include GSM (Global System for Mobile Communications), GPRS (General Packet Radio Service), CDMA (Code Division Multiple Access), EDGE (Enhanced Data Rates for GSM Evolution), 3GSM, DECT (Digital Enhanced Cordless Telecommunications), Digital AMPS (per IS-136/TDMA, for example) and iDEN (Integrated Digital Enhanced Network). The service carried over the cellular network may be voice, video or digital data such as the recently introduced EVDO (Evolution Data Only). In one embodiment, a WirelessHD standard based wireless communication is employed, which is based on the 7 GHz of continuous bandwidth around the 60 GHz radio frequency and allows for uncompressed, digital transmission.

Digital cameras utilizing wireless communication are disclosed in U.S. Pat. No. 6,535,243 to Tullis entitled: "Wireless Hand-Held Digital Camera", U.S. Pat. No. 6,552,743 to Rissman entitled: "Digital Camera-Ready Printer", U.S. Pat. No. 6,788,332 to Cook entitled: "Wireless Imaging Device and System", and in U.S. Pat. No. 5,666,159 to Parulski et al. entitled: "Electronic camera system with programmable transmission capability", which are all incorporated in their entirety for all purposes as if fully set forth herein. A display system and method utilizing a cellular telephone having digital camera capability and a television linked directly over a UWB wireless signal is disclosed in U.S. Pat. No. 7,327,385 to Yamaguchi entitled: "Home Picture/Video Display System with Ultra Wide-Band Technology", which is incorporated in its entirety for all purposes as if fully set forth herein.

As described above, communication based on electromagnetic waves in various parts of the electromagnetic spectrum can be used for communication. For example, low-frequency electromagnetic radiation can be used to transmit audio-frequency signals over short distances without a carrier. Radio-frequency transmission is a special case of this general electromagnetic transmission. As noted previously, light is also a special case of electromagnetic radiation, but is herein treated separately because of the characteristics of light are distinctly different from those of electromagnetic transmission in other usable parts of the electromagnetic spectrum.

Non-wired communication accomplished by light, either visible or non-visible light wavelength, can be used for the above transmission. The most popular is infrared (IR) based communication, but ultraviolet may also be used. Most such systems require substantially 'line-of-sight' access. In such a system, the antenna 552b relating to the camera 16 is replaced with a light emitter (e.g. LED), and the antenna 552a relating the control box 553 will be replaced with a light detector (e.g. photoelectric cell), and the communication over the air relies on the propagation of light.

Similarly, sound-based communication over space may be used, wherein the transceivers 551a and 551b use microphones and speakers, and the communication relies on the propagation of sound waves through the air in the space. Either audible sound (20-20,000 Hz band), or inaudible sound (ultrasonic, above 20,000 Hz; or infrasonic, below 20 Hz) can be used. In this case, the antennas 552a and 552b are substituted with a microphone or a similar device converting the sound signal into an electrical signal, and a speaker or a similar device for generating the audio signal and transmitting it to the air. A transducer combining into a single device both the speaker and the microphone functionalities may also be used. Since these solutions do not require any physical connection, such as cable, they provide both ease-of-use and mobility. Such non-wired solutions are effective over short distances. Furthermore, most of the non-wired solutions cannot easily pass through walls and other such obstructions, owing to the attenuation of the signals. Hence, such techniques are suitable for communication within a single room, but are not suitable for communication between the rooms of a home or other building.

While the invention has been exampled above with regard to a camera 16 mechanically attached to display 18, it will be appreciated that the invention equally applies to the case wherein there is no such mechanical attachment. For example, the camera 16 may be in a different room from the display 18, but still uses the face detection or hand gesture detection to control the display 18 located in the other room.

While the invention has been exampled above with regard to controlling a display 18 (either the display 18 positioning, power supplying to the display 18 or any other control), it will be appreciated that the invention equally applies to any other visualization device to be controlled. Examples are television set, video projector, rear-projection TV. Further, audio devices may as well be controlled, such as speakers. Further, any type of a device may be equally used according to the invention.

While the invention has been exampled above with regard to capturing, transmitting and processing a visible image, it is apparent that a non-visible spectrum can be equally used, such as infrared and ultraviolet. In such a configuration, the infrared image is captured, and then processed by the image processor 12. In such a system, the sensor 72 in FIG. 7 is sensitive to the non-visible part of the light spectrum (e.g. infrared).

In another embodiment of a non-conductive network medium, a fiber optic cable is used.

In such a case, transceivers 551a and 551b are fiber optic transceivers, and similarly antennas 552a and 552b are replaced with a fiber optic connector. As such, the term 'wiring' and 'cable' in this application should be interpreted to include networks based on non-conductive medium such as a fiber-optics cabling.

Powerline communication is known in the art for using the AC power wires in a building for digital data communication. Traditional approaches to powerline communication (e.g., home or office) include applications such as control of lighting and appliances, as well as sending data or broadband data, video or audio. Powerline command communication systems include for example X-10, CEBus (Consumer Electronics Bus per EIA-600 standard), and LonWorks.

The HomePlug organization is an industry trade group for powerline communication including various entities to define powerline communication specifications. HomePlug 1.0 is a specification for a home networking technology that connects devices to each other through power lines in a home. HomePlug certified products connect PCs and other devices that use Ethernet, USB, and 802.11. Many devices made by alliance members have HomePlug built in and connect to a network upon plugging the device into a wall socket in a home with other HomePlug devices. Signal interference, from surge protectors, extension cords, outlet strips and/or other proximately located devices, including the high-frequency signals, is an on-going concern of the HomePlug alliance. Similarly, HomePlug AV (HPAV) is a new generation of technology from the HomePlug Powerline Alliance. HPAV can be for example embedded in consumer electronics or computing products, and provides high-quality, multi-stream, entertainment-oriented networking over existing AC wiring. Users can avoid having to install new wires in their premises by using devices having a built-in HomePlug technology. HPAV uses advanced PHY and MAC technologies that provide a 200 Mbps (million bits per second) class powerline network for inter alia video, audio and data. The Physical (PHY) Layer utilizes this 200 Mbps channel rate to provide a 150 Mbps information rate to provide communications over noisy power line channels. As used herein, the terms "powerline" and "powerline communications" refer to any technology that is used to transfer data or signals over a power distribution system, including without limitation UPB, HomePlug, HomePlug a/v, and X-10 technologies. As used herein, the term "UPB" or Universal Powerline Bus refers to one exemplary instance of technologies which impose digital or analog signals or pulses onto AC waveforms or DC power delivery systems, such as for example the well known UPB approach set forth in "Universal Powerline Bus: The UPB System Description", Version 1.1 dated Sep. 19, 2003, incorporated herein by reference in its entirety. Lastly, the term "HomePlug" as used herein is meant specifically to include devices and systems compliant with the HomePlug™ Powerline Alliance Specification for powerline-based home networks (including the more recent HomePlug AN), and generally to include all other comparable devices adapted for powerline networking.

Figure 58:
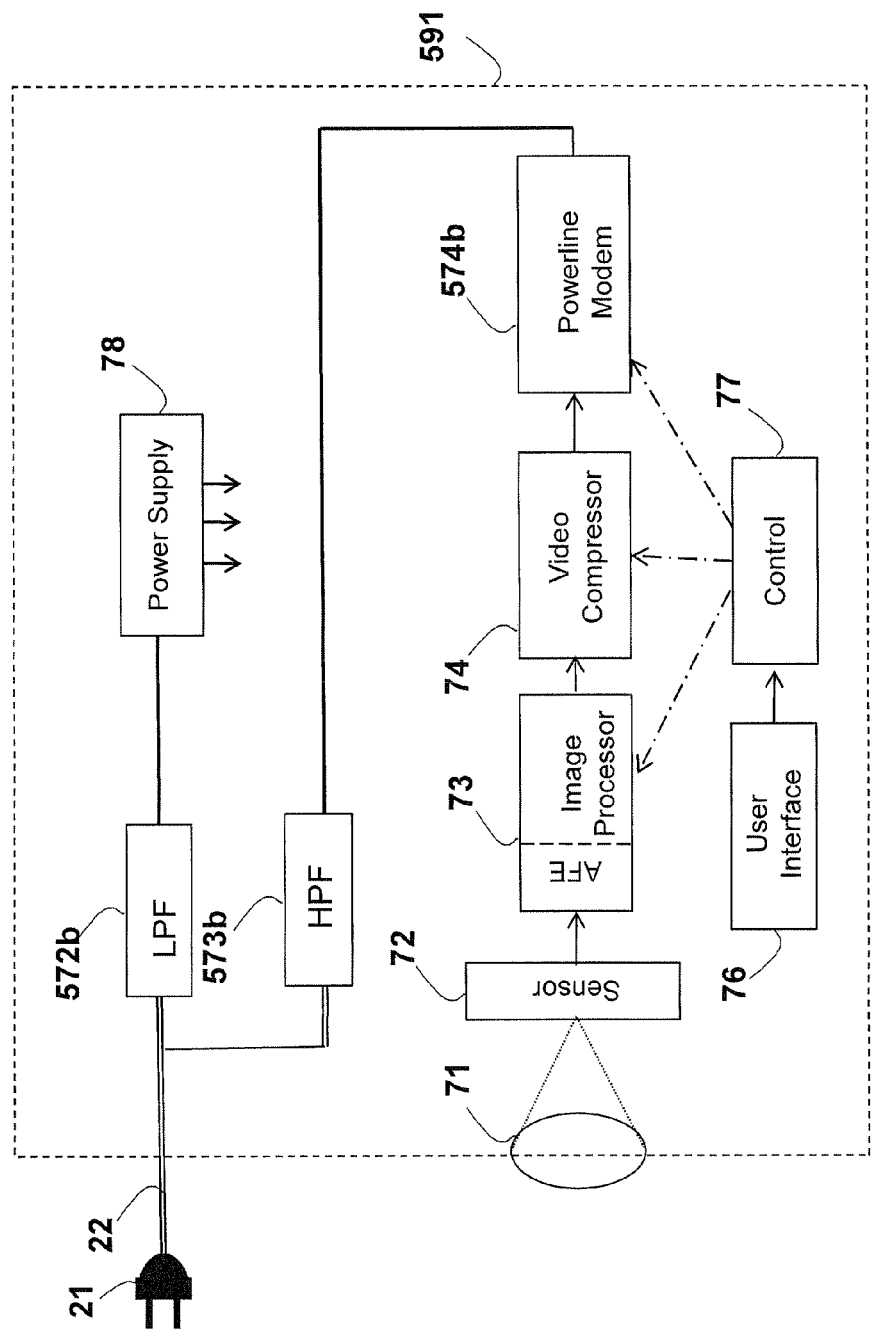
FIG. 58 illustrates schematically a simplified general functional block diagram of a system according to the invention.

In one embodiment according to the invention, powerline communication is used for the interconnection between the camera 16 and the control box 11, such as HomePlug based communication. One advantage in such a configuration is that only a single power cable is used, carrying both the AC power and the communication signal. Such a camera 591 is shown in FIG. 58 adapted from camera block diagram shown in FIG. 7. A low pass filter 572b is disposed between the AC power plug 21 and the power supply 78, for passing only the AC power signal, such as the 50 Hz or the 60 Hz. Such a low pass filter 572b also stops and exhibits high impedance in the digital data frequency band, thus reducing impedance loading at this frequency band. Transceiver 75 of FIG. 7 is replaced with a powerline modem 574b, connected to the AC power wires via a high pass filter 573b, which passes only the digital data frequency band, hence allowing only the digital data signal to pass, while stopping the AC power. If HomePlug technology is used, the modem is a HomePlug compliant modem, and the communication (physical layer and higher protocol layers) is implemented according to the HomePlug specification standard. As an example, such modem can be based on INT6000 'HomePlug AV High-Speed Powerline Solution' available from Intellon Corporation, headquartered in Orlando, Fla., U.S.A.

Figure 57:
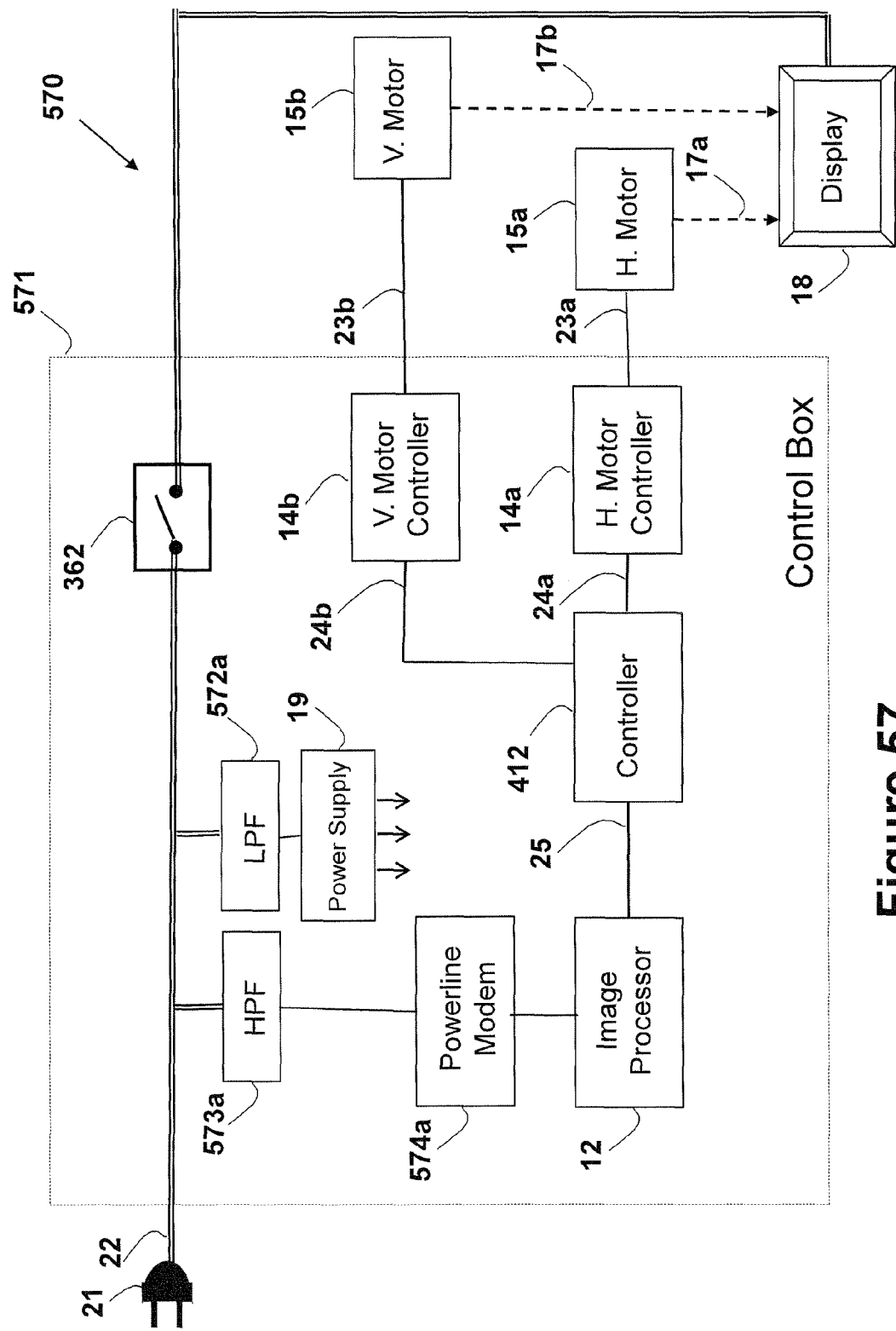
FIG. 57 illustrates schematically a simplified general functional block diagram of a system according to the invention.

Similarly, control box 571, shown in FIG. 57 as part of system 570, is also adapted to support powerline communication, in order to communicate with a mating camera 591 of FIG. 58. A low pass filter 572a is added between the AC power plug 21 and the power supply 19. A powerline modem 574a is added, connected to the AC power wires 22 via a high pass filter 573a, which passes only the digital data frequency band, hence allowing only the digital data signal to pass, while stopping the AC power. If HomePlug technology is used, the modem is a HomePlug compliant modem, and the communication (physical layer and higher protocol layers) is implemented according to the HomePlug specification standard.

Figure 59:
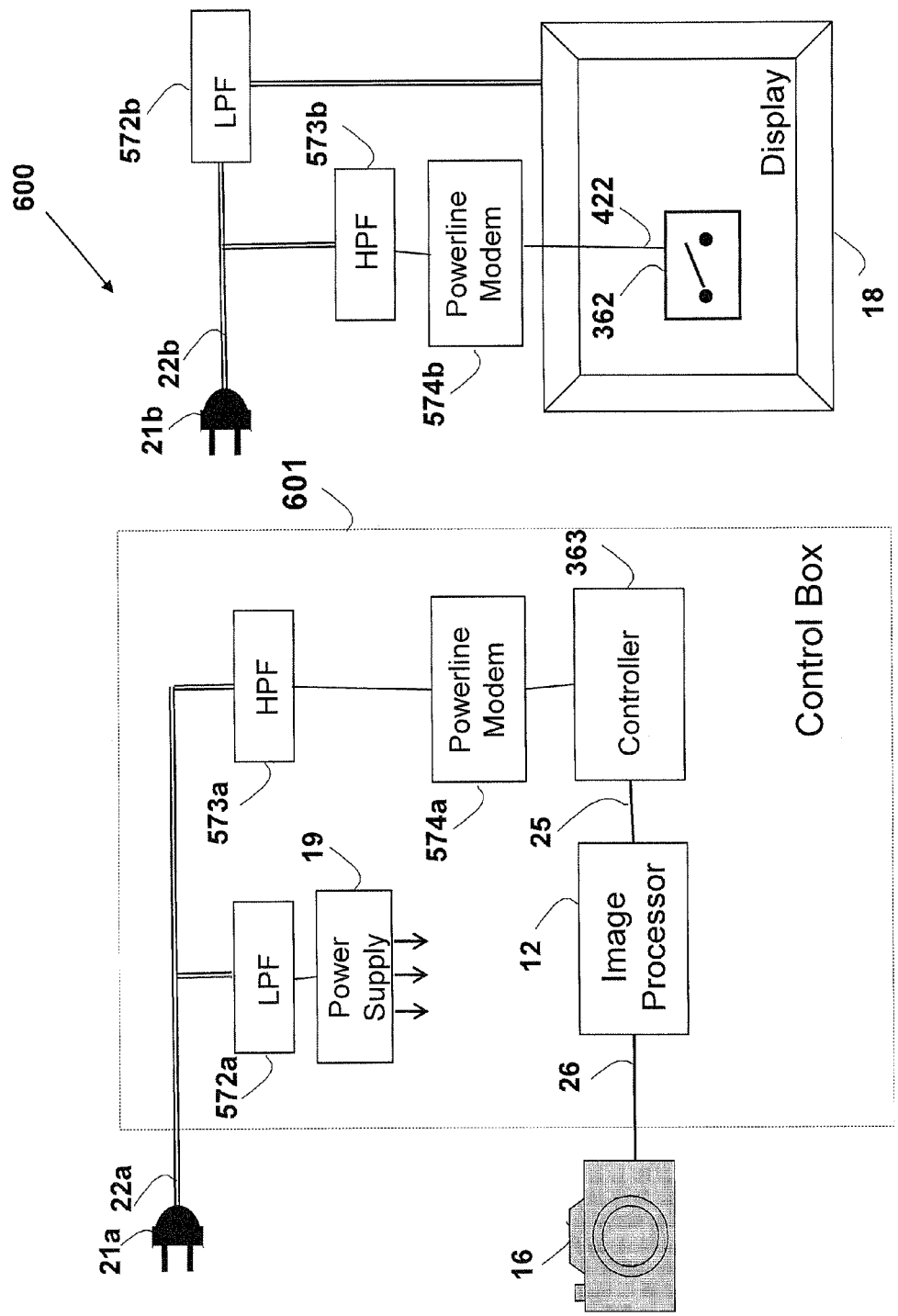
FIG. 59 illustrates schematically a simplified general functional block diagram of a system according to the invention.

Similarly, the communication of control information between the control box and the display is also adapted to support powerline communication, as shown as system 600 in FIG. 59, adapted from system 420 in FIG. 42. The control box 601, shown in FIG. 59 as part of system 600, is also adapted to support powerline communication, in order to communicate with a mating display 18. A low pass filter 572a is added between the AC power plug 21a and the power supply 19. A powerline modem 574a is added, connected to the AC power wires 22a via a high pass filter 573a, which passes only the digital data frequency band, hence allowing only the digital data signal to pass, while stopping the AC power. Similarly in the display 18 side, low pass filter 572b is added between the AC power plug 21b and the power supply connection of the display 18. A powerline modem 574b is added, connected to the AC power wires 22b via a high pass filter 573b, which passes only the digital data frequency band, hence allowing only the digital data signal to pass, while stopping the AC power. If HomePlug technology is used, the modems 574a and 574b are HomePlug compliant modems, and the communication (physical layer and higher protocol layers) is implemented according to the HomePlug specification standard.

In one embodiment, a wired medium 26 is connected between the camera 16 and the image processor 12. The wired medium is a wired communication medium, connected to via a connector. Such wired medium may be a UTP, STP, coaxial cable, a telephone wire pair, a CATV coaxial cable, AC power wire pair and LAN cable, such as Category 5 or Category 6. A suitable connector may be used for connecting to the specific type of the wired medium, such as a coaxial connector for connecting to a coaxial cable and a telephone connector for connecting to a telephone wire pair. The wired medium may be a single non-used twisted-pair in a LAN cable, or two such pairs connected in parallel. In another aspect of the present invention, the wired medium is using a phantom channel formed between two wire pairs, such as two twisted wire pairs in a LAN cable used in Ethernet 10BaseT, 100BaseTX or 1000BaseT. Similarly, any PAN, LAN, MAN or WAN wiring may be used as the wired medium.

In the case of wired medium connecting between the camera and the image processor (or between the control box and the controlled unit), a wired transceiver is adapted to be a wired modem or a wired transceiver is used, suitable for transmitting and receiving over the appropriate wiring used. The communication over such cable can be proprietary or preferably using an industry standard communication, wherein the connections of the camera and of the control box to the cable (as well as the connection from the control box to the display) are based on standard connectors and interfaces. The communication may be based on a parallel scheme, wherein multiple wires are used to concurrently carry the digital data, thus allowing a higher transfer rate of the information. In an alternative embodiment, serial communication is used, allowing for few conductors to be used and smaller footprint connectors requiring the usage of less pins and contacts. Various standard PAN (Personal Area Network), WAN (Wide Area Network) and LAN (Local Area Network) protocols can be used. In one embodiment, standard LAN (Local Area Network) is used, such as Ethernet IEEE802.3 10BaseT, 100Base TX or 1000BaseT. In such a case the transceiver 34 is Ethernet PHY (i.e. Ethernet physical layer or Ethernet transceiver) that can be implemented based on "LAN83C180 10/100 Fast Ethernet PHY Transceiver" or "LAN91C111 10/100 Non-PCI Ethernet Single Chip MAC+PHY" available from SMSC—Standard Microsystems Corporation of Hauppauge, N.Y. U.S.A. While this function can be implemented by using a single dedicated component, in many embodiments this function is integrated into a single component including other functions, such as handling higher layers. The transceiver may also contain isolation magnetic components (e.g. transformer-based), balancing components, surge protection hardware, and a LAN connector (commonly RJ-45) required for providing a proper and standard interface via a connector. In one embodiment, standard cabling is used, such as standard LAN cabling. For example, Category 5 cabling ('structured wiring') or any other wiring according to EIT/TIA-568 and EIA/TIA-570 can be used. Such LAN cabling involves wire pairs that may be UTP or STP. Similarly, category 3, 4, 5e, 6, 6e and 7 cables may be equally used. Such configuration is described, for example, in EIT/TIA-568 and EIA/TIA-570. It will be appreciated that any wired interface, other than Ethernet 10/100BaseT described above, being proprietary or standard, packet or synchronous, serial or parallel, may be equally used, such as IEEE1394, USB (Universal Serial Bus), EIA/TIA-232, PCI (Peripheral Component Interconnect), PCM-CIA (Personal Computer Memory Card International Association), or IEEE1284, but not limited to the aforementioned. Furthermore, multiple such interfaces (being of the same type or mixed) may also be used.

In the cases wherein a conductive medium, such as a dedicated cable, is used as the communication medium between the camera and the control box, it may be preferred to use the same cable to concurrently carry power between the camera and the control, thus obviating the need for two cables, one for providing power and one for communication purposes. In one embodiment, the control box is adapted to drive power to the cable for powering the camera. In an alternate embodiment, the camera is adapted to drive power to the cable for powering the control box. Such power can be used only for powering the camera module and related functionalities, or for fully powering the control box.

In an alternative embodiment, the power and communication signals are carried over the wires in the cable using Frequency Division Multiplexing (FDM, a.k.a. Frequency Domain Multiplexing). In such implementation, the power and the communications signals are carried each in its frequency band (or a single frequency) distinct from each other. For example, the power signal can be a DC (Direct Current) power (effectively 0 Hz), while the communication signal is carried over the 100 Hz-10 MHz (or 4-30 MHz) frequency band, which is distinct and above the DC power frequency. In one example, a relatively high voltage such as a 120VDC can be used in order to compensate for the wiring resistance caused voltage drops. In some installations, safety standards such as UL/IEC 60950 and EN60950 may limit the voltage level in many applications to 60VDC. A telephony common 48VDC voltage level may also be used.

Another technique for carrying power and data signals over the same conductors is known as Power over Ethernet (PoE) (i.e., Power over LAN-PoL) and standardized under IEEE802.3af and IEEE802.3 at, also explained in U.S. Pat. No. 6,473,609 to Lehr et al. titled: "Structure Cabling System", which describes a method to carry power over LAN wiring, using the spare pairs and the phantom mechanism. The latter makes use of center-tap transformers. The powering scheme described above may use this standard as well as using non-standard proprietary powering schemes. In one example, USB (Universal Serial Bus) connection is used for both power and digital data.

The above various states may be each represented by a single dedicated single-state indicator. However, in order to reduce complexity, known techniques are commonly used in order to combine signals. Such techniques may use different colors (of the same indicator), different intensity levels, variable duty-cycle and so forth. While visual indicators have been described, other indicating methods may be used such as audible tones (as stand alone or combined with visual).

All publications, patents, and patent applications cited in this specification are herein incorporated by reference as if each individual publication, patent, or patent application were specifically and individually indicated to be incorporated by reference and set forth in its entirety herein.

Those of skill in the art will understand that the various illustrative logical blocks, modules and circuits described in connection with the embodiments disclosed herein may be implemented in any number of ways including electronic hardware, computer software, or combinations of both. The various illustrative components, blocks, modules and circuits have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

Although exemplary embodiments of the present invention have been described, this should not be construed to limit the scope of the appended claims. Those skilled in the art will understand that modifications may be made to the described embodiments. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

It will be appreciated that the aforementioned features and advantages are presented solely by way of example. Accordingly, the foregoing should not be construed or interpreted to constitute, in any way, an exhaustive enumeration of features and advantages of embodiments of the present invention.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus for a human face detection based control of a device, said apparatus comprising:
   a digital camera for capturing an image in a digital data form;
   an image processor coupled to receive the image and for applying a face detection algorithm to detect the human face image in the captured image;
   a controller coupled to said image processor for generating a first control signal in response to the detection or non-detection of the human face image in the captured image;
   a first timer for signaling a first pre-set time period, said first timer coupled to said controller to cause the first control signal to be generated upon the detecting the human face in the captured image for the first pre-set period; and
   a second timer for signaling a second pre-set time period, said second timer coupled to said controller to cause said controller to generate a second control signal in response to not detecting the human face image in the captured image for the second time period,
   wherein the first control signal is effective to initiate supplying of power to at least part of the device, and the second control signal is effective to disconnect power from at least part of the device.

2. The apparatus according to claim 1, wherein said controller comprising firmware or software and a processor for executing said firmware or software.

3. The apparatus according to claim 1, wherein said digital camera is mechanically fixed to the device.

4. The apparatus according to claim 1, wherein said digital camera, said image processor and said controller are housed within a single enclosure.

5. The apparatus according to claim 1, further comprising a switch connected to be actuated by the first control signal.

6. The apparatus according to claim 5, wherein said switch is connected between a power source and the device, for powering the device in response to the first control signal.

7. The apparatus according to claim 6, operative to actuate said switch and to supply power to the device is response to the detection of the human face image in the captured image.

8. The apparatus according to claim 6, operative to actuate said switch and for supplying power to the device is response to not detecting a human face in the captured image.

9. The apparatus according to claim 5, wherein said camera, said image processor, said controller and said switch are housed within a single enclosure.

10. The apparatus according to claim claim 1, wherein the first control signal is effective to initiate supplying of power to the device, and the second control signal is effective to disconnect power from the device.

11. The apparatus according to claim 1, wherein said device is a display or a television set.

12. The apparatus according to claim 1, wherein the device has a display screen and said digital camera is positioned such that the image captured is substantially in front of the display screen.

13. An apparatus for a human face detection based control of a device, said apparatus comprising:
   a digital camera for capturing an image in a digital data form;
   an image processor coupled to receive the image and for applying a face detection algorithm to detect the human face image in the captured image;
   a controller coupled to said image processor for generating a first control signal in response to the detection or non-detection of the human face image in the captured image;
   a first timer for signaling a first pre-set time period, said first timer coupled to said controller to cause the first control signal to be generated upon the detecting the human face in the captured image for the first pre-set period; and
   a second timer for signaling a second pre-set time period, said second timer coupled to said controller to cause said controller to generate a second control signal in response to not detecting the human face image in the captured image for the second time period,
   wherein the device has a display, and said controller is operative to blank the display, by disconnecting power from the display, in response to not detecting the human face image in the captured image.

* * * * *